US012300189B2

(12) United States Patent
Monomoshi et al.

(10) Patent No.: US 12,300,189 B2
(45) Date of Patent: May 13, 2025

(54) IMAGE DISPLAY METHOD AND IMAGE DISPLAY DEVICE

(71) Applicant: Nichia Corporation, Anan (JP)

(72) Inventors: Masahiko Monomoshi, Itano-gun (JP); Tetsuya Kataoka, Itano-gun (JP)

(73) Assignee: Nichia Corporation, Anan (JP)

(*) Notice: Subject to any disclaimer, the term of this patent is extended or adjusted under 35 U.S.C. 154(b) by 0 days.

(21) Appl. No.: 18/434,148

(22) Filed: Feb. 6, 2024

(65) Prior Publication Data

US 2024/0177682 A1 May 30, 2024

Related U.S. Application Data

(62) Division of application No. 17/950,402, filed on Sep. 22, 2022, now Pat. No. 11,929,042.

(30) Foreign Application Priority Data

Sep. 28, 2021 (JP) ................................ 2021-158197
Jul. 27, 2022 (JP) ................................ 2022-119651

(51) Int. Cl.
*G09G 3/34* (2006.01)
*G09G 3/36* (2006.01)

(52) U.S. Cl.
CPC ......... *G09G 3/3426* (2013.01); *G09G 3/3648* (2013.01); *G09G 2320/0646* (2013.01); *G09G 2360/16* (2013.01)

(58) Field of Classification Search
CPC ............... G09G 3/3426; G09G 3/3648; G09G 2320/0646; G09G 2320/064; G09G 2360/16
See application file for complete search history.

(56) References Cited

U.S. PATENT DOCUMENTS

| | | | |
|---|---|---|---|
| 2010/0123741 A1 | 5/2010 | Shin et al. |
| 2010/0231814 A1 | 9/2010 | Yamada et al. |
| 2013/0300982 A1 | 11/2013 | Tanaka |
| 2013/0314629 A1 | 11/2013 | Yasui et al. |

(Continued)

FOREIGN PATENT DOCUMENTS

| | | |
|---|---|---|
| JP | 2008-145966 A | 6/2008 |
| JP | 2009-175413 A | 8/2009 |

(Continued)

OTHER PUBLICATIONS

Nakagawa et al., JP 2010243660A (machine translation). (Year: 2010).

*Primary Examiner* — Xuemei Zheng
(74) *Attorney, Agent, or Firm* — Kim & Stewart LLP

(57) ABSTRACT

An image display method using an image display device is provided. The method includes performing a first operation to cause light to be emitted from light-emitting regions of a backlight at respective intensity in accordance with frame image data, sequentially with respect to each of first areas of the backlight, and performing a second operation to apply voltages to pixels of a liquid crystal panel at respective levels in accordance with the frame image data, sequentially with respect to each of second areas of the liquid crystal panel. Light-emitting regions in each of the first areas are repeatedly turned on and off a plurality of times during the first operation thereof.

20 Claims, 33 Drawing Sheets

(56) References Cited

U.S. PATENT DOCUMENTS

| | | | | |
|---|---|---|---|---|
| 2019/0101778 | A1* | 4/2019 | Imai | G09G 3/3648 |
| 2020/0051484 | A1* | 2/2020 | Yashiki | G09G 3/32 |
| 2021/0233478 | A1* | 7/2021 | Sun | G09G 3/36 |

FOREIGN PATENT DOCUMENTS

| | | | |
|---|---|---|---|
| JP | 2010-122682 | A | 6/2010 |
| JP | 2010243660 | A | * 10/2010 |
| JP | 2011-075800 | A | 4/2011 |
| JP | 2011-197168 | A | 10/2011 |
| JP | 2012-209034 | A | 10/2012 |
| JP | 2013-247483 | A | 12/2013 |
| JP | 2020-027273 | A | 2/2020 |
| WO | 2008/029536 | A1 | 3/2008 |
| WO | 2012/102227 | A1 | 8/2012 |

* cited by examiner

IMAGE DISPLAY METHOD AND IMAGE DISPLAY DEVICE

CROSS-REFERENCE TO RELATED APPLICATIONS

This application is a division of U.S. patent application Ser. No. 17/950,402, filed on Sep. 22, 2022, which is based upon and claims the benefit of priority from the prior Japanese Patent Application No. 2021-158197, filed on Sep. 28, 2021, and the prior Japanese Patent Application No. 2022-119651, filed on Jul. 27, 2022; the entire contents of each of the applications are incorporated herein by reference.

FIELD

Embodiments relate to an image display method and an image display device.

BACKGROUND

A conventional image display device includes a backlight and a liquid crystal panel. The backlight includes multiple light-emitting regions that are arranged in a matrix configuration and in which light sources are provided respectively. The liquid crystal panel is located above the backlight and includes multiple pixels. By using such an image display device, luminances of the light-emitting regions can be individually set according to an image to be displayed in the liquid crystal panel, and gradations of the pixels of the liquid crystal panel can be set according to the luminances of the light-emitting regions. The contrast of the image to be displayed in the liquid crystal panel can be improved thereby. Such technology is called "local dimming".

SUMMARY

Embodiments are directed to an image display method and an image display device that can improve the quality of a displayed image.

According to one aspect of the present invention, an image display method using an image display device is provided. The image display device includes a backlight and a liquid crystal panel. The backlight includes a plurality of light-emitting regions arranged in a matrix configuration in a first direction and a second direction. The light-emitting regions are divided into a plurality of first areas in the first direction. The liquid crystal panel is on the backlight and includes a plurality of pixels arranged in a matrix configuration in the first and second directions. The pixels are divided into a plurality of second areas in the first direction. The method includes performing a first operation to cause light to be emitted from the light-emitting regions at respective intensity in accordance with frame image data, sequentially with respect to each of the first areas, and performing a second operation to apply voltages to the pixels at respective levels in accordance with the frame image data, sequentially with respect to each of the second areas. Light-emitting regions in each of the first areas are repeatedly turned on and off a plurality of times during the first operation thereof.

According to one aspect of the present invention, an image display device is provided. The image display device includes a backlight, a liquid crystal panel, and a controller. The backlight includes a plurality of light-emitting regions arranged in a matrix configuration in a first direction and a second direction. The light-emitting regions being divided into a plurality of first areas in the first direction. The liquid crystal panel is on the backlight and includes a plurality of pixels arranged in a matrix configuration in the first and second directions. The pixels are divided into a plurality of second areas in the first direction. The controller is configured to perform a first operation to cause light to be emitted from the light-emitting regions at respective intensity in accordance with frame image data, sequentially with respect to each of the first areas, and a second operation to apply voltages to the pixels at respective levels in accordance with the frame image data, sequentially with respect to each of the second areas. The controller repeatedly turns on and off light-emitting regions in each of the first areas a plurality of times during the first operation thereof.

According to embodiments, an image display method and an image display device can be provided in which quality of a displayed image can be improved.

DETAILED DESCRIPTION

Figure 1:
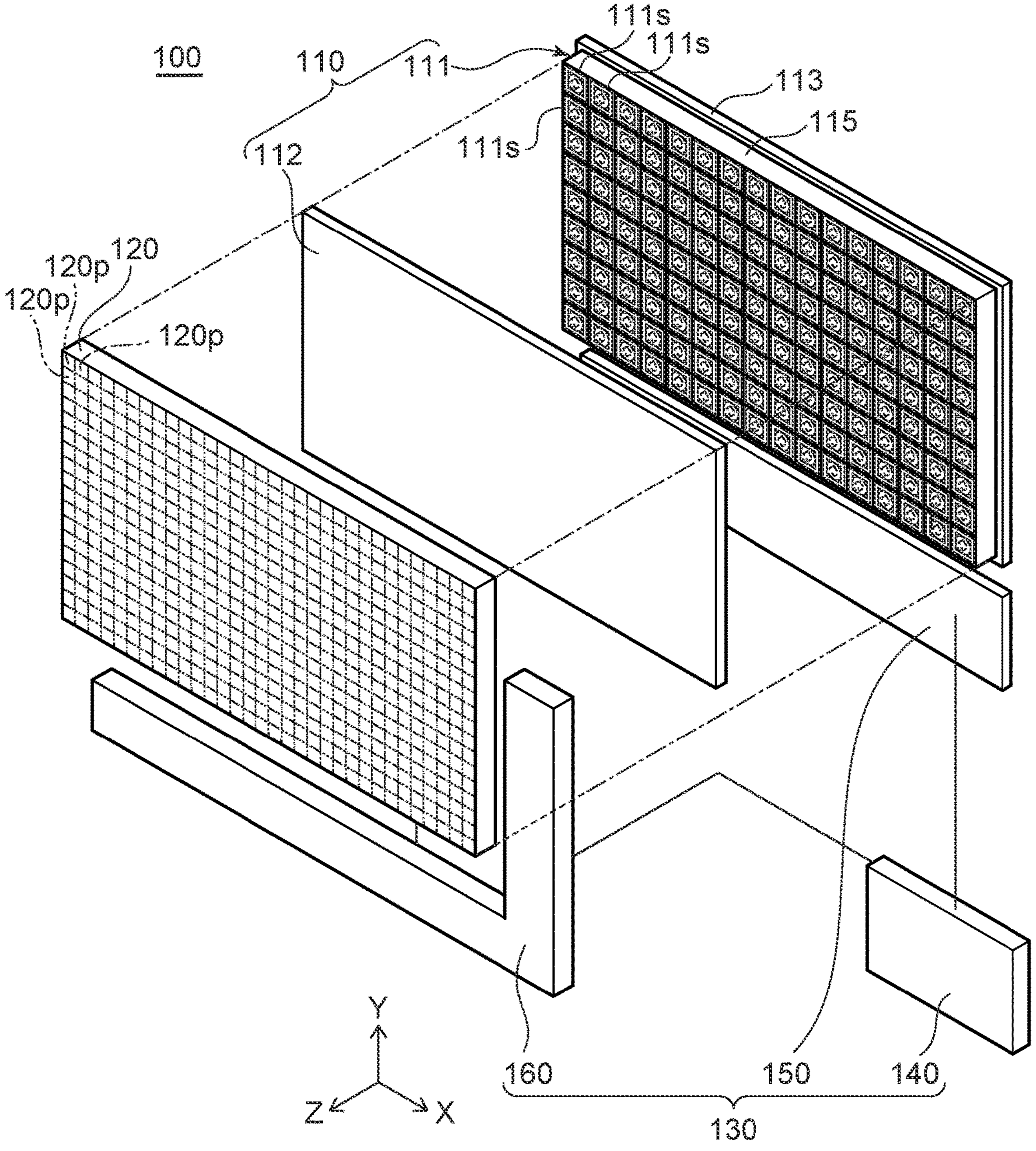
FIG. 1 illustrates an exploded perspective view of an image display device according to a first embodiment.

Embodiments and modifications will now be described with reference to the drawings. The drawings are schematic or conceptual; and relationships between the thickness and width of portions, proportional coefficients of sizes among components, etc., are not necessarily the same as the actual values thereof. Furthermore, the dimensions and proportional coefficients may be illustrated differently among drawings, even for identical portions. In the specification and the drawings, components similar to those described in regard to an antecedent drawing are marked with the same reference numerals; a detailed description may be omitted as appropriate; and an end view that shows only a cross section may be used as a cross-sectional view.

For easier understanding of the following description, the arrangements and configurations of the components are described using an XYZ orthogonal coordinate system. X-axis, Y-axis, and Z-axis are orthogonal to each other.

The direction in which the X-axis extends is referred to as an "X-direction"; the direction in which the Y-axis extends is referred to as a "Y-direction"; and the direction in which the Z-axis extends is referred to as a "Z-direction". Although the Z-direction that is from the backlight toward the liquid crystal panel is referred to as "up" and the opposite direction is referred to as "down", these directions are independent of the direction of gravity. For easier understanding of the description, one direction in which the X-axis extends in the drawings is called the "+X direction"; and the opposite direction is called the "−X direction". Similarly, one direction in which the Y-axis extends is called the "+Y direction"; and the opposite direction is called the "−Y direction".

First Embodiment

First, a first embodiment will be described.

FIG. 1 illustrates an exploded perspective view of an image display device according to the first embodiment.

The image display device 100 according to the first embodiment is, for example, a liquid crystal module (LCM) used in a display of an external device (not illustrated) such as a television, a personal computer, a game machine, etc. The image display device 100 includes a backlight 110, a liquid crystal panel 120, and a controller 130. The controller 130 includes a timing controller 140, a backlight driver 150, and a liquid crystal panel driver 160. Components of the image display device 100 will now be described. For easier understanding of the description, electrical connections between the components are shown by connecting the components to each other with solid lines in FIG. 1.

Backlight

The backlight 110 is drivable by local dimming. The backlight 110 includes a planar light source 111, and an optical member 112 located on the planar light source 111.

The optical member 112 is, for example, a sheet or a plate that has a light-modulating function such as light diffusion, etc. According to the present embodiment, the number of the optical members 112 included in the backlight 110 is one. Alternatively, the number of optical members included in the backlight 110 may be two or more.

Figure 2:
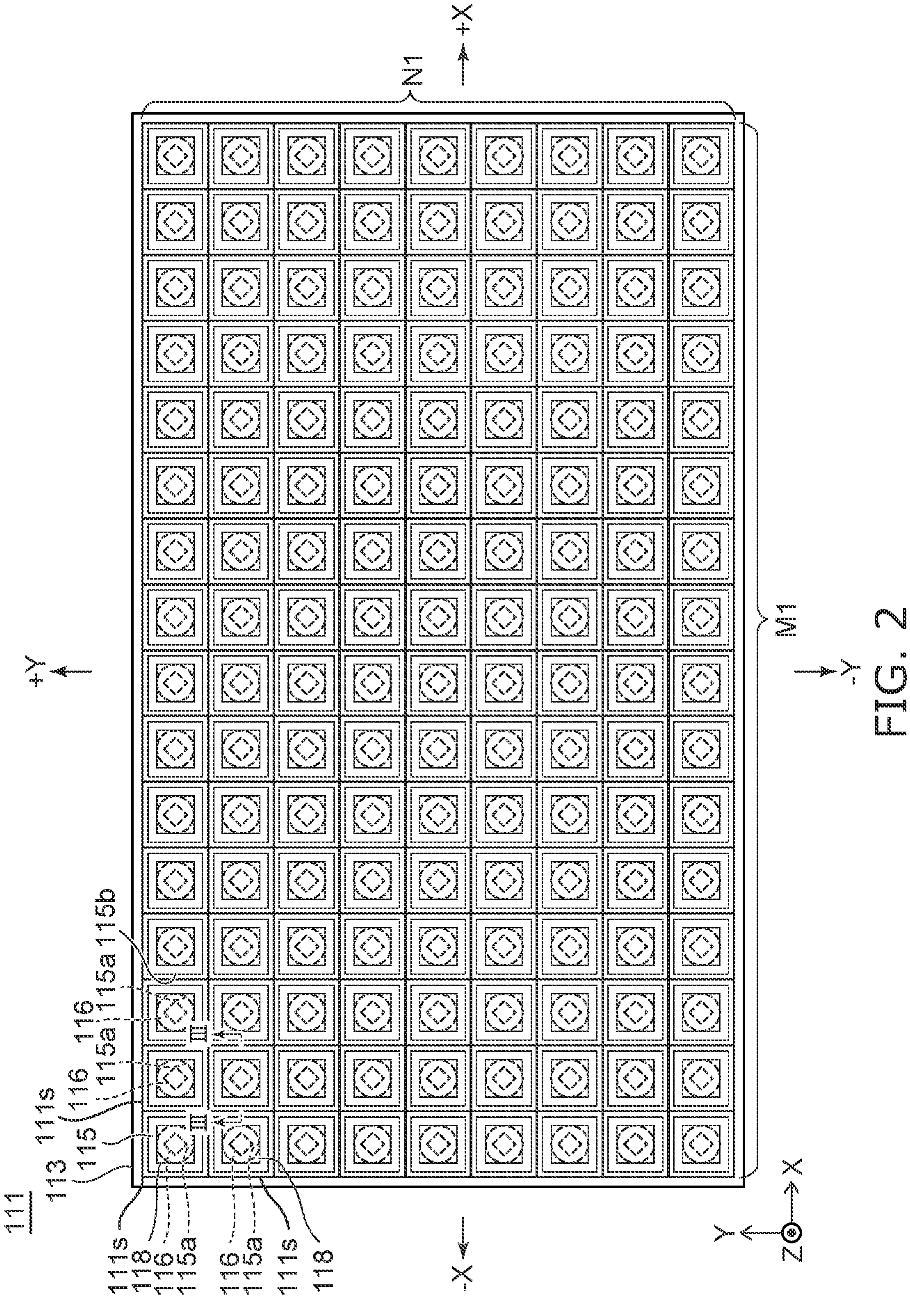
FIG. 2 illustrates a top view of a planar light source of a backlight of the image display device according to the first embodiment.

FIG. 2 illustrates a top view of the planar light source of the backlight of the image display device according to the present embodiment.

Figure 3:
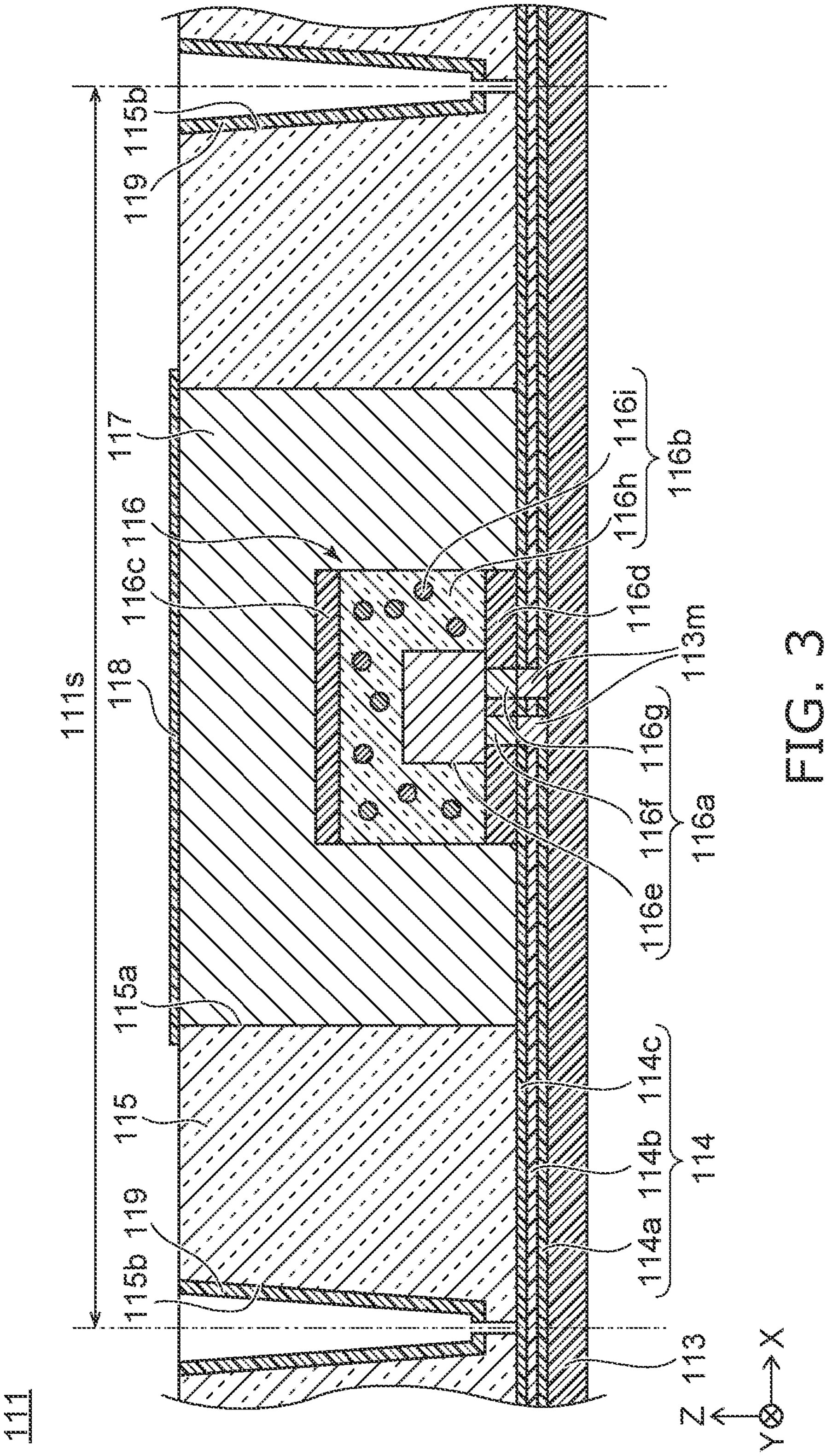
FIG. 3 illustrates a cross-sectional view of the planar light source along line III-III in FIG. 2.

FIG. 3 illustrates a cross-sectional view of the planar light source along line III-III in FIG. 2.

According to the present embodiment as shown in FIGS. 2 and 3, the planar light source 111 includes a substrate 113, a light-reflective sheet 114, a light guide member 115, multiple light sources 116, a light-transmitting member 117, a first light-modulating member 118, and a light-reflecting member 119.

The substrate 113 is a wiring substrate that includes an insulating member and multiple wiring located on the insulating member. The shape of the substrate 113 in a top-view is substantially rectangular as shown in FIG. 2. However, the shape of the substrate is not limited to such a shape. The upper surface and the lower surface of the substrate 113 are flat surfaces and are substantially parallel to the X-direction and the Y-direction (the XY plane).

As shown in FIG. 3, the light-reflective sheet 114 is located on the substrate 113. The light-reflective sheet 114 includes, for example, a first adhesive layer 114*a*, a light-reflecting layer 114*b* located on the first adhesive layer 114*a*, and a second adhesive layer 114*c* located on the light-reflecting layer 114*b*. The light-reflective sheet 114 is adhered to the substrate 113 by the first adhesive layer 114*a*. For example, a resin that includes many bubbles can be used as the light-reflecting layer 114*b*. The first adhesive layer 114*a* and the second adhesive layer 114*c* can include, for example, a light-diffusing agent. In such a case, it is favorable for the concentration of the light-diffusing agent included in the second adhesive layer 114*c* to be less than the concentration of the light-diffusing agent included in the first adhesive layer 114*a* to reduce uneven luminance among light-emitting regions 111*s* described below. As appropriate, for example, the light-diffusing agent can be selected from the light-diffusing agents included in a second light-modulating member 116*c* and a third light-modulating member 116*d* described below.

The light guide member 115 is located on the light-reflective sheet 114. The light guide member 115 is adhered to the light-reflective sheet 114 by the second adhesive layer 114*c*. The light guide member 115 is plate-shaped. However, the shape of the light guide member is not limited to such a shape. It is favorable for the thickness of the light guide member 115 to be not less than 200 μm and not more than 800 μm. The light guide member 115 may include a single layer or may include a stacked body of multiple layers.

For example, a thermoplastic resin such as acrylic, polycarbonate, cyclic polyolefin, polyethylene terephthalate, polyester, or the like, a thermosetting resin such as epoxy, silicone, or the like, glass, etc., are examples of materials included in the light guide member 115.

Multiple light source placement regions 115*a* are located in the light guide member 115. As shown in FIG. 2, the multiple light source placement parts 115*a* are arranged in a matrix configuration in a top-view. As shown in FIG. 3, each light source placement region 115*a* is a through-hole that extends through the light guide member 115 in the Z-direction. Alternatively, the light source placement region may be a recess located at the lower surface of the light guide member.

The light sources 116 are located in the light source placement regions 115*a*, respectively. Accordingly, as shown in FIG. 2, the multiple light sources 116 also are arranged in a matrix configuration. Alternatively, the light sources 116 may be embedded in the light guide member 115 without providing the light source placement regions 115*a* in the light guide member 115. Also, it is not always necessary for the light guide member 115 to be included in the planar light source 111. For example, the planar light source 111 may include no light guide member, and multiple light sources may be simply arranged in a matrix configuration on the substrate 113.

As shown in FIG. 3, each light source 116 is a light-emitting device including a wavelength conversion member 116*b* and a light-emitting element 116*a*. Each light source 116 further includes the second light-modulating member 116*c* and the third light-modulating member 116*d*. Alternatively, each light source may be a solitary light-emitting element instead of a light-emitting device.

The light-emitting element 116*a* is, for example, an LED (Light-Emitting Diode). The light-emitting element 116*a* includes a semiconductor stacked body 116*e* and a pair of electrodes 116*f* and 116*g* that electrically connects the semiconductor stacked body 116*e* and wiring of the substrate 113. Through-holes are provided in parts of the light-reflective sheet 114 positioned directly under the electrodes 116*f* and 116*g*. Conductive members 113*m* that electrically connect the wiring of the substrate 113 and the electrodes 116*f* and 116*g* are located in the through-holes.

The wavelength conversion member 116*b* includes a light-transmitting member 116*h* that covers an upper surface and side surfaces of the semiconductor stacked body 116*e*, and a wavelength conversion substance 116*i* that is located in the light-transmitting member 116*h* and converts the wavelength of the light emitted by the semiconductor stacked body 116*e* into a different wavelength. The wavelength conversion substance 116*i* is, for example, a fluorescer.

According to the present embodiment, the light-emitting element 116*a* emits blue light. On the other hand, the wavelength conversion member 116*b* includes a fluorescer that generates red light and a fluorescer that generates green light. Hereinbelow, a fluorescer that generates red light is called a “red fluorescer”; and a fluorescer that generates green light is called a “green fluorescer”. For example, a CASN-based fluorescer (e.g., $CaAlSiN_3$:Eu), a KSF-based fluorescer (e.g., $K_2SiF_6$:Mn), a KSAF-based fluorescer (e.g., $K_2[Si_pAl_qMn_rF_s]$ ($0.9 \le p+q+r \le 1.1$, $0<q \le 0.1$, $0<r \le 0.2$, and $5.9 \le s \le 6.1$)), or a quantum dot fluorescer (e.g., $Ag_pCu_{1-p}In_qGa_{1-q}S_2$ ($0<p \le 1$ and $0<q \le 1$)) are examples of the red fluorescer. For example, a fluorescer that has a perovskite structure (e.g., $CsPb(F, Cl, Br, I)_3$), a β-sialon-based fluorescer (e.g., $(Si, Al)_3(O, N)_4$:Eu), a LAG-based fluorescer (e.g., $Lu_3(Al, Ga)_5O_{12}$:Ce), or a quantum dot fluorescer (e.g., $AgIn_pGa_{1-p}S_2$ ($0<p \le 1$)) are examples of the green fluorescer. The backlight 110 can emit white light that is mixed light of the blue light emitted by the light-emitting element 116*a* and the red and green light generated by the wavelength conversion member 116*b*.

Alternatively, the wavelength conversion member 116*b* may be replaced with a light-transmitting member that does not include a fluorescer. In such a case, and when the light source is a solitary light-emitting element as described above, for example, similar white light can be obtained by providing a fluorescer sheet including a red fluorescer and a green fluorescer on the planar light source or by providing a fluorescer sheet including a red fluorescer and a fluorescer sheet including a green fluorescer on the planar light source.

The second light-modulating member 116*c* covers the upper surface of the wavelength conversion member 116*b*. The second light-modulating member 116*c* can control the amount and/or emission direction of the light emitted from the upper surface of the wavelength conversion member 116*b*.

The third light-modulating member 116*d* covers the lower surface of the light-emitting element 116*a* and the lower surface of the wavelength conversion member 116*b* so that the lower surfaces of the electrodes 116*f* and 116*g* are exposed. The third light-modulating member 116*d* can reflect the light toward the lower surface of the wavelength conversion member 116*b* to direct the light to be emitted from the upper surface and the side surfaces of the wavelength conversion member 116*b*.

The second light-modulating member 116*c* and the third light-modulating member 116*d* each can include a light-transmitting resin, and a light-diffusing agent included in the light-transmitting resin. For example, a silicone resin, an epoxy resin, or an acrylic resin are examples of the light-transmitting resin. For example, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, etc., are examples of the light-diffusing agent. The second light-modulating member 116*c* also may include a metal member such as, for example, aluminum, silver, etc., so that the luminance directly above the light source 116 does not become too high.

The light-transmitting member 117 is located in the light source placement region 115*a*. The light-transmitting member 117 covers the light source 116.

The first light-modulating member 118 is located on the light-transmitting member 117. The first light-modulating member 118 can reflect a portion of the light incident from the light-transmitting member 117 and can transmit another portion of the light so that the luminance directly above the light source 116 does not become too high. It is favorable for the first light-modulating member 118 to cover the interface between the light-transmitting member 117 and the light guide member 115 when in a top view so that locally high luminance due to scattering of the light from the light source 116 at the interface between the light-transmitting member 117 and the light guide member 115 can be suppressed. The first light-modulating member 118 can include a member similar to the second or third light-modulating member 116*c* or 116*d*.

As shown in FIGS. 2 and 3, a partitioning trench 115*b* is provided in the light guide member 115 to surround the light source placement regions 115*a* in the top view. The partitioning trench 115*b* extends in a lattice shape in the X-direction and the Y-direction. The partitioning trench 115*b* extends through the light guide member 115 in the Z-direction. Alternatively, the partitioning trench 115*b* may be a recess provided in the upper or lower surface of the light guide member 115. Also, the partitioning trench 115*b* may not be provided in the light guide member 115.

The light-reflecting member 119 is located in the partitioning trench 115*b*. The light-reflecting member 119 can include, for example, a member similar to the second or third light-modulating member 116*c* or 116*d*. The light-reflecting member 119 covers a portion of side surfaces of the partitioning trench 115*b* in a layer shape. The light-reflecting member 119 may extend to cover the light-reflective sheet 114 exposed in the partitioning trench 115*b*, and particularly the upper surface of the second adhesive layer 114*c* so that the light from the light source 116 can be partitioned for each of the light-emitting regions 111*s* described below. Alternatively, the light-reflecting member 119 may fill the entire interior of the partitioning trench 115*b*. Also, the light-reflecting member 119 may not be provided in the partitioning trench 115*b*.

The outputs of the multiple light sources 116 are individually controllable by the backlight driver 150. Here, "controllable output" means that switching between lit and unlit is possible, and the luminance in the lit state is adjustable. Hereinbelow, the regions in the top view of the planar light source 111 when subdivided into regions that include the light sources 116 of which outputs are individually controlled are called the "light-emitting regions 111*s*". The light-emitting region 111*s* corresponds to the minimum region of the planar light source 111 of which luminance is controlled by local dimming.

According to the present embodiment, the light-emitting regions 111*s* correspond to regions when the planar light source 111 is partitioned into a lattice shape similarly to the partitioning trench 115*b*. Therefore, each light-emitting region 111*s* is rectangular as shown in FIG. 2. One light source 116 is located in one light-emitting region 111*s*. Alternatively, multiple light source groups may be arranged in a matrix configuration in the planar light source; and the output of each light source group may be controlled. In such a case, one light source group, i.e., a plurality of light sources, is located in one light-emitting region.

The multiple light-emitting regions 111*s* are arranged in a matrix configuration in the top view. Hereinbelow, in the structure of a matrix configuration such as that of the multiple light-emitting regions 111*s*, an element group of the matrix of the light-emitting regions 111*s* and the like arranged in the X-direction is called a "row"; and an element group of the matrix of the light-emitting regions 111*s* and the like arranged in the Y-direction is called a "column". The row that is positioned furthest toward the +Y side (the left side of FIG. 2) is referred to as the "first row"; and the row that is positioned furthest toward the −Y side (the right side of FIG. 2) is referred to as the "final row". Similarly, the column that is positioned furthest toward the −X side (the lower side of FIG. 2) is referred to as the "first column"; and the column that is positioned furthest toward the +X side (the upper side of FIG. 2) is referred to as the "final column". This is also similar for data that has a matrix configuration in an input image 910 described below, etc. The multiple light-emitting regions 111*s* are arranged in N1 rows and M1 columns. Here, N1 and M1 each are any integer; and an example is shown in FIG. 2 in which N1 is 9 and M1 is 16.

Liquid Crystal Panel

Figure 4:
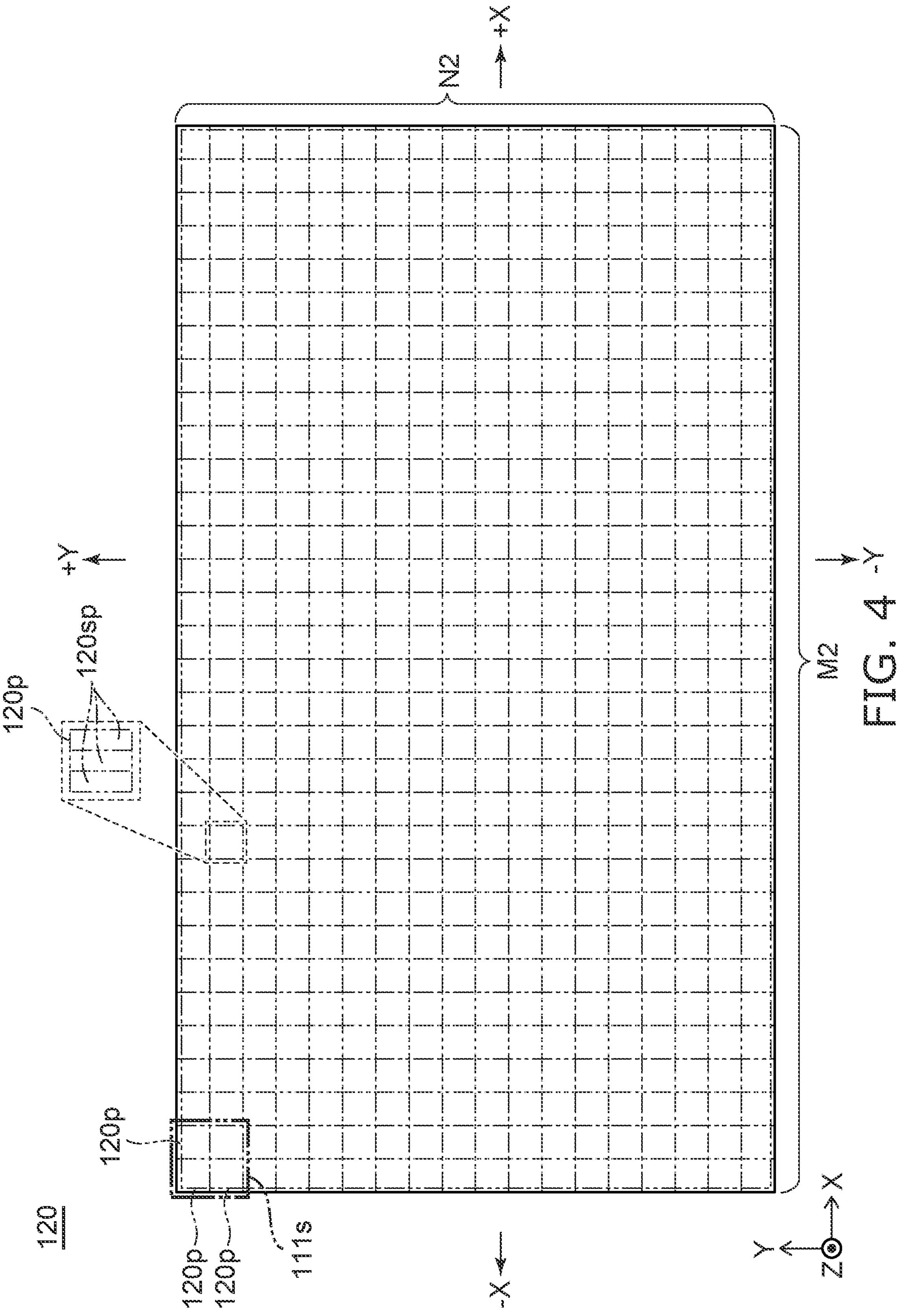
FIG. 4 illustrates a top view of a liquid crystal panel of the image display device according to the first embodiment.

FIG. 4 illustrates a top view of the liquid crystal panel 120 of the image display device 100 according to the present embodiment.

The liquid crystal panel 120 is located on the backlight 110. The liquid crystal panel 120 is substantially rectangular in a top view. However, the shape of the liquid crystal panel is not limited to such a shape. The liquid crystal panel 120 includes multiple pixels 120*p* arranged in a matrix configuration. In FIG. 4, one region that is surrounded with a fine double dot-dash line corresponds to one pixel 120*p*.

According to the present embodiment, the liquid crystal panel 120 can display a color image. Therefore, one pixel 120*p* includes three subpixels 120*sp* such that, for example, the white light that is emitted from the backlight 110 is transmitted by a subpixel that can transmit blue light, a subpixel that can transmit green light, and a subpixel that can transmit red light. The light transmittances of the subpixels 120*sp* are individually controllable by the liquid crystal panel driver 160. The gradations of the subpixels 120*sp* are individually controlled thereby.

The multiple pixels 120*p* are arranged in N2 rows and M2 columns. Here, N2 and M2 each are any integer such that N2>N1 and M2>M1. The multiple pixels 120*p* are located in each of the light-emitting regions 111*s* in the top view. Although an example is shown in FIG. 4 in which four pixels 120*p* are located in each light-emitting region 111*s* in the top view, the number of pixels of the liquid crystal panel located in each light-emitting region may be more or less than four.

Figure 5:
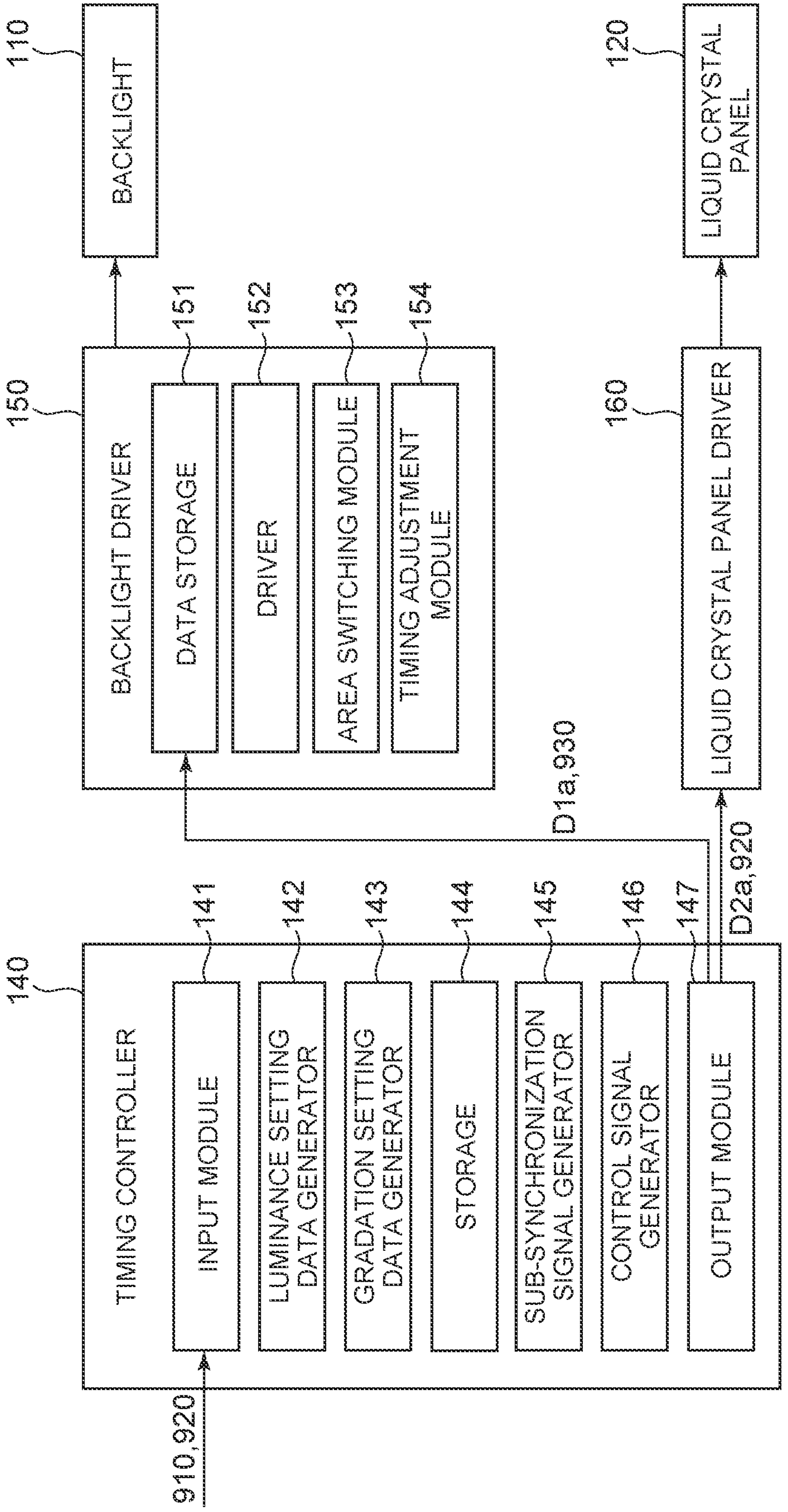
FIG. 5 is a block diagram showing functional elements of the image display device according to the first embodiment.

FIG. 5 is a block diagram showing functional components of the image display device according to the present embodiment.

Figure 6A:
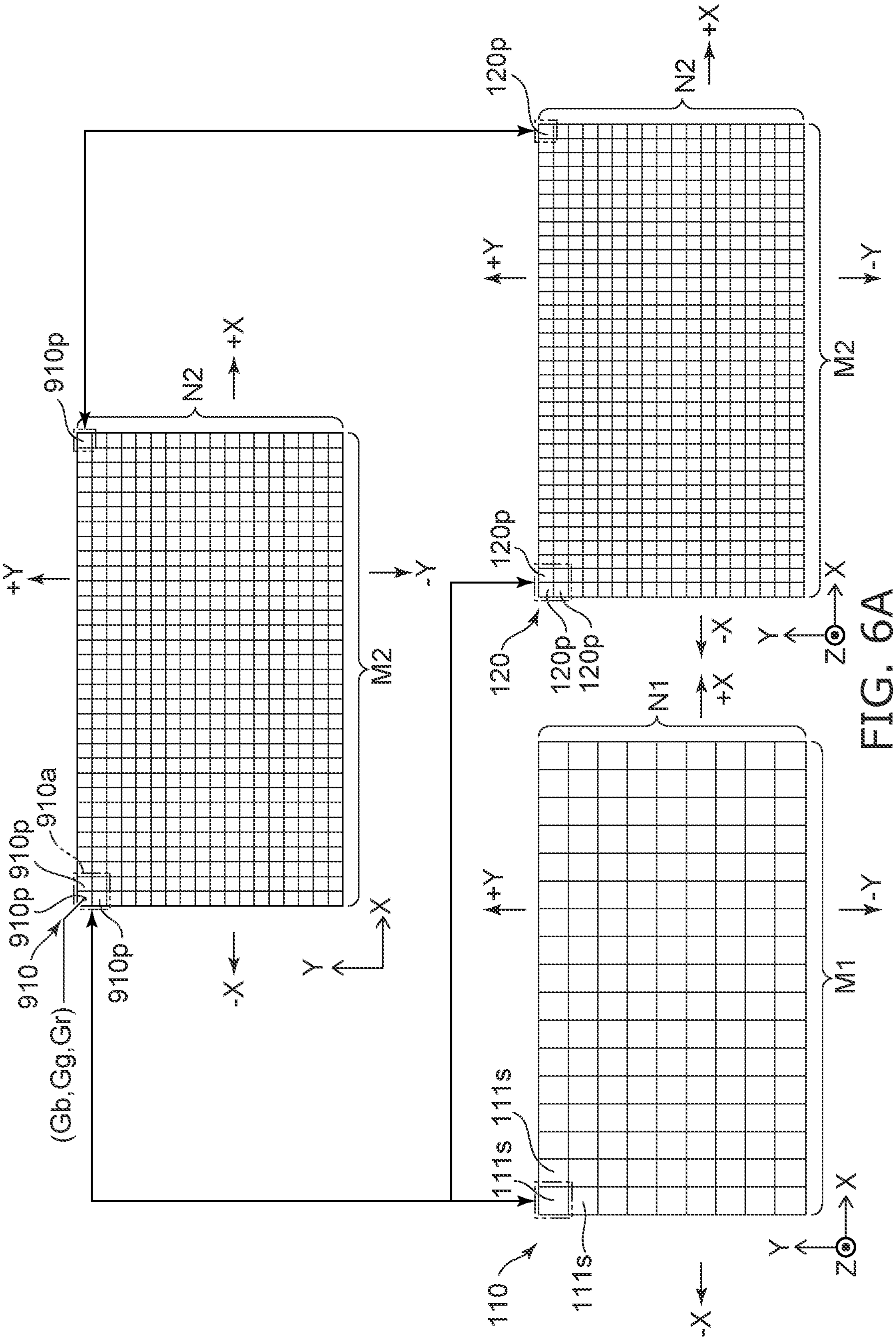
FIG. 6A schematically illustrates a relationship among pixels of an input image, light-emitting regions of the backlight, and pixels of the liquid crystal panel according to the first embodiment.

FIG. 6A schematically illustrates the relationship among the pixels of the input image, the light-emitting regions of the backlight, and the pixels of the liquid crystal panel according to the present embodiment.

Figure 6B:
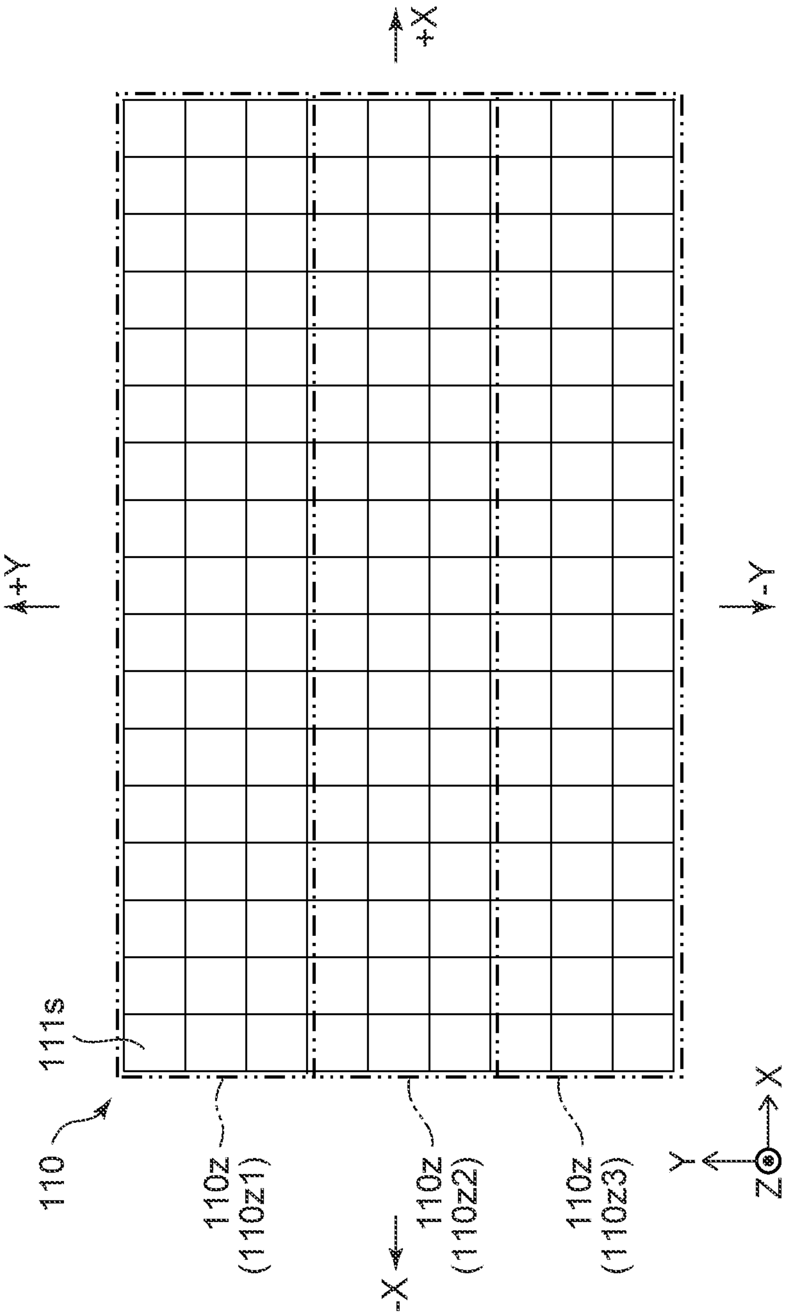
FIG. 6B schematically illustrates areas of the backlight of which outputs are simultaneously controlled according to the first embodiment.

FIG. 6B schematically illustrates areas of the backlight of which outputs are simultaneously controlled according to the present embodiment.

Figure 6C:
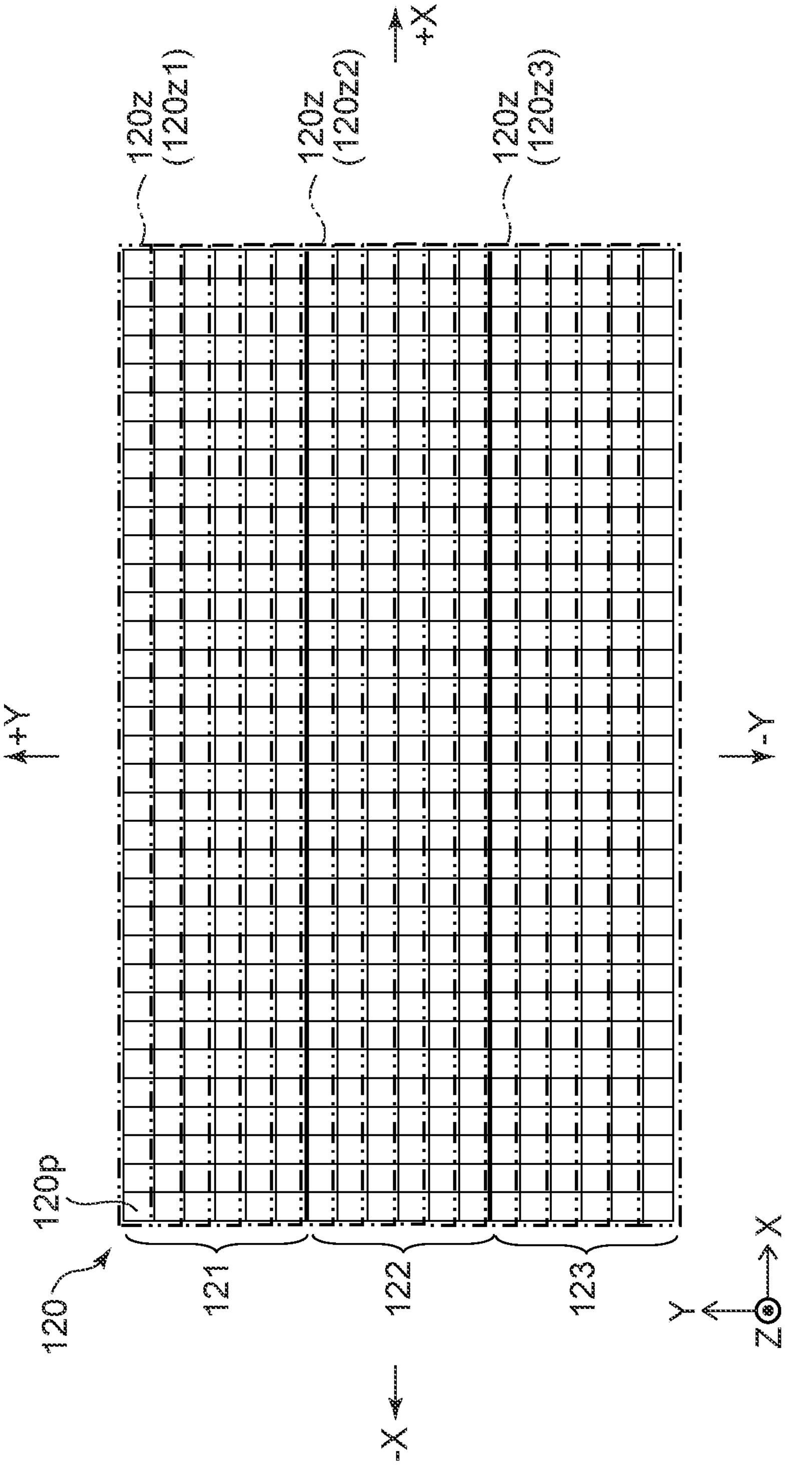
FIG. 6C schematically illustrates areas of the liquid crystal panel of which gradations are simultaneously controlled according to the first embodiment.

FIG. 6C schematically illustrates areas of the liquid crystal panel of which gradations are simultaneously controlled according to the present embodiment.

Figure 7:
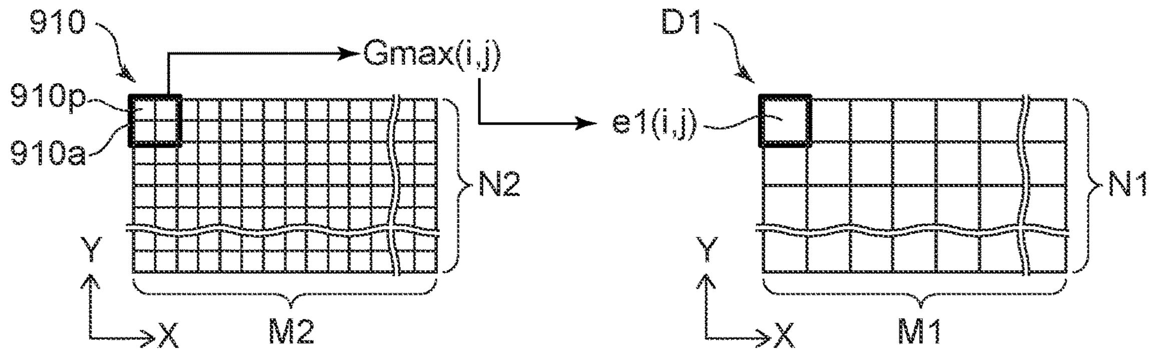
FIG. 7 is a diagram to explain a method for generating luminance setting data.

FIG. 7 is a diagram to explain a method for generating luminance setting data.

Figure 8:
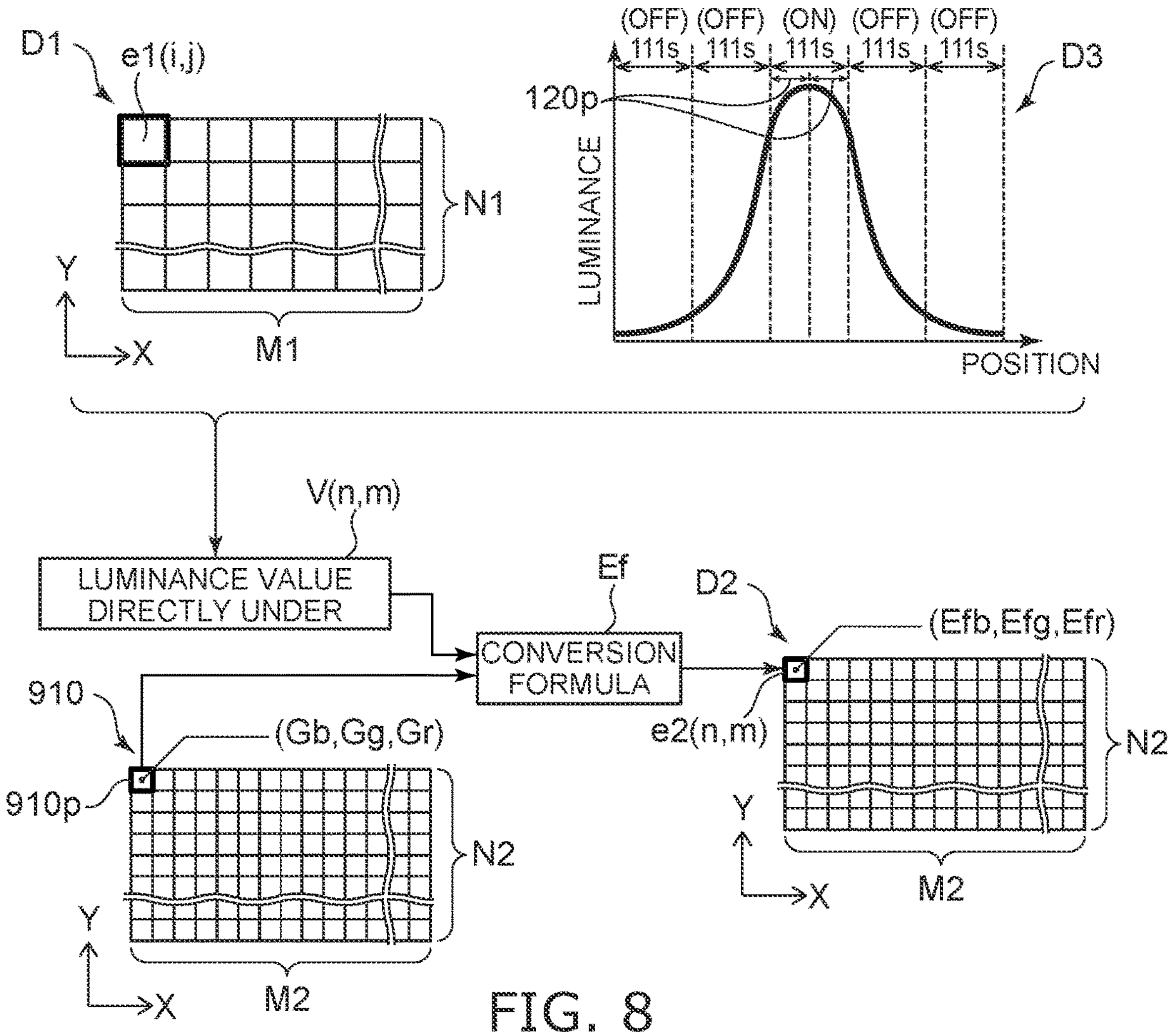
FIG. 8 is a diagram to explain a method for generating gradation setting data.

FIG. 8 is a diagram to explain a method for generating gradation setting data.

Figure 9A:
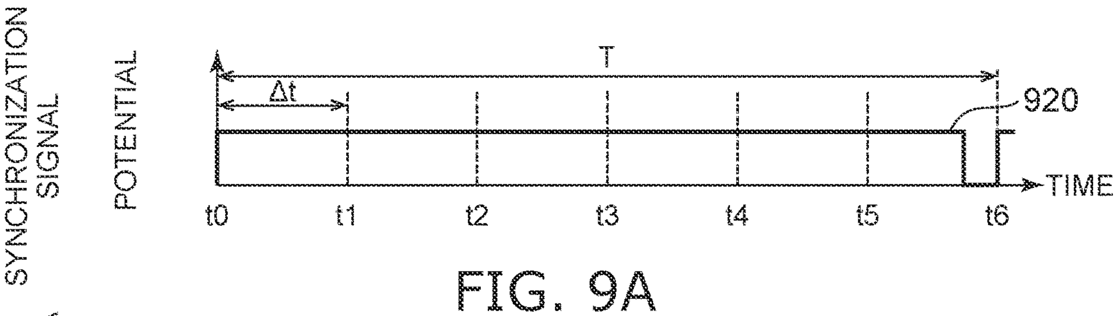
FIG. 9A is a timing chart showing a temporal change of a synchronization signal according to the first embodiment.

FIG. 9A is a timing chart showing the temporal change of a synchronization signal according to the present embodiment.

Figure 9B:
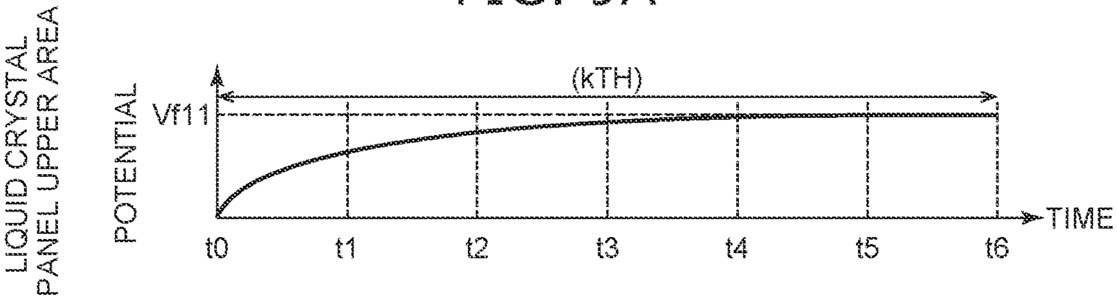
FIG. 9B is a timing chart showing a temporal change of a potential of a pixel belonging to an upper area of the liquid crystal panel according to the first embodiment.

FIG. 9B is a timing chart showing the temporal change of the potential of a pixel belonging to the upper area of the liquid crystal panel according to the present embodiment.

Figure 9C:
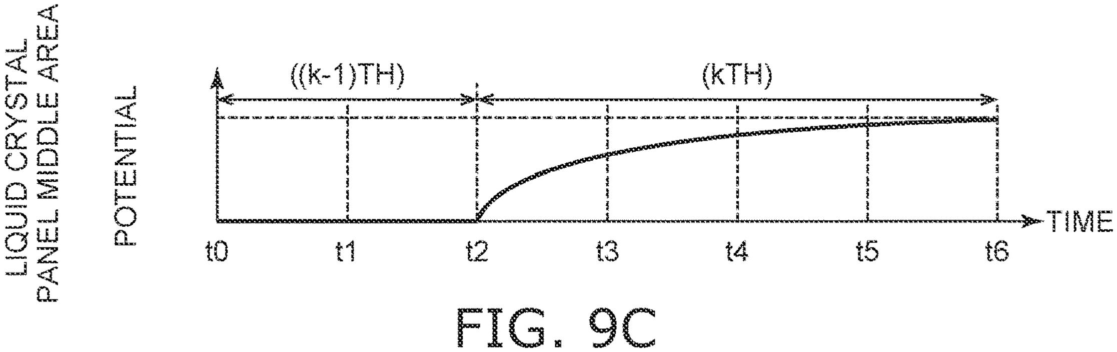
FIG. 9C is a timing chart showing a temporal change of a potential of a pixel belonging to a middle area of the liquid crystal panel according to the first embodiment.

FIG. 9C is a timing chart showing the temporal change of the potential of a pixel belonging to the middle area of the liquid crystal panel according to the present embodiment.

Figure 9D:
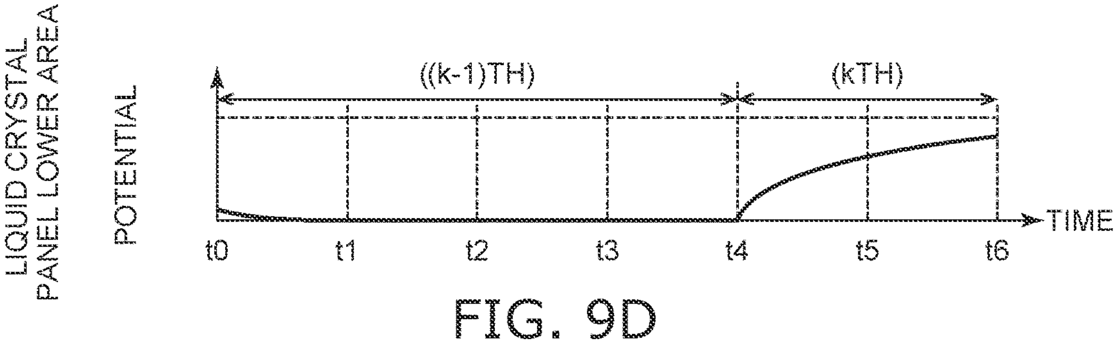
FIG. 9D is a timing chart showing a temporal change of a potential of a pixel belonging to a lower area of the liquid crystal panel according to the first embodiment.

FIG. 9D is a timing chart showing the temporal change of the potential of a pixel belonging to the lower area of the liquid crystal panel according to the present embodiment.

Figure 9E:
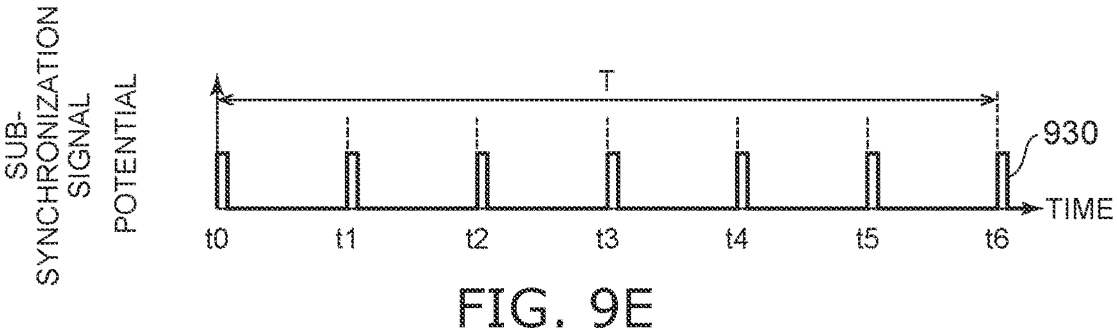
FIG. 9E is a timing chart showing a temporal change of a sub-synchronization signal according to the first embodiment.

FIG. 9E is a timing chart showing the temporal change of a sub-synchronization signal according to the present embodiment.

Figure 9F:
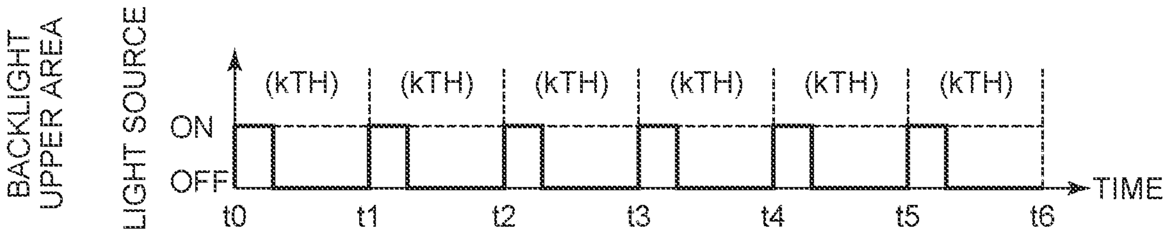
FIG. 9F is a timing chart showing a timing of controlling an output of a light source belonging to the upper area of the backlight according to the first embodiment.

FIG. 9F is a timing chart showing the timing of controlling the output of a light source belonging to the upper area of the backlight according to the present embodiment.

Figure 9G:
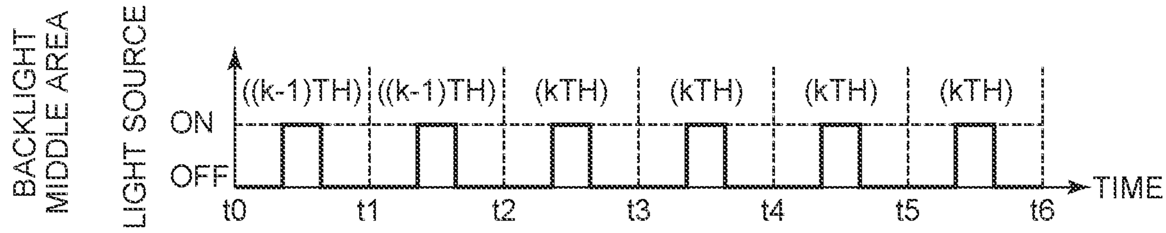
FIG. 9G is a timing chart showing a timing of controlling an output of a light source belonging to the middle area of the backlight according to the first embodiment.

FIG. 9G is a timing chart showing the timing of controlling the output of a light source belonging to the middle area of the backlight according to the present embodiment.

Figure 9H:
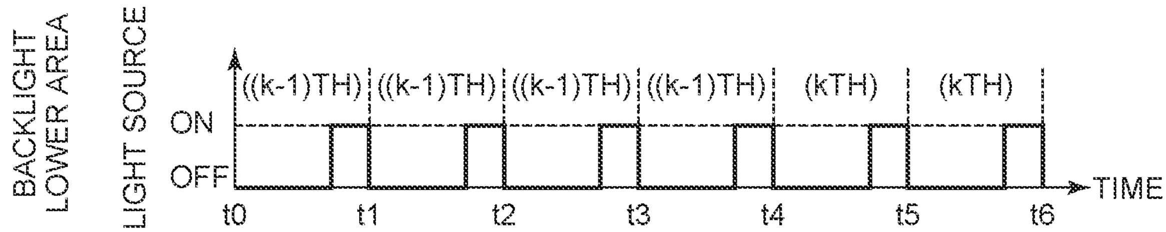
FIG. 9H is a timing chart showing a timing of controlling an output of a light source belonging to the lower area of the backlight according to the first embodiment.

FIG. 9H is a timing chart showing the timing of controlling the output of a light source belonging to the lower area of the backlight according to the present embodiment.

Timing Controller

The timing controller 140 is connected to an external device. Also, as shown in FIG. 5, the timing controller 140 is connected to the backlight driver 150 and the liquid crystal panel driver 160.

The timing controller 140 includes an input module 141, a luminance setting data generator 142, a gradation setting data generator 143, storage 144, a sub-synchronization signal generator 145, a control signal generator 146, and an output module 147.

The input module 141 includes, for example, an input interface connected to the external device. The input module 141 receives a synchronization signal 920 and data of multiple frames of input images 910 from the external device.

As shown in FIG. 6A, each input image 910 includes multiple pixels 910*p* arranged in a matrix configuration. For easier understanding of the relationship with the elements of the image display device 100 hereinbelow, an XY orthogonal coordinate system is used to represent the arrangement directions of the elements in image data of images such as the input image 910 in which elements such as the pixels 910*p*, etc., are arranged in a matrix configuration.

In an example below, one pixel 910*p* of the input image 910 corresponds to one pixel 120*p* of the liquid crystal panel 120. In other words, the multiple pixels 910*p* are arranged in N2 rows and M2 columns. In the input image 910, four pixels 910*p* are included in an image area 910*a* corresponding to one light-emitting region 111*s* of the backlight 110. However, the correspondence between the pixels of the input image and the pixels of the liquid crystal panel may not be one-to-one. Also, the number of pixels of the input image corresponding to each light-emitting region may be more or less than four.

The gradation is set for each pixel 910*p*. According to the present embodiment, the input image 910 is a color image. Therefore, a blue gradation Gb, a green gradation Gg, and a red gradation Gr are set for each pixel 910*p*. For example, each of the gradations Gb, Gg, and Gr is a numeral that is not less than 0 and not more than 255 when represented using 8 bits.

The synchronization signal 920 is a signal that indicates the timing of switching the input image 910 displayed in the liquid crystal panel 120. As shown in FIG. 9A, the synchronization signal 920 is a pulse signal, e.g., a vertical synchronization signal.

As shown in FIG. 7, the luminance setting data generator 142 uses each input image 910 to generate luminance setting data D1 in which the setting values of the luminances of the light sources 116 of the backlight 110 are determined.

Specifically, the luminance setting data generator 142 extracts a maximum value Gmax(i, j) of the gradations of the multiple pixels 910*p* in the image area 910*a* of the input image 910 corresponding to the light-emitting region 111*s* positioned at the ith row and the jth column. Here, i is an integer that is not less than 1 and not more than N1, and j is an integer that is not less than 1 and not more than M1. The luminance setting data generator 142 converts the extracted maximum value Gmax(i, j) of the gradations into a luminance e1(i, j). The luminance setting data generator 142 uses the luminance e1(i, j) as the value of the element positioned at the ith row and the jth column of the luminance setting data D1. The luminance setting data generator 142 performs this processing for all of the light-emitting regions 111*s*.

The luminance setting data D1 thus obtained is data of a matrix configuration that includes N1 rows and M1 columns. The value of the element of the luminance setting data D1 at the ith row and the jth column is the setting value of the luminance of the light-emitting region 111*s* positioned at the ith row and the jth column. However, the method for generating the luminance setting data is not limited to that described above.

As shown in FIG. 8, the gradation setting data generator 143 uses the luminance setting data D1, a luminance profile D3, and each input image 910 to generate gradation setting data D2 in which the setting values of the gradations of the pixels 120*p* of the liquid crystal panel 120 are set. The luminance profile D3 is data that shows the luminance distribution at each position on the XY plane when the light source 116 of one light-emitting region 111*s* is lit. In FIG. 8, ON means that the light source 116 of the light-emitting region 111*s* is lit; and OFF means that the light source 116 of the light-emitting region 111*s* is unlit.

The gradation setting data generator 143 estimates a luminance value V(n, m) directly under the pixel 120*p* positioned at the nth row and the mth column of the liquid crystal panel 120 from the luminance setting data D1 and the luminance profile D3 by including both the luminance distribution in one light-emitting region 111*s* and light leakage from peripheral light-emitting regions 111*s* at the periphery of the one light-emitting region 111*a*. Here, n is an integer that is not less than 1 and not more than N2; and m is an integer that is not less than 1 and not more than M2.

The gradation setting data generator 143 substitutes the estimated luminance value V(n, m) and the blue gradation Gb of the pixel 910*p* corresponding to the pixel 120*p* of the input image 910 in a conversion formula Ef. The conversion formula Ef is, for example, a conversion formula that converts the luminance into the gradation based on gamma correction. An output value Efb of the conversion formula Ef obtained by substituting the blue gradation Gb in the conversion formula Ef is used by the gradation setting data generator 143 as the setting value of the blue gradation of the pixel 120*p*. Similar processing is performed also for the green gradation Gg; and an output value Efg of the conversion formula Ef obtained thereby is used as the setting value of the green gradation of the pixel 120*p*. The gradation setting data generator 143 performs similar processing also for the red gradation Gr; and an output value Efr of the conversion formula Ef obtained thereby is used as the setting value of the red gradation of the pixel 120*p*. The gradation setting data generator 143 uses the output values Efb, Efg, and Efr of the conversion formula Ef as the value of an element e2(n, m) positioned at the nth row and the mth column of the gradation setting data D2. The gradation setting data generator 143 performs this processing for all of the pixels 120*p* of the liquid crystal panel 120.

The gradation setting data D2 thus obtained is data of a matrix configuration of N2 rows and M2 columns. The three values Efb, Efg, and Efr of the element e2(n, m) at the nth row and the mth column of the gradation setting data D2 correspond respectively to the setting value of the blue gradation, the setting value of the green gradation, and the setting value of the red gradation of the pixel 120*p* positioned at the nth row and the mth column of the liquid crystal panel 120. However, the method for generating the gradation setting data is not limited to that described above.

The luminance setting data generator 142 and the gradation setting data generator 143 include, for example, a processor such as a CPU (Central Processing Unit), etc.

The storage 144 stores various data and various programs necessary for controlling the backlight 110 and the liquid crystal panel 120 such as the input image 910, the luminance setting data D1, the gradation setting data D2, the luminance profile D3, etc. The storage 144 includes, for example, ROM (Read-Only Memory) and RAM (Random-Access Memory).

The sub-synchronization signal generator 145 uses the synchronization signal 920 to generate a sub-synchronization signal 930. Although details are described below, the sub-synchronization signal 930 is a signal that indicates the timing at which the backlight driver 150 starts processing of sequentially controlling the outputs of the light sources 116 in areas 110*z* of the backlight 110. As shown in FIG. 9E, the sub-synchronization signal 930 is, for example, a pulse signal. The sub-synchronization signal 930 is synchronous with the synchronization signal 920; and multiple pulses of the sub-synchronization signal 930 are included in one period T of the synchronization signal 920. According to the present embodiment, an example is shown in which six pulses of the sub-synchronization signal 930 are included in the one period T. The sub-synchronization signal generator 145 includes, for example, a generation circuit of a pulse signal.

The control signal generator 146 generates a control signal D1*a* of the backlight 110 based on the luminance setting data D1. The control signal D1*a* is, for example, a PWM (Pulse Width Modulation) signal. The control signal generator 146 includes, for example, a PWM signal generation circuit.

The output module 147 includes an output interface connected to the backlight 110, an output interface connected to the liquid crystal panel 120, etc. As shown in FIG. 5, the output module 147 outputs the sub-synchronization signal 930 and the control signal D1*a* of the backlight 110 to the backlight driver 150. Also, the output module 147 outputs the gradation setting data D2 to the liquid crystal panel driver 160 as a control signal D2*a* of the liquid crystal panel 120. The output module 147 also outputs the synchronization signal 920 to the liquid crystal panel driver 160. When it is necessary to convert the gradation setting data into a control signal of the liquid crystal panel, a control signal generator may convert the gradation setting data into a control signal of the liquid crystal panel; and the output module may output the control signal to the liquid crystal panel.

Backlight Driver

The backlight driver 150 includes a data storage 151, a driver 152, an area switching module 153, and a timing adjustment module 154.

The data storage 151 stores the control signal D1*a* to control the backlight 110. The data storage 151 includes, for example, a latch circuit that can store the control signal D1*a* to control the backlight 110.

When the backlight driver 150 controls the outputs of the light sources 116 of the light-emitting regions 111*s*, the backlight 110 is divided into multiple areas 110*z* arranged in the −Y direction as shown in FIG. 6B. At least one row of the light-emitting regions 111*s* is included in each area 110*z*. FIG. 6B shows an example in which the backlight 110 is divided into three areas 110*z*; and three rows of the light-emitting regions 111*s* are included in each area 110*z*. Hereinbelow, the area 110*z* among the three areas 110*z* that is positioned furthest toward the +Y side also is called an "upper area 110*z*1"; the area 110*z* positioned at the −Y side of the upper area 110*z*1 also is called a "middle area 110*z*2"; and the area 110*z* positioned at the −Y side of the middle area 110*z*2 also is called a "lower area 110*z*3". However, the number of areas of the backlight and the number of light-emitting regions included in each area are not limited to such numbers. For example, the number of backlight areas may be four or more.

The driver 152 can simultaneously drive the light sources 116 in one area 110*z*. The driver 152 includes, for example, a drive circuit of the multiple light sources 116.

The area switching module 153 switches the area 110*z* that is driven by the driver 152 sequentially in the −Y direction. For example, the area switching module 153 is located between the driver 152 and the backlight 110 and includes a switch element that can switch the area 110*z* driven by the driver 152.

The timing adjustment module 154 adjusts the timing of transmitting the control signal D1*a* corresponding to the kth input image 910 from the data storage 151 to the driver 152. Here, k is any integer not less than 1. The timing adjustment module 154 includes, for example, a shift register circuit located between the data storage 151 and the driver 152. The functions of the timing adjustment module 154 are described below.

Liquid Crystal Panel Driver

The liquid crystal panel driver 160 includes a drive circuit configured to control the liquid crystal panel 120, etc.

When the liquid crystal panel driver 160 controls the gradations of the pixels 120*p* of the liquid crystal panel 120, the liquid crystal panel 120 is divided into multiple areas 120*z* arranged in the −Y direction as shown in FIG. 6C. Each area 120*z* includes one row of the pixels 120*p*. Hereinbelow, the part of the liquid crystal panel 120 positioned directly above the upper area 110*z*1 of the backlight 110 is called an "upper part 121". The part of the liquid crystal panel 120 positioned directly above the middle area 110z2 of the backlight 110 is called a "middle part 122". The part of the liquid crystal panel 120 positioned directly above the lower area 110z3 of the backlight 110 is called a "lower part 123".

The area 120z among the multiple areas 120z included in the upper part 121 positioned furthest toward the +Y side also is called an "upper area 120z1". The area 120z among the multiple areas 120z included in the middle part 122 positioned furthest toward the +Y side also is called a "middle area 120z2". The area 120z among the multiple areas 120z included in the lower part 123 positioned furthest toward the +Y side also is called a "lower area 120z3".

For example, the liquid crystal panel driver 160 starts processing of switching the voltages applied to the pixels 120p according to one input image 910 at the timing of the rise of the synchronization signal 920. At this time, the liquid crystal panel driver 160 simultaneously drives the pixels 120p of one area 120z. Then, the liquid crystal panel driver 160 switches the area 120z that is driven sequentially in the −Y direction. Accordingly, "the processing of switching the voltages applied to the pixels 120p of the liquid crystal panel 120" means the series of processing of switching the voltages applied to the pixels 120p of the liquid crystal panel 120 sequentially in the −Y direction for each of the areas 120z.

When k=1, the timing adjustment module 154 of the backlight driver 150 does not transmit the control signal D1a to the driver 152 for any of the areas 120z of the liquid crystal panel 120 positioned directly above the area 110z selected by the area switching module 153 when the switching to the voltages of the pixels 120p corresponding to the first input image 910 is not started. In such a case, the driver 152 does not drive the area 110z. The timing adjustment module 154 transmits the control signal D1a corresponding to the first input image 910 to the driver 152 for all of the areas 120z positioned directly above the area 110z selected by the area switching module 153 when starting the switching to the voltages of the pixels 120p corresponding to the first input image 910. Accordingly, in such a case, the outputs of the light sources 116 of the light-emitting regions 111s of the area 110z switch to the outputs corresponding to the control signal D1a corresponding to the first input image 910.

In the case where k≥2, the timing adjustment module 154 transmits the control signal D1a corresponding to the (k−1)th input image 910 of the area 110z to the driver 152 for all of the areas 120z positioned directly above the area 110z selected by the area switching module 153 when the switching to the voltages of the pixels 120p corresponding to the kth input image 910 is not started. Accordingly, in such a case, the outputs of the light sources 116 of the light-emitting regions 111s belonging to the area 110z are switched to the outputs corresponding to the (k−1)th input image 910. The timing adjustment module 154 transmits the control signal D1a corresponding to the kth input image 910 of the area 110z to the driver 152 for all of the areas 120z positioned directly above the area 110z selected by the area switching module 153 when starting the switching to the voltages of the pixels 120p corresponding to the kth input image 910. Accordingly, in such a case, the outputs of the light sources 116 of the light-emitting regions 111s included in the area 110z are switched to the outputs corresponding to the kth input image 910.

An image display method that uses the image display device 100 according to the present embodiment will now be described.

First, the timing controller 140 generates the luminance setting data D1 for the kth input image 910. Then, the timing controller 140 converts the luminance setting data D1 into the control signal D1a to control the backlight 110. Then, the timing controller 140 outputs the control signal D1a and the sub-synchronization signal 930 to the backlight driver 150.

The timing controller 140 generates the gradation setting data D2 for the kth input image 910. Then, the timing controller 140 uses the gradation setting data D2 as the control signal D2a and outputs the control signal D2a and the synchronization signal 920 to the liquid crystal panel driver 160.

Then, the liquid crystal panel driver 160 switches the voltages applied to the pixels 120p of the liquid crystal panel 120 based on the control signal D2a corresponding to the kth input image 910; and the backlight driver 150 switches the outputs of the light sources 116 of the light-emitting regions 111s of the backlight 110 based on the control signal D1a corresponding to the kth input image 910. This process will now be elaborated.

A case where k≥2 will now be described. The control signal D2a that corresponds to the kth input image 910 is called simply the "kth control signal D2a". Similarly, the control signal D1a that corresponds to the kth input image 910 is called simply the "kth control signal D1a". Hereinbelow, the time of the initial rise of the synchronization signal 920 in FIG. 9A is taken as "t0". The interval of the one period T of the synchronization signal 920 divided by the number of pulses of the sub-synchronization signal 930 included in the one period T, i.e., six, is called a "unit interval Δt". Also, the times as the unit interval Δt elapses from the time to are referred to as "time t1", "time t2", "time t3", "time t4", "time t5", and "time t6" in this order. According to the embodiment, the time t6 of one period T is the time to of the next one period T.

First, when the rise of the synchronization signal 920 is detected at the time to, the liquid crystal panel driver 160 starts the processing of switching the voltages applied to the pixels 120p according to the kth control signal D2a. In this processing, the liquid crystal panel driver 160 switches the voltages applied to the multiple pixels 120p from the values corresponding to the (k−1)th control signal D2a to the values corresponding to the kth control signal D2a sequentially in the −Y direction for each of the areas 120z.

Accordingly, first, as shown in FIG. 9B, the potentials of the pixels 120p belonging to the upper area 120z1 of the liquid crystal panel 120 start to switch to the values corresponding to the kth control signal D2a at substantially the time to. The potentials of the pixels 120p gradually reach a target potential Vf11 corresponding to the kth control signal D2a.

As shown in FIG. 9E, the sub-synchronization signal 930 rises at the time to.

An example will now be described in which the light sources 116 of the light-emitting regions 111s are lit when the backlight driver 150 controls the outputs of the light sources 116 of the light-emitting regions 111s. However, depending on the specific image data of the input image 910, the light sources 116 may be unlit when the backlight driver 150 controls the outputs of the light sources 116 according to the control signal D1a.

When the rise of the sub-synchronization signal 930 is detected, the backlight driver 150 performs processing of controlling the outputs of the light sources 116 of the light-emitting regions 111s sequentially in the −Y direction for each of the areas 110z as shown in FIGS. 9F to 9H. In other words, between the time to and the time t1, the backlight driver 150 performs the control of the outputs of the light sources 116 of the upper area 110*z*1, the control of the outputs of the light sources 116 of the middle area 110*z*2, and the control of the outputs of the light sources 116 of the lower area 110*z*3 in this order.

At this time, for each area 110*z*, the backlight driver 150 switches the outputs of the light sources 116 included in the area 110*z* to the outputs corresponding to the (k−1)th control signal D1*a* for all of the areas 120*z* of the liquid crystal panel 120 positioned directly above the area 110*z* when the switching of the voltages applied to the pixels 120*p* is not started. Also, for each area 110*z*, the backlight driver 150 switches the outputs of the light sources 116 included in the area 110*z* to the outputs corresponding to the kth control signal D1*a* for at least one area 120*z* of the liquid crystal panel 120 positioned directly above the area 110*z* when starting the switching of the voltages applied to the pixels 120*p*.

Between the time to and the time t1 as shown in FIG. 9B, the switching of the voltages applied to the pixels 120*p* to the values corresponding to the kth control signal D2*a* in the upper area 120*z*1 of the liquid crystal panel 120 is started. On the other hand, as shown in FIGS. 9C and 9D, the switching of the voltages applied to the pixels 120*p* to the values corresponding to the kth control signal D2*a* is not started for the middle area 120*z*2 and the lower area 120*z*3 of the liquid crystal panel 120. Accordingly, between the time to and the time t1 as shown in FIGS. 9F to 9H, the backlight driver 150 switches the outputs of the light sources 116 of the upper area 110*z*1 of the backlight 110 to the outputs corresponding to the kth control signal D1*a*, and switches the outputs of the light sources 116 of the middle area 110*z*2 and the lower area 110*z*3 to the outputs corresponding to the (k−1)th control signal D1*a*.

Then, as shown in FIG. 9E, the sub-synchronization signal 930 rises again at the time t1.

When the rise of the sub-synchronization signal 930 is detected, the backlight driver 150 again performs the processing of controlling the outputs of the light sources 116 of the light-emitting regions 111*s* sequentially in the −Y direction for each of the areas 110*z* as shown in FIGS. 9F to 9H.

Between the time t1 and the time t2 as shown in FIGS. 9F to 9H, similarly to the time t0 to the time t1, the backlight driver 150 switches the outputs of the light sources 116 of the upper area 110*z*1 of the backlight 110 to the outputs corresponding to the kth control signal D1*a*, and switches the outputs of the light sources 116 of the middle area 110*z*2 and the lower area 110*z*3 to the outputs corresponding to the (k−1)th control signal D1*a*.

Figure 10A:
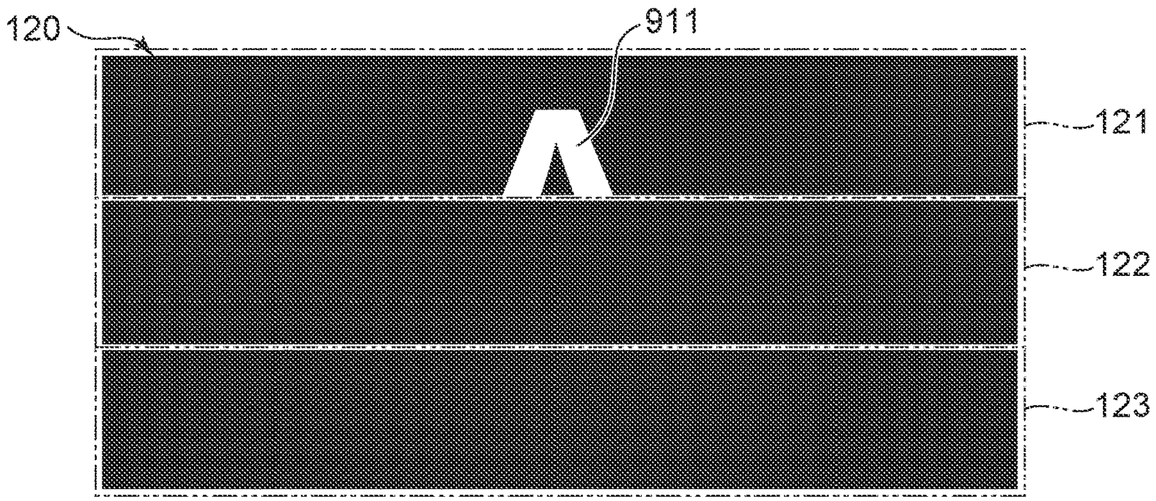
FIG. 10A is a schematic diagram showing an image displayed in the liquid crystal panel between the time t1 and the time t2 in FIG. 9A.

FIG. 10A is a schematic diagram showing an image displayed in the liquid crystal panel between the time t1 and the time t2 of FIG. 9A.

Figure 10B:
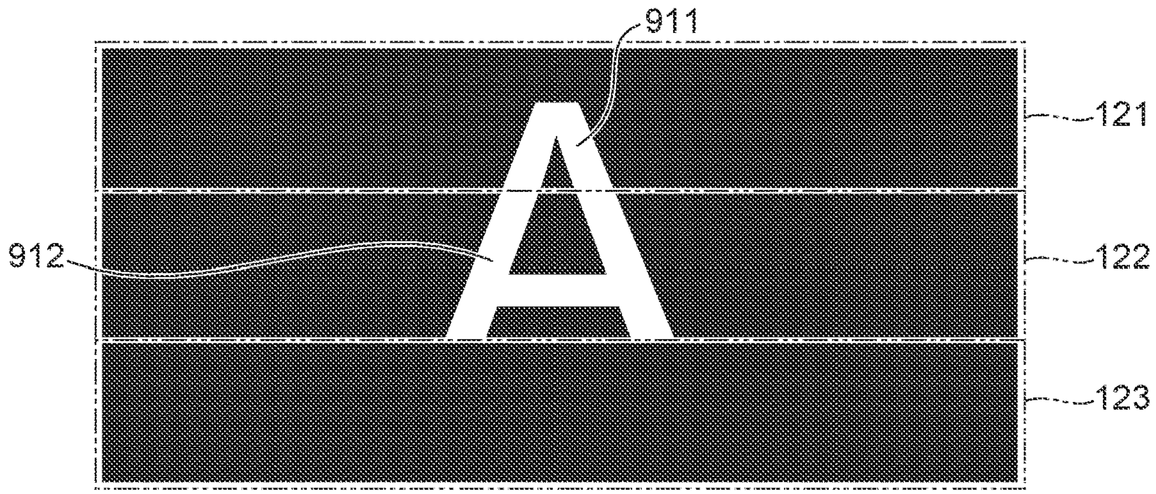
FIG. 10B is a schematic diagram showing an image displayed in the liquid crystal panel between the time t3 and the time t4 in FIG. 9A.

FIG. 10B is a schematic diagram showing an image displayed in the liquid crystal panel between the time t3 and the time t4 of FIG. 9A.

Figure 10C:
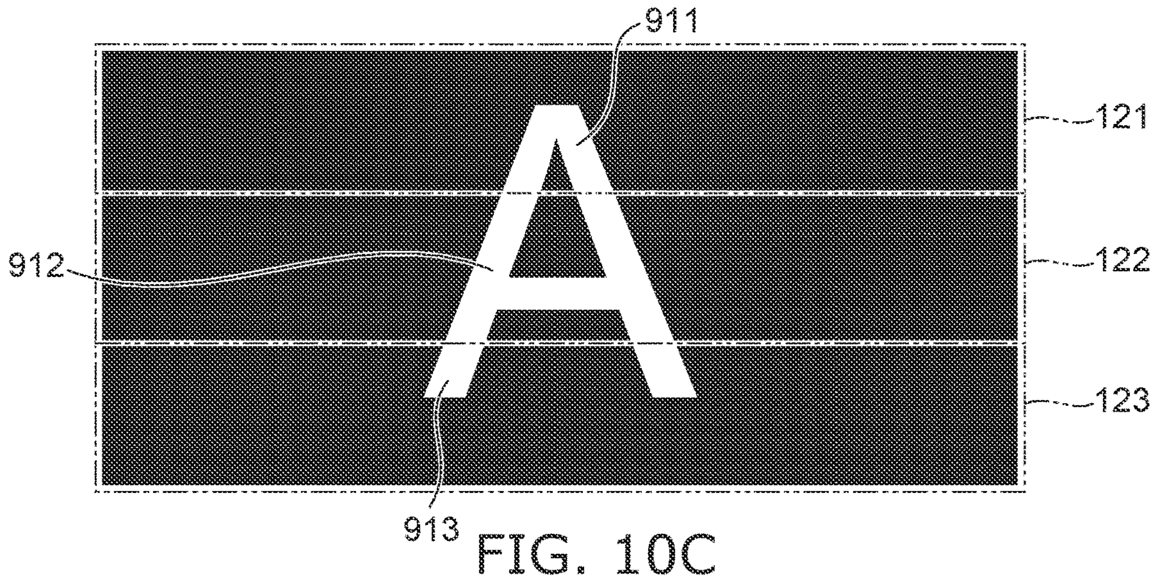
FIG. 10C is a schematic diagram showing an image displayed in the liquid crystal panel between the time t5 and the time t6 in FIG. 9A.

FIG. 10C is a schematic diagram showing an image displayed in the liquid crystal panel between the time t5 and the time t6 of FIG. 9A.

An example will now be described in which the (k−1)th input image 910 is an image in which the entire screen is black, and the kth input image 910 is an image in which a white character "A" is displayed on a black background.

Between the time t1 and the time t2 as shown in FIG. 10A, an upper part 911 of the character "A" corresponding to the kth input image 910 is displayed in the upper part 121 of the liquid crystal panel 120; and a black image corresponding to the (k−1)th input image 910 is displayed in the middle part 122 and the lower part 123 of the liquid crystal panel 120. At this time, the luminance directly under the upper part 121 of the liquid crystal panel 120 has a value corresponding to the image displayed in the upper part 121; and the luminances directly under the middle part 122 and the lower part 123 have values corresponding to the images displayed in the middle part 122 and the lower part 123. Thus, the image displayed in the liquid crystal panel 120 and the luminance of the backlight 110 can be matched.

Then, at substantially the time t2 as shown in FIG. 9C, the potentials of the pixels 120*p* of the middle area 120*z*2 of the liquid crystal panel 120 start to switch to the values corresponding to the kth control signal D2*a*.

Also, as shown in FIG. 9E, the sub-synchronization signal 930 rises again at the time t2.

When the rise of the sub-synchronization signal 930 is detected, the backlight driver 150 again performs the processing of controlling the outputs of the light sources 116 of the light-emitting regions 111*s* sequentially in the −Y direction for each of the areas 110*z*.

Between the time t2 and the time t3 as shown in FIGS. 9B and 9C, the switching of the voltages applied to the pixels 120*p* to the values corresponding to the kth control signal D2*a* is started in the upper area 120*z*1 and the middle area 120*z*2 of the liquid crystal panel 120. On the other hand, as shown in FIG. 9D, the switching of the voltages applied to the pixels 120*p* to the values corresponding to the kth control signal D2*a* is not started in the lower area 120*z*3 of the liquid crystal panel 120.

Accordingly, between the time t2 and the time t3 as shown in FIGS. 9F to 9H, the backlight driver 150 switches the outputs of the light sources 116 of the upper area 110*z*1 and the middle area 110*z*2 of the backlight 110 to the outputs corresponding to the kth control signal D1*a*, and switches the outputs of the light sources 116 of the lower area 110*z*3 to the outputs corresponding to the (k−1)th control signal D1*a*.

Then, as shown in FIG. 9E, the sub-synchronization signal 930 rises again at the time t3.

When the rise of the sub-synchronization signal 930 is detected, the backlight driver 150 again performs the processing of controlling the outputs of the light sources 116 of the light-emitting regions 111*s* sequentially in the −Y direction for each of the areas 110*z* as shown in FIGS. 9F to 9H.

Between the time t3 and the time t4 as shown in FIGS. 9F to 9H, similarly to the time t2 to the time t3, the backlight driver 150 switches the outputs of the light sources 116 of the upper area 110*z*1 and the middle area 110*z*2 of the backlight 110 to the outputs corresponding to the kth control signal D1*a* and switches the outputs of the light sources 116 of the lower area 110*z*3 to the outputs corresponding to the (k−1)th control signal D1*a*.

Between the time t3 and the time t4 as shown in FIG. 10B, the upper part 911 and a middle part 912 of the character "A" are displayed according to the kth input image 910 in the upper part 121 and the middle part 122 of the liquid crystal panel 120. In the lower part 123 of the liquid crystal panel 120, the black image continues to be displayed according to the (k−1)th input image 910. The luminances directly under the upper part 121 and the middle part 122 of the liquid crystal panel 120 have the values corresponding to the images displayed in the upper part 121 and the middle part 122; and the luminance directly under the lower part 123 has the value corresponding to the image displayed in the lower part 123. Thus, the image displayed in the liquid crystal panel 120 and the luminance of the backlight 110 can be matched.

Then, as shown in FIG. 9D, the potentials of the pixels 120*p* of the lower area 120*z*3 of the liquid crystal panel 120 start to switch to the values corresponding to the kth control signal D2*a* at substantially the time t4.

As shown in FIG. 9E, the sub-synchronization signal 930 rises again at the time t4.

When the rise of the sub-synchronization signal 930 is detected as shown in FIGS. 9F to 9H, the backlight driver 150 again performs the processing of controlling the outputs of the light sources 116 of the light-emitting regions 111*s* sequentially in the −Y direction for each of the areas 110*z*.

Between the time t4 and the time t5 as shown in FIGS. 9B to 9D, the switching of the voltages applied to the pixels 120*p* to the values corresponding to the kth control signal D2*a* starts in the upper area 120*z*1, the middle area 120*z*2, and the lower area 120*z*3 of the liquid crystal panel 120. Accordingly, between the time t4 and the time t5 as shown in FIGS. 9F to 9H, the backlight driver 150 switches the outputs of the light sources 116 to the outputs corresponding to the kth control signal D1*a* for all of the areas 110*z* of the backlight 110.

Then, as shown in FIG. 9E, the sub-synchronization signal 930 rises again at the time t5.

When the rise of the sub-synchronization signal 930 is detected, the backlight driver 150 again performs the processing of controlling the outputs of the light sources 116 of the light-emitting regions 111*s* sequentially in the −Y direction for each of the areas 110*z* as shown in FIGS. 9F to 9H.

Between the time t5 and the time t6 as shown in FIGS. 9F to 9H, similarly to the time t4 to the time t5, the backlight driver 150 switches the outputs of the light sources 116 to the outputs corresponding to the kth control signal D1*a* for all of the areas 110*z* of the backlight 110.

Between the time t5 and the time t6 as shown in FIG. 10C, the upper part 911, the middle part 912, and a lower part 913 of the character "A" are displayed according to the kth input image 910 in the upper part 121, the middle part 122, and the lower part 123 of the liquid crystal panel 120. In other words, the entire character "A" is displayed. At this time, the luminances directly under the upper part 121, the middle part 122, and the lower part 123 of the liquid crystal panel 120 have values corresponding to the images displayed in the upper part 121, the middle part 122, and the lower part 123. Thus, the image displayed in the liquid crystal panel 120 and the luminance of the backlight 110 can be matched.

At and after the time t6, processing similar to the processing from the time t0 to the time t5 is repeatedly performed.

As described above, when the rise of the synchronization signal 920 is detected, the liquid crystal panel driver 160 starts the processing of switching the voltages applied to the pixels 120*p* to the values corresponding to the kth control signal D2*a* sequentially in the −Y direction for each of the areas 120*z*. Then, the liquid crystal panel driver 160 switches the voltages applied to all of the pixels 120*p* of the liquid crystal panel 120 to the values corresponding to the kth control signal D2*a* until the synchronization signal 920 rises again.

The backlight driver 150 repeatedly performs the processing of controlling the outputs of the light sources 116 of the light-emitting regions 111*s* sequentially in the −Y direction for each of the areas 110*z* during the one period T of the synchronization signal 920. For each area 110*z*, the outputs of the light sources 116 of the light-emitting regions 111*s* included in the area 110*z* are switched to the outputs corresponding to the kth input image 910 at or after starting the processing of switching the voltages applied to the pixels 120*p* positioned directly above the area 110*z* to the values corresponding to the kth input image 910.

Specifically, according to the present embodiment, for each area 110*z*, the outputs of the light sources 116 of the light-emitting regions 111*s* included in the area 110*z* are switched to the outputs corresponding to the (k−1)th input image 910 when the processing of switching the voltages applied to the pixels 120*p* positioned directly above the area 110*z* to the values corresponding to the kth input image 910 is not started. Also, for each area 110*z*, the outputs of the light sources 116 of the light-emitting regions 111*s* included in the area 110*z* are switched to the outputs corresponding to the kth input image 910 substantially simultaneously with the start of the processing of switching the voltages applied to the pixels 120*p* positioned directly above the area 110*z* to the values corresponding to the kth input image 910.

However, the image display method is not limited to the method described above. For example, the number of pulses of the sub-synchronization signal 930 per one period T of the synchronization signal 920 is not limited to six, and may be two or more. However, it is favorable for the number of pulses of the sub-synchronization signal 930 per one period T of the synchronization signal 920 to be an integer multiple of the total number of the areas 110*z* in the backlight 110.

Effects of the present embodiment will now be described.

According to the present embodiment, the image display method includes a process of switching the voltages applied to the pixels 120*p* of the liquid crystal panel 120 and the outputs of the light sources 116 of the light-emitting regions 111*s* of the backlight 110 according to each of the multiple input images 910. The backlight 110 is divided into the multiple areas 110*z* arranged in the −Y direction. Each area 110*z* includes the multiple light-emitting regions 111*s*. The liquid crystal panel 120 is divided into the multiple areas 120*z* arranged in the −Y direction. Each area 120*z* includes the multiple pixels 120*p*. In the process of switching the voltages applied to the pixels 120*p* to the outputs of the light sources 116 of the light-emitting regions 111*s* according to the kth input image 910 among the multiple input images 910, the voltages applied to the pixels 120*p* are switched to the values corresponding to the kth input image 910 sequentially in the −Y direction for each of the areas 120*z*. The processing of controlling the outputs of the light sources 116 of the light-emitting regions 111*s* sequentially in the Y-direction for each of the areas 110*z* is repeatedly performed while switching the voltages applied to the pixels 120*p* to the values corresponding to the kth input image 910. For each area 110*z*, the outputs of the light sources 116 of the light-emitting regions 111*s* included in the area 110*z* are switched to the outputs corresponding to the kth input image 910 at or after starting the processing of switching the voltages applied to the pixels 120*p* positioned directly above the area 110*z* to the values corresponding to the kth input image 910. Therefore, the image displayed in the liquid crystal panel 120 and the luminance of the backlight 110 can be easily matched. A high-quality image can be displayed thereby.

In the process of switching the voltages applied to the pixels 120*p* and the outputs of the light sources 116 of the light-emitting regions 111*s* according to the kth input image 910, for each area 110*z*, the outputs of the light sources 116 of the light-emitting regions 111*s* included in the area 110*z* are switched to the outputs corresponding to the (k−1)th input image 910 among the multiple input images 910 when the processing of switching the voltages applied to the pixels 120*p* positioned directly above the area 110*z* to the values corresponding to the kth input image 910 is not started.

Therefore, the image displayed in the liquid crystal panel 120 and the luminance of the backlight 110 can be easily matched. A high-quality image can be displayed thereby.

In the process of switching the voltages applied to the pixels 120*p* and the outputs of the light sources 116 of the light-emitting regions 111*s* according to the kth input image 910, the processing of switching the voltages applied to the pixels 120*p* of the liquid crystal panel 120 is started according to the synchronization signal 920 having the pulse form. The processing of controlling the outputs of the light sources 116 of the light-emitting regions 111*s* sequentially in the Y-direction for each of the areas 110*z* of the backlight 110 is started according to the sub-synchronization signal 930 that includes multiple pulses within the one period T of the synchronization signal 920. Therefore, the timing of switching the voltages applied to the pixels 120*p* of the liquid crystal panel 120 and the timing of switching the outputs of the light sources 116 of the backlight 110 can be adjusted by a simple method using the synchronization signal 920 and the sub-synchronization signal 930.

A modification of the planar light source will now be described.

Figure 11A:
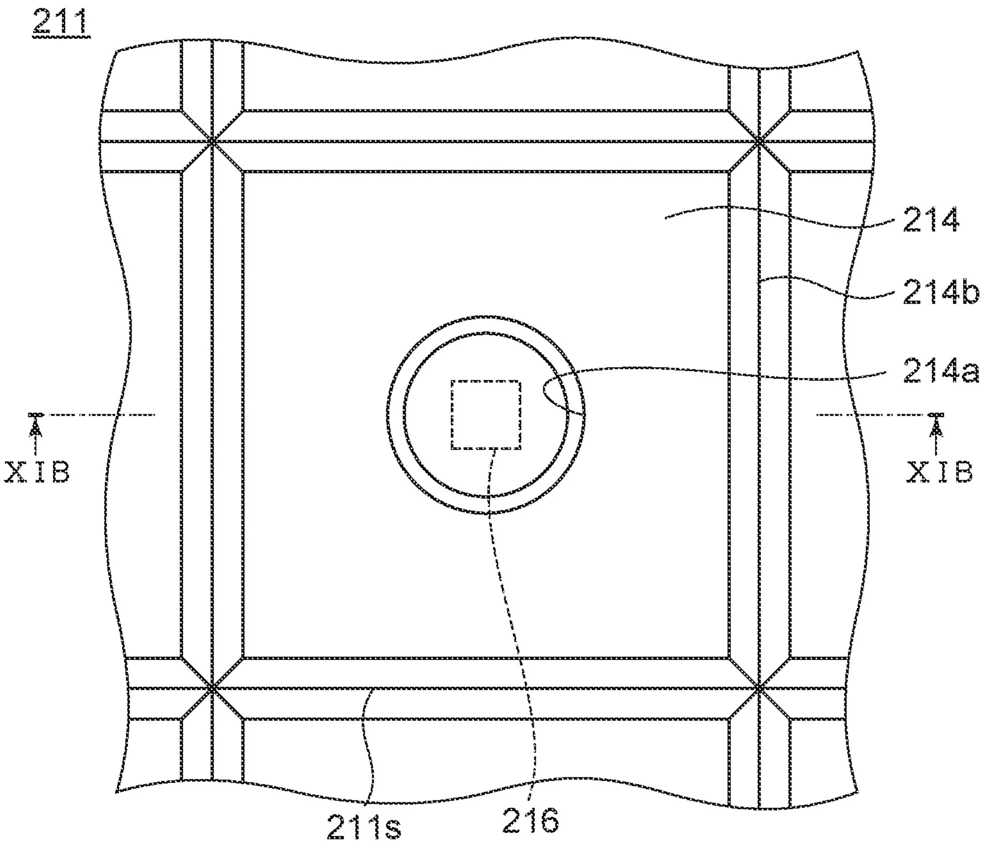
FIG. 11A illustrates a top view a planar light source according to a modification of the first embodiment.

FIG. 11A illustrates a top view of the planar light source according to the modification of the first embodiment.

Figure 11B:
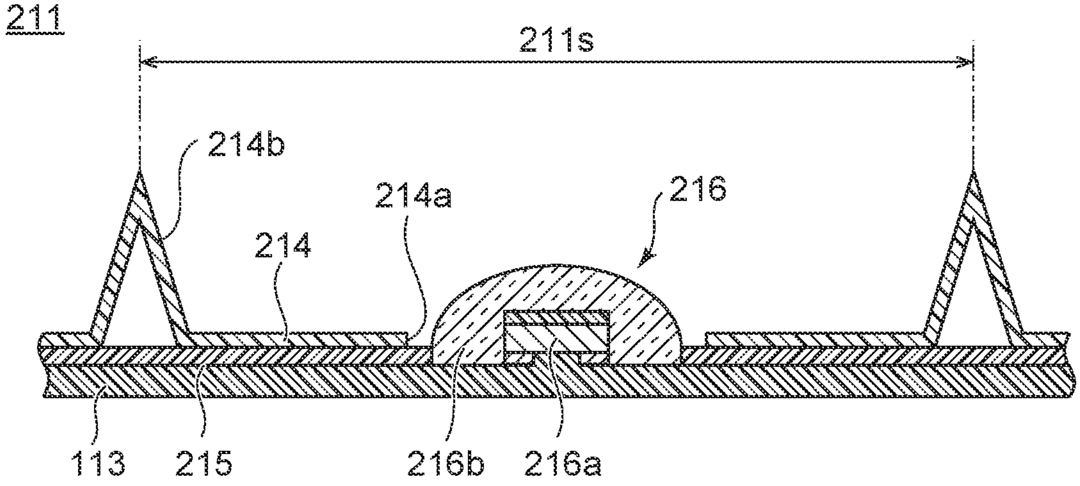
FIG. 11B illustrates a cross-sectional view of the planar light source along line XIB-XIB in FIG. 11A.

FIG. 11B illustrates a cross-sectional view of the planar light source along line XIB-XIB in FIG. 11A.

As a general rule in the following description, only the differences with the first embodiment described above are described. Other than the items described below, the modification is similar to the first embodiment described above. This is similar for other embodiments described below as well.

A planar light source 211 according to the modification includes the substrate 113, a bonding member 215, a light-reflective sheet 214, and multiple light sources 216.

The light-reflective sheet 214 is adhered to the substrate 113 by the bonding member 215. Multiple through-holes 214*a* are provided in the light-reflective sheet 214. The multiple through-holes 214*a* are arranged in a matrix configuration in the X-direction and the Y-direction. The light source 216 is located in each through-hole 214*a*.

The light-reflective sheet 214 includes a bent part 214*b* that surrounds the through-holes 214*a*, i.e., the light sources 216. The bent part 214*b* is made by folding the light-reflective sheet 214 so that the light-reflective sheet 214 protrudes upward. One region of the planar light source 211 surrounded with the upper end of the bent part 214*b* corresponds to one light-emitting region 211*s*.

A resin sheet (e.g., a resin foam sheet) that includes many bubbles, a resin sheet that includes a light-diffusing material, etc., can be used as the light-reflective sheet 214. For example, a thermoplastic resin such as an acrylic resin, a polycarbonate resin, a cyclic polyolefin resin, a polyethylene terephthalate resin, a polyester resin, or the like, a thermosetting resin such as an epoxy resin or a silicone resin, etc., are examples of the resin included in the light-reflective sheet 214. Titanium oxide, silica, alumina, zinc oxide, glass, etc., are examples of the light-diffusing material included in the light-reflective sheet 214.

Each light source 216 includes a light-emitting element 216*a* and a wavelength conversion member 216*b*. The light-emitting element 216*a* is electrically connected to the substrate 113. The wavelength conversion member 216*b* covers the side surfaces and the upper surface of the light-emitting element 216*a*.

As described above, the structure of the planar light source is not limited to the structure of the above embodiment as long as the light-emitting regions are arranged in a matrix configuration.

Second Embodiment

A second embodiment will now be described.

Figure 12A:
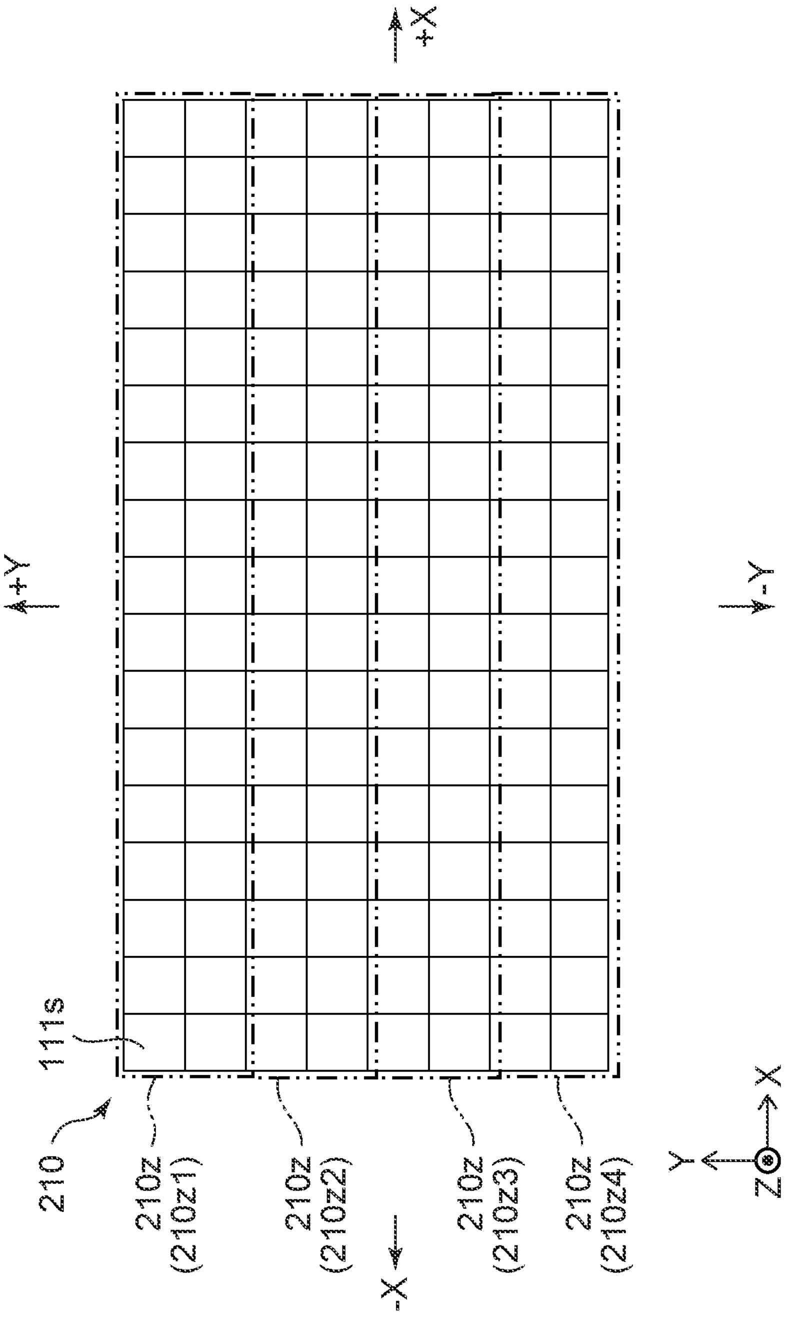
FIG. 12A schematically illustrates areas of a backlight according to a second embodiment of which outputs are simultaneously controlled.

FIG. 12A schematically illustrates areas of a backlight according to the second embodiment of which outputs are simultaneously controlled.

Figure 12B:
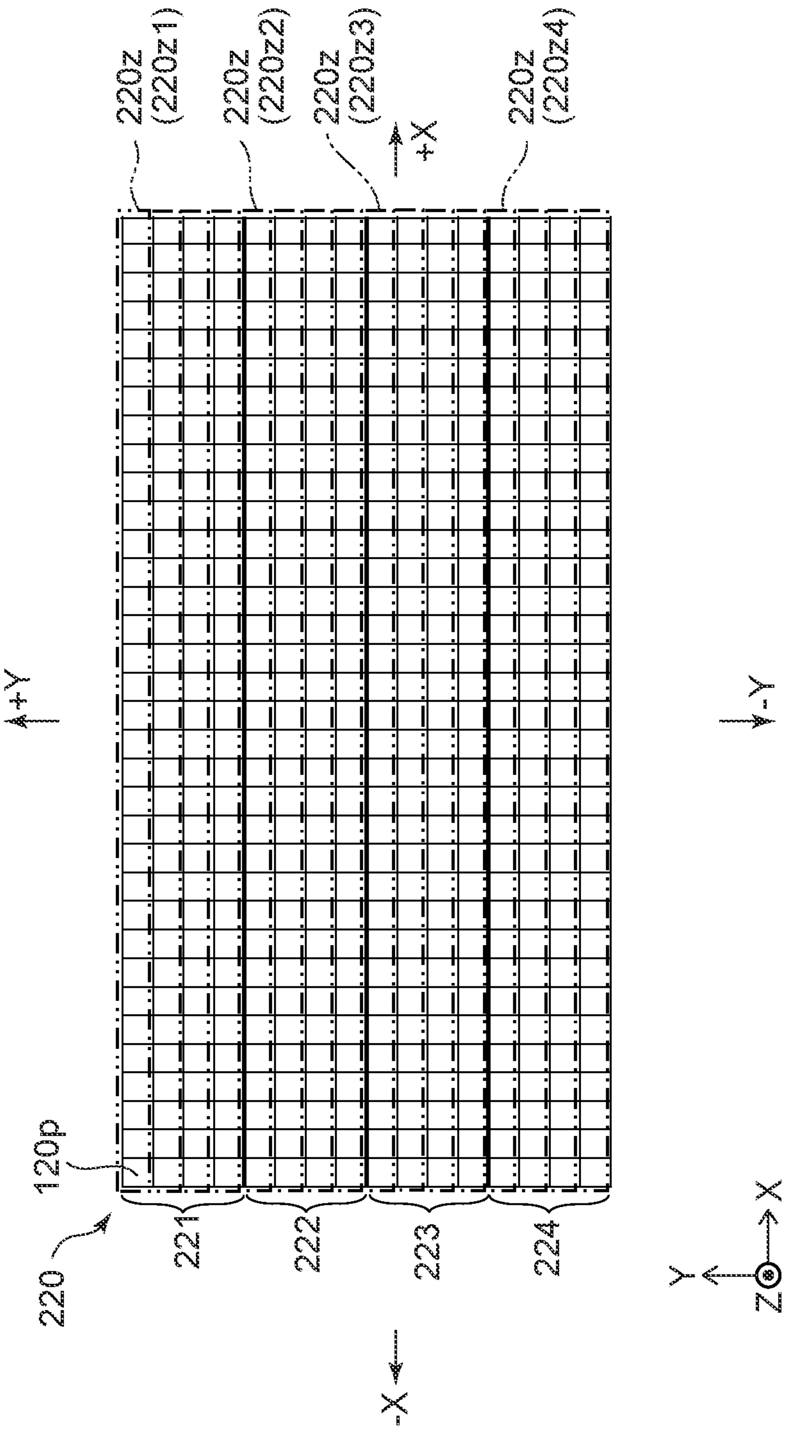
FIG. 12B schematically illustrates areas of a liquid crystal panel according to the second embodiment of which gradations are simultaneously controlled.

FIG. 12B schematically illustrates areas of a liquid crystal panel according to the second embodiment of which gradations are simultaneously controlled.

In the backlight 210 according to the second embodiment, the backlight driver 150 is divided into four areas 210*z* arranged in the −Y direction as shown in FIG. 12A when controlling the outputs of the light sources 116 of the light-emitting regions 111*s*. Two rows of the light-emitting regions 111*s* are included in each area 210*z*. Hereinbelow, among the four areas 210*z*, the area 210*z* positioned furthest toward the +Y side also is called an "area 210*z*1"; the area 210*z* positioned at the −Y side of the area 210*z*1 also is called an "area 210*z*2"; the area 210*z* positioned at the −Y side of the area 210*z*2 also is called an "area 210*z*3"; and the area 210*z* positioned at the −Y side of the area 210*z*3 also is called an "area 210*z*4".

According to the present embodiment, a liquid crystal panel 220 is divided into multiple areas 220*z* arranged in the −Y direction as shown in FIG. 12B when the liquid crystal panel driver 160 controls the gradations of the pixels 120*p*. One row of the pixels 120*p* is included in each area 220*z*. Hereinbelow, the part of the liquid crystal panel 220 positioned directly above the area 210*z*1 of the backlight 210 is called a "first part 221". The part of the liquid crystal panel 220 positioned directly above the area 210*z*2 of the backlight 210 is called a "second part 222". The part of the liquid crystal panel 220 positioned directly above the area 210*z*3 of the backlight 210 is called a "third part 223". The part of the liquid crystal panel 220 positioned directly above the area 210*z*4 of the backlight 210 is called a "fourth part 224".

Among the multiple areas 220*z* in the first part 221, the area 220*z* positioned furthest toward the +Y side also is called an "area 220*z*1". Among the multiple areas 220*z* in the second part 222, the area 220*z* positioned furthest toward the +Y side also is called an "area 220*z*2". Among the multiple areas 220*z* in the third part 223, the area 220*z* positioned furthest toward the +Y side also is called an "area 220*z*3". Among the multiple areas 220*z* in the fourth part 224, the area 220*z* positioned furthest toward the +Y side also is called an "area 220*z*4".

Figure 13A:
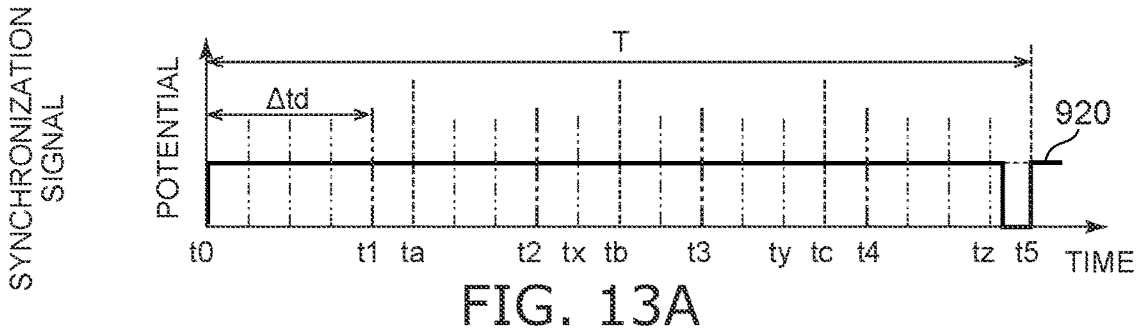
FIG. 13A is a timing chart showing a temporal change of a synchronization signal according to the second embodiment.

FIG. 13A is a timing chart showing the temporal change of the synchronization signal according to the present embodiment.

Figure 13B:
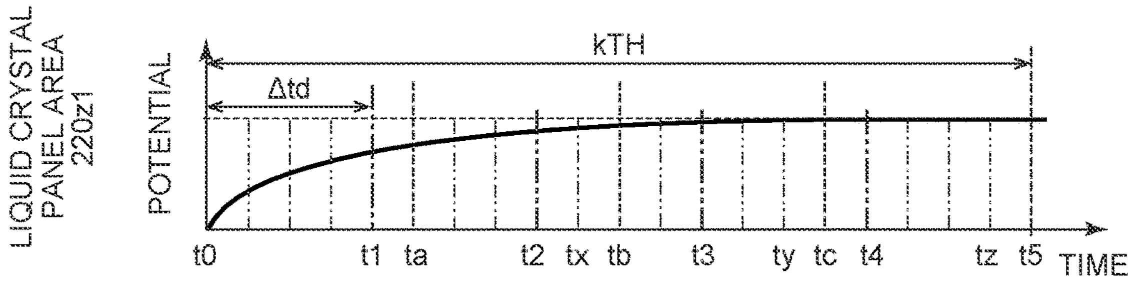
FIG. 13B is a timing chart showing a temporal change of potentials of the pixels belonging to the area 220z1 in FIG. 12B.

FIG. 13B is a timing chart showing the temporal change of the potentials of the pixels belonging to the area 220*z*1 of FIG. 12B.

Figure 13C:
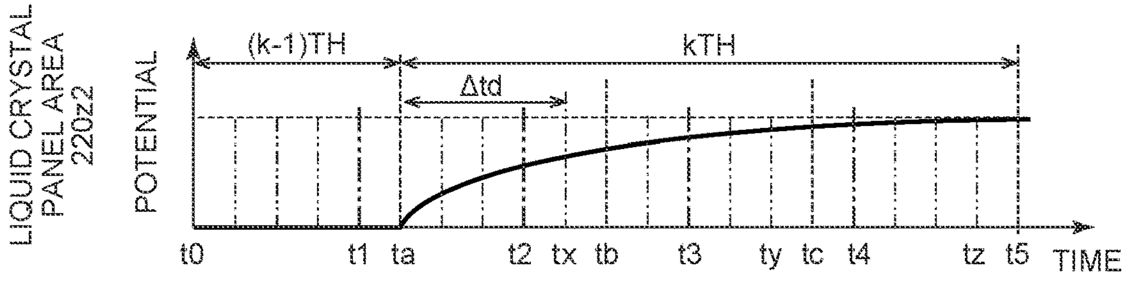
FIG. 13C is a timing chart showing a temporal change of potentials of the pixels belonging to the area 220z2 in FIG. 12B.

FIG. 13C is a timing chart showing the temporal change of the potentials of the pixels belonging to the area 220*z*2 of FIG. 12B.

Figure 13D:
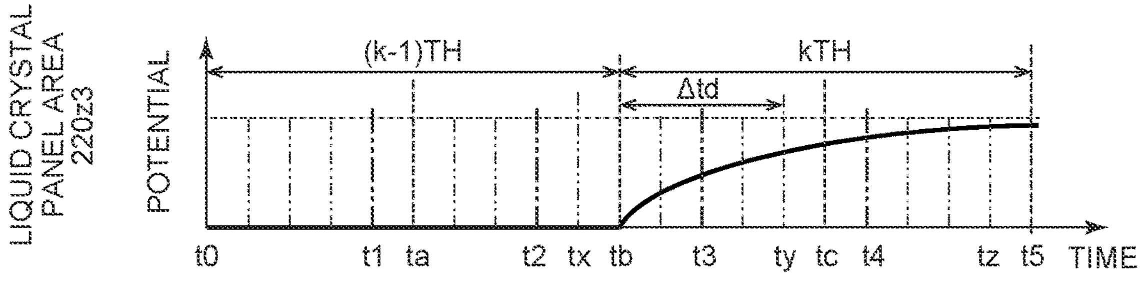
FIG. 13D is a timing chart showing a temporal change of potentials of the pixels belonging to the area 220z3 in FIG. 12B.

FIG. 13D is a timing chart showing the temporal change of the potentials of the pixels belonging to the area 220*z*3 of FIG. 12B.

Figure 13E:
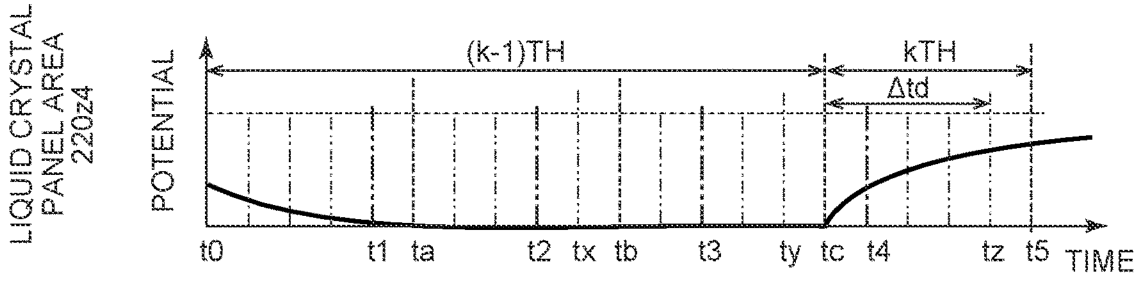
FIG. 13E is a timing chart showing a temporal change of potentials of the pixels belonging to the area 220z4 in FIG. 12B.

FIG. 13E is a timing chart showing the temporal change of the potentials of the pixels belonging to the area 220*z*4 of FIG. 12B.

Figure 13F:
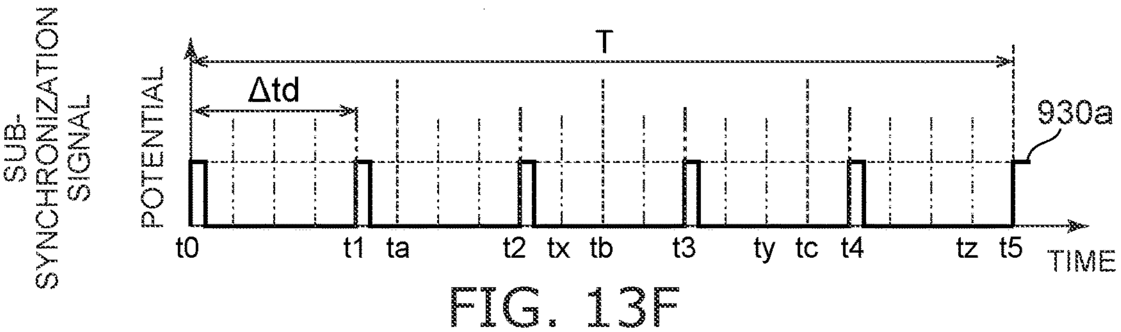
FIG. 13F is a timing chart showing a temporal change of a sub-synchronization signal according to the second embodiment.

FIG. 13F is a timing chart showing the temporal change of the sub-synchronization signal according to the embodiment.

Figure 13G:
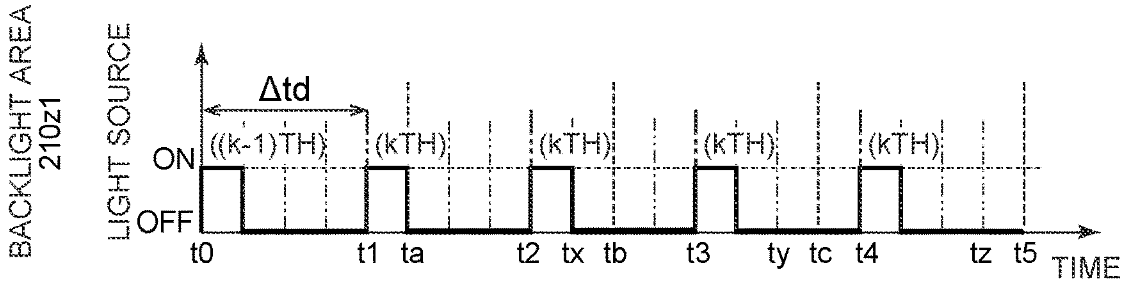
FIG. 13G is a timing chart showing a timing of controlling outputs of the light sources belonging to the area 210z1 in FIG. 12A.

FIG. 13G is a timing chart showing the timing of controlling the outputs of the light sources belonging to the area 210z1 of FIG. 12A.

Figure 13H:
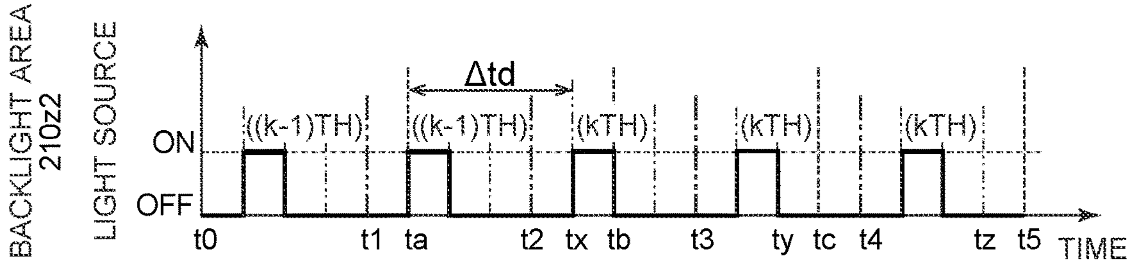
FIG. 13H is a timing chart showing a timing of controlling outputs of the light sources belonging to the area 210z2 in FIG. 12A.

FIG. 13H is a timing chart showing the timing of controlling the outputs of the light sources belonging to the area 210z2 of FIG. 12A.

Figure 13I:
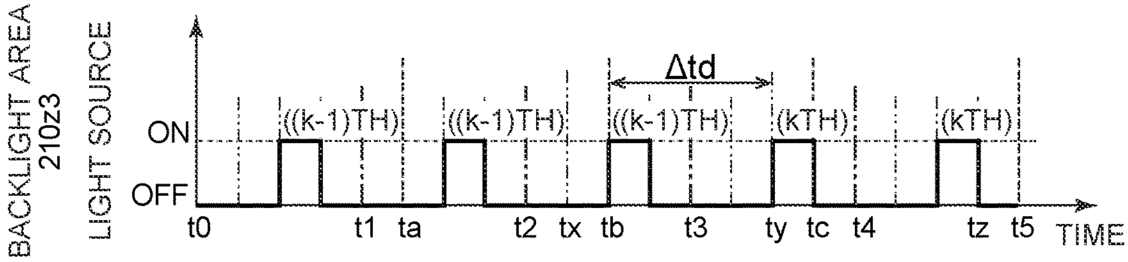
FIG. 13I is a timing chart showing a timing of controlling outputs of the light sources belonging to the area 210z3 in FIG. 12A.

FIG. 13I is a timing chart showing the timing of controlling the outputs of the light sources belonging to the area 210z3 of FIG. 12A.

Figure 13J:
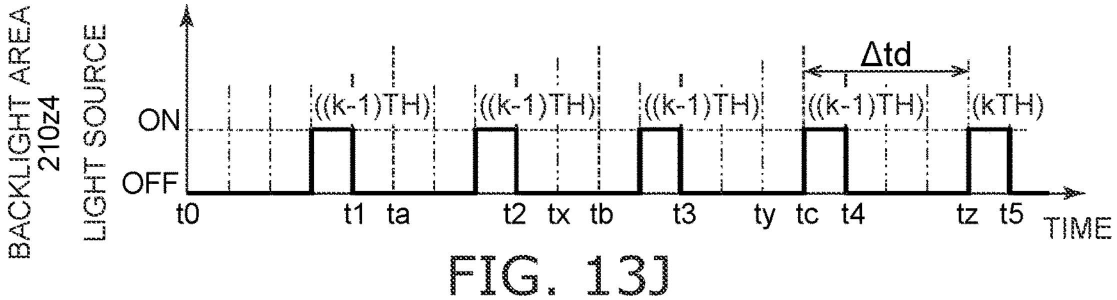
FIG. 13J is a timing chart showing a timing of controlling outputs of the light sources belonging to the area 210z4 in FIG. 12A.

FIG. 13J is a timing chart showing the timing of controlling the outputs of the light sources belonging to the area 210z4 of FIG. 12A.

As shown in FIGS. 13A and 13F, the present embodiment differs from the first embodiment in that the total number of pulses of a sub-synchronization signal 930a included in the one period T of the synchronization signal 920 is not an integer multiple of the total number of the areas 210z of the backlight 210. Specifically, according to the present embodiment, the number of pulses of the sub-synchronization signal 930a included in the one period T is five; and the total number of the areas 210z of the backlight 210 is four.

The present embodiment differs from the first embodiment in that, for each area 210z, the backlight driver 150 switches the outputs of the light sources 116 of the light-emitting regions 111s included in the area 210z to the outputs corresponding to the kth input image 910 after a delay interval Δtd has elapsed from the start of the processing of switching the voltages applied to the pixels 120p to the values corresponding to the kth input image 910 for at least one area 220z of the liquid crystal panel 220 positioned directly above the area 210z. For example, as shown in FIG. 13F, the delay interval Δtd is the value of the period T divided by the total number of pulses of the sub-synchronization signal 930a included in the period T. However, the delay interval is not limited to such a delay interval. For example, the delay interval Δtd may be not less than 2 times a unit interval of the period T divided by the total number of pulses of the sub-synchronization signal 930a included in the period T. In other words, the delay interval Δtd can be an integer multiple of a unit interval of the period T of the synchronization signal 920 divided by the total number of pulses.

Specifically, as shown in FIG. 13F, the sub-synchronization signal 930a rises at the time to. When the rise of the sub-synchronization signal 930a is detected, the backlight driver 150 performs processing of controlling the outputs of the light sources 116 of the light-emitting regions 111s sequentially in the −Y direction for each of the areas 210z of the backlight 210 as shown in FIGS. 13G to 13J.

As shown in FIG. 13B, the potentials of the pixels 120p belonging to the area 220z1 of the liquid crystal panel 220 start to switch to the values corresponding to the kth control signal D2a at substantially the time to. Between the time to and the time t1 as shown in FIG. 13G, the time of starting the control of the outputs of the light sources 116 belonging to the area 210z1 of the backlight 210 also is substantially at the time to. Between the time to and the time t1 as shown in FIGS. 13C to 13E, the voltages applied to the pixels 120p do not start to switch to the values corresponding to the kth control signal D2a in the areas 220z2, 220z3, and 220z4 of the liquid crystal panel 220. Accordingly, between the time to and the time t1 as shown in FIGS. 13G to 13J, the backlight driver 150 switches the outputs of the light sources 116 of the areas 210z1, 210z2, 210z3, and 210z4 of the backlight 210 to the outputs corresponding to the (k−1)th control signal D1a.

Then, a shown in FIG. 13F, the sub-synchronization signal 930a rises again at the time t1.

At the time t1 as shown in FIG. 13G, the backlight driver 150 starts to control the outputs of the light sources 116 belonging to the area 210z1 of the backlight 210. The delay interval Δtd has elapsed from the time to at the time t1. Accordingly, between the time t1 and the time t2, the backlight driver 150 switches the outputs of the light sources 116 of the area 210z1 of the backlight 210 to the outputs corresponding to the kth control signal D1a.

At a time ta between the time t1 and the time t2 as shown in FIG. 13C, the potentials of the pixels 120p belonging to the area 220z2 of the liquid crystal panel 220 start to switch to the values corresponding to the kth control signal D2a. As shown in FIG. 13H, the time between the time t1 and the time t2 at which the control of the outputs of the light sources 116 belonging to the area 210z2 of the backlight 210 starts also is substantially at the time ta. Accordingly, the backlight driver 150 switches the outputs of the light sources 116 of the area 210z2 of the backlight 210 to the outputs corresponding to the (k−1)th control signal D1a.

Between the time t1 and the time t2 as shown in FIGS. 131 and 13J, similarly to between the time to and the time t1, the backlight driver 150 switches the outputs of the light sources 116 of the areas 210z3 and 210z4 of the backlight 210 to the outputs corresponding to the (k−1)th control signal D1a.

As shown in FIG. 13F, the sub-synchronization signal 930a rises again at the time t2.

Between the time t2 and the time t3 as shown in FIG. 13G, similarly to between the time t1 and the time t2, the backlight driver 150 switches the outputs of the light sources 116 of the area 210z1 of the backlight 210 to the outputs corresponding to the kth control signal D1a.

At a time tx between the time t2 and the time t3 as shown in FIG. 13H, the backlight driver 150 starts to control the outputs of the light sources 116 belonging to the area 210z2 of the backlight 210. The delay interval Δtd has elapsed from the time ta at the time tx. Accordingly, between the time t2 and the time t3, the backlight driver 150 switches the outputs of the light sources 116 of the area 210z2 of the backlight 210 to the outputs corresponding to the kth control signal D1a.

At a time tb between the time t2 and the time t3 as shown in FIG. 13D, the potentials of the pixels 120p belonging to the area 220z3 of the liquid crystal panel 220 start to switch to the values corresponding to the kth control signal D2a. As shown in FIG. 13I, the time between the time t2 and the time t3 at which the control of the outputs of the light sources 116 belonging to the area 210z3 of the backlight 210 is started also is substantially at the time tb. Accordingly, the backlight driver 150 switches the outputs of the light sources 116 of the area 210z3 of the backlight 210 to the outputs corresponding to the (k−1)th control signal D1a.

Between the time t2 and the time t3 as shown in FIG. 13J, similarly to between the time t1 and the time t2, the backlight driver 150 switches the outputs of the light sources 116 of the area 210z4 of the backlight 210 to the outputs corresponding to the (k−1)th control signal D1a.

Then, as shown FIG. in 13F, the sub-synchronization signal 930a rises again at the time t3.

Between the time t3 and the time t4 as shown in FIGS. 13G and 13H, similarly to between the time t2 and the time t3, the backlight driver 150 switches the outputs of the light sources 116 of the areas 210z1 and 210z2 of the backlight 210 to the outputs corresponding to the kth control signal D1a.

At a time ty between the time t3 and the time t4 as shown in FIG. 13I, the backlight driver 150 starts to control the outputs of the light sources 116 belonging to the area 210z3 of the backlight 210. The delay interval Δtd has elapsed from the time tb at the time ty. Accordingly, between the time t3 and the time t4, the backlight driver 150 switches the outputs of the light sources 116 of the area 210z3 of the backlight 210 to the outputs corresponding to the kth control signal D1a.

At a time tc between the time t3 and the time t4 as shown in FIG. 13E, the potentials of the pixels 120p belonging to the area 220z4 of the liquid crystal panel 220 start to switch to the values corresponding to the kth control signal D2a. As shown in FIG. 13J, the time between the time t3 and the time t4 at which the control of the outputs of the light sources 116 belonging to the area 210z4 of the backlight 210 is started also is substantially at the time tc. Accordingly, the backlight driver 150 switches the outputs of the light sources 116 of the area 210z4 of the backlight 210 to the outputs corresponding to the (k−1)th control signal D1a.

Then, as shown in FIG. 13F, the sub-synchronization signal 930a rises again at the time t4.

Between the time t4 and the time t5 as shown in FIGS. 13G to 131, similarly to between the time t3 and the time t4, the backlight driver 150 switches the outputs of the light sources 116 of the areas 210z1, 210z2, and 210z3 of the backlight 210 to the outputs corresponding to the kth control signal D1a.

At a time tz between the time t4 and the time t5 as shown in FIG. 13J, the backlight driver 150 starts to control the outputs of the light sources 116 belonging to the area 210z4 of the backlight 210. The delay interval Δtd has elapsed from the time tc at the time tz. Accordingly, between the time t4 and the time t5, the backlight driver 150 switches the outputs of the light sources 116 of the area 210z4 of the backlight 210 to the outputs corresponding to the kth control signal D1a.

At and after the time t5, processing similar to the processing from the time t0 to the time t5 is repeatedly performed. According to the present embodiment, the time t5 of one period T is the time to of the next one period T.

Effects of the present embodiment will now be described.

According to the present embodiment as well, for the areas 210z of the backlight 210, the outputs of the light sources 116 of the light-emitting regions 111s included in the area 210z are switched to the outputs corresponding to the kth input image 910 at or after starting the processing of switching the voltages applied to the pixels 120p of the liquid crystal panel 220 positioned directly above the area 210z to the values corresponding to the kth input image 910. Therefore, the image displayed in the liquid crystal panel 220 and the luminance of the backlight 210 can be easily matched. A high-quality image can be displayed thereby.

It takes time for the potentials of the pixels 120p of the liquid crystal panel 220 to reach the values corresponding to the kth control signal D2a. In contrast, according to the present embodiment, for the areas 210z of the backlight 210, the outputs of the light sources 116 of the light-emitting regions 111s included in the area 210z are switched to the outputs corresponding to the kth input image 910 after the delay interval Δtd has elapsed from the start of the processing of switching the voltages applied to the pixels 120p positioned directly above the area 210z to the values corresponding to the kth input image 910. Therefore, the image displayed in the liquid crystal panel 220 and the luminance of the backlight 210 can be easily matched. A high-quality image can be displayed thereby. The delay interval Δtd can be adjusted as appropriate based on the length of the unit interval divided by the total number of pulses of the sub-synchronization signal 930a included in the period T or the time until the potentials of the pixels 120p of the liquid crystal panel 120 reach the potentials corresponding to the control signal.

Third Embodiment

A third embodiment will now be described.

Figure 14A:
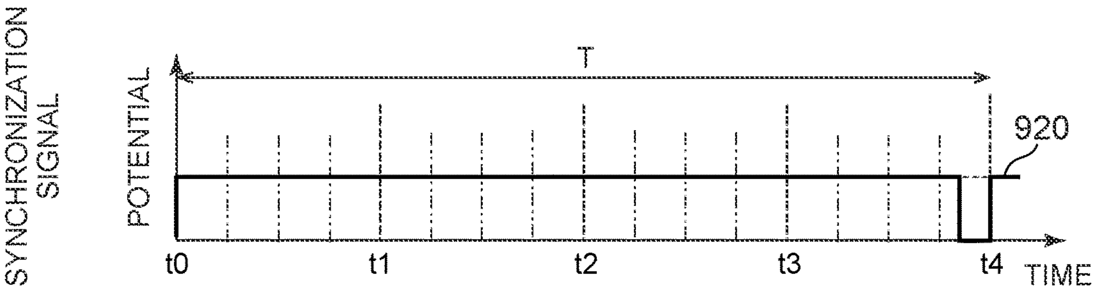
FIG. 14A is a timing chart showing a temporal change of a synchronization signal according to a third embodiment.

FIG. 14A is a timing chart showing the temporal change of the synchronization signal according to the third embodiment.

Figure 14B:
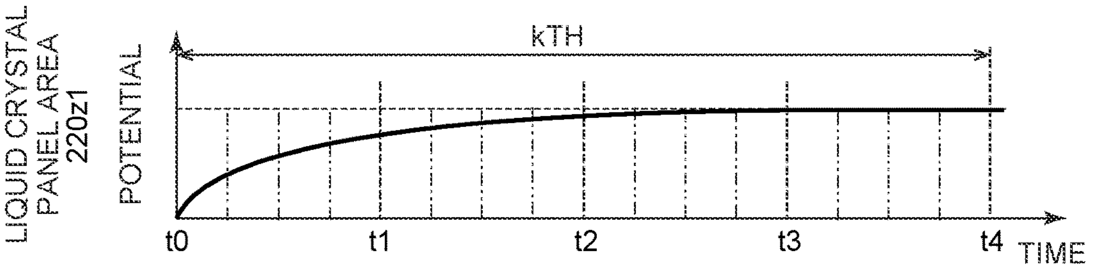
FIG. 14B is a timing chart showing a temporal change of potentials of the pixels belonging to the area 220z1 according to the third embodiment.

FIG. 14B is a timing chart showing the temporal change of the potentials of the pixels belonging to the area 220z1 according to the third embodiment.

Figure 14C:
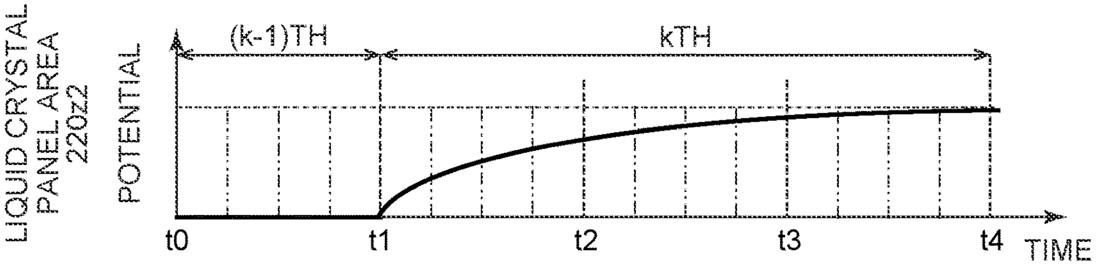
FIG. 14C is a timing chart showing a temporal change of potentials of the pixels belonging to the area 220z2 according to the third embodiment.

FIG. 14C is a timing chart showing the temporal change of the potentials of the pixels belonging to the area 220z2 according to the third embodiment.

Figure 14D:
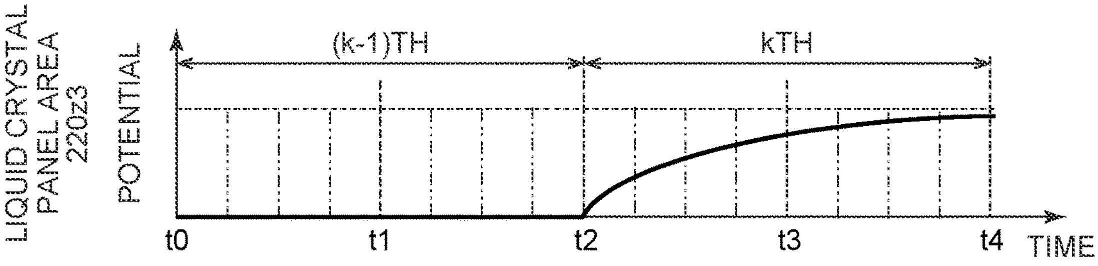
FIG. 14D is a timing chart showing a temporal change of potentials of the pixels belonging to the area 220z3 according to the third embodiment.

FIG. 14D is a timing chart showing the temporal change of the potentials of the pixels belonging to the area 220z3 according to the third embodiment.

Figure 14E:
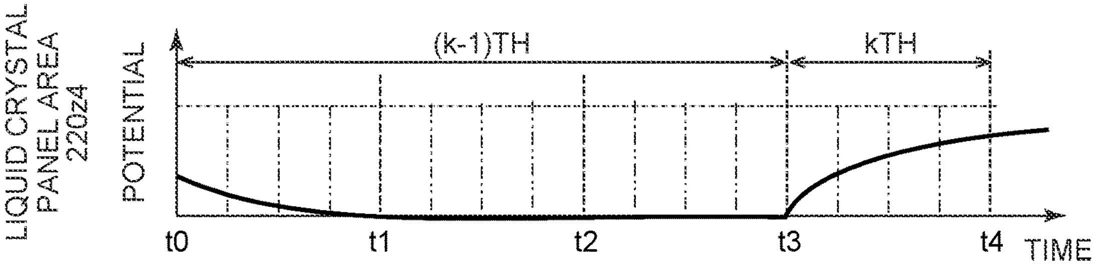
FIG. 14E is a timing chart showing a temporal change of potentials of the pixels belonging to the area 220z4 according to the third embodiment.

FIG. 14E is a timing chart showing the temporal change of the potentials of the pixels belonging to the area 220z4 according to the third embodiment.

Figure 14F:
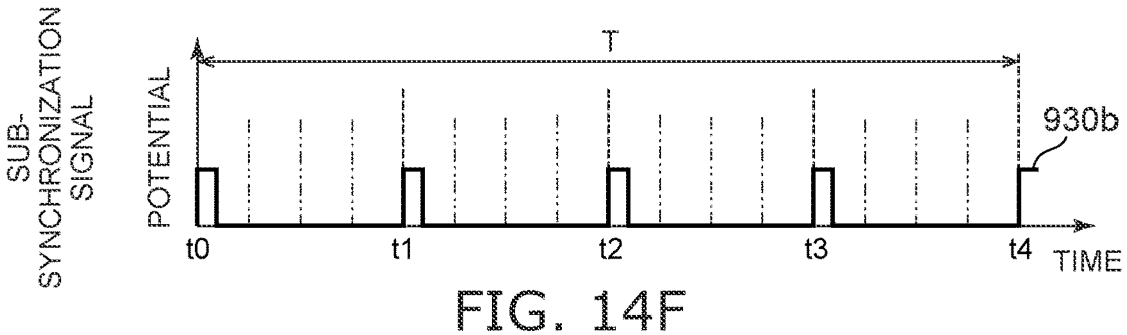
FIG. 14F is a timing chart showing a temporal change of a sub-synchronization signal according to the third embodiment.

FIG. 14F is a timing chart showing the temporal change of the sub-synchronization signal according to the third embodiment.

Figure 14G:
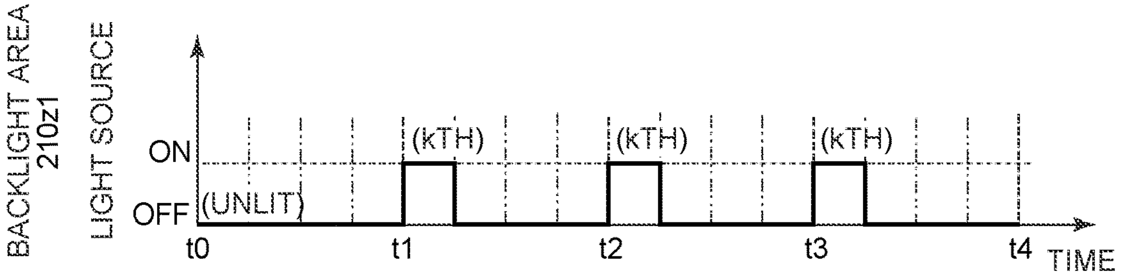
FIG. 14G is a timing chart showing a timing of controlling the outputs of the light sources belonging to the area 210z1 according to the third embodiment.

FIG. 14G is a timing chart showing the timing of controlling the outputs of the light sources belonging to the area 210z1 according to the third embodiment.

Figure 14H:
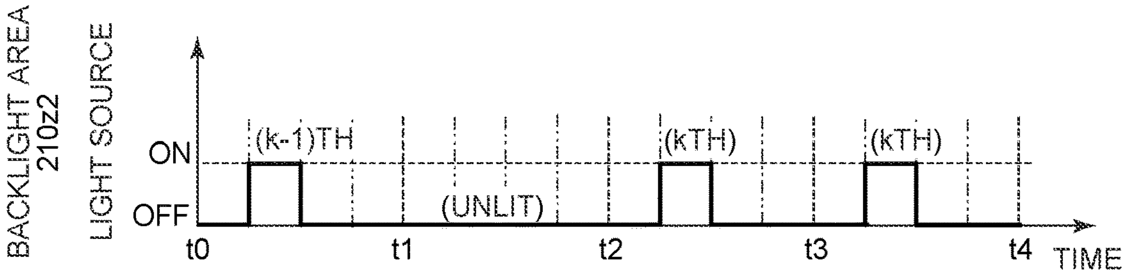
FIG. 14H is a timing chart showing a timing of controlling the outputs of the light sources belonging to the area 210z2 according to the third embodiment.

FIG. 14H is a timing chart showing the timing of controlling the outputs of the light sources belonging to the area 210z2 according to the third embodiment.

Figure 14I:
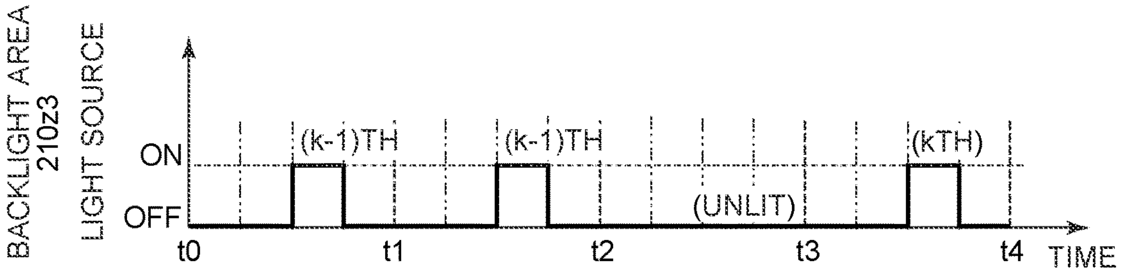
FIG. 14I is a timing chart showing a timing of controlling the outputs of the light sources belonging to the area 210z3 according to the third embodiment.

FIG. 14I is a timing chart showing the timing of controlling the outputs of the light sources belonging to the area 210z3 according to the third embodiment.

Figure 14J:
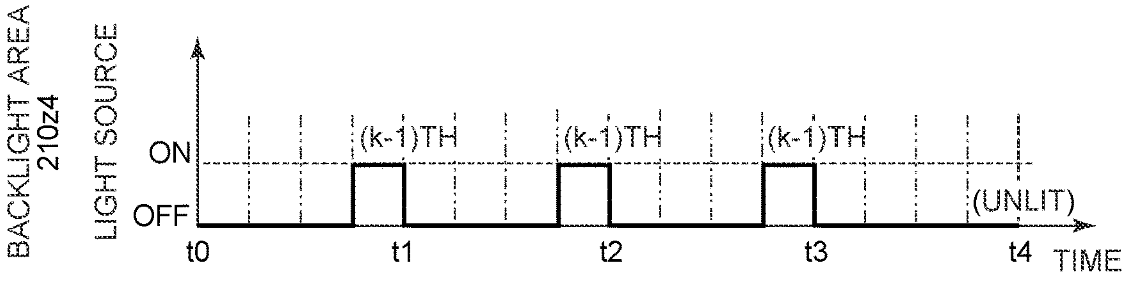
FIG. 14J is a timing chart showing a timing of controlling the outputs of the light sources belonging to the area 210z4 according to the third embodiment.

FIG. 14J is a timing chart showing the timing of controlling the outputs of the light sources belonging to the area 210z4 according to the third embodiment.

Figure 15:
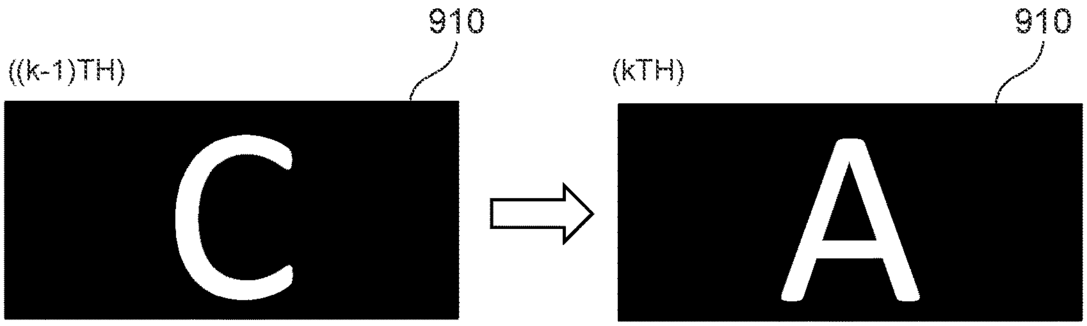
FIG. 15 is a schematic diagram showing a (k−1)th input image and a kth input image according to the third embodiment.

FIG. 15 is a schematic diagram showing the (k−1)th input image and the kth input image according to the third embodiment.

Figure 16A:
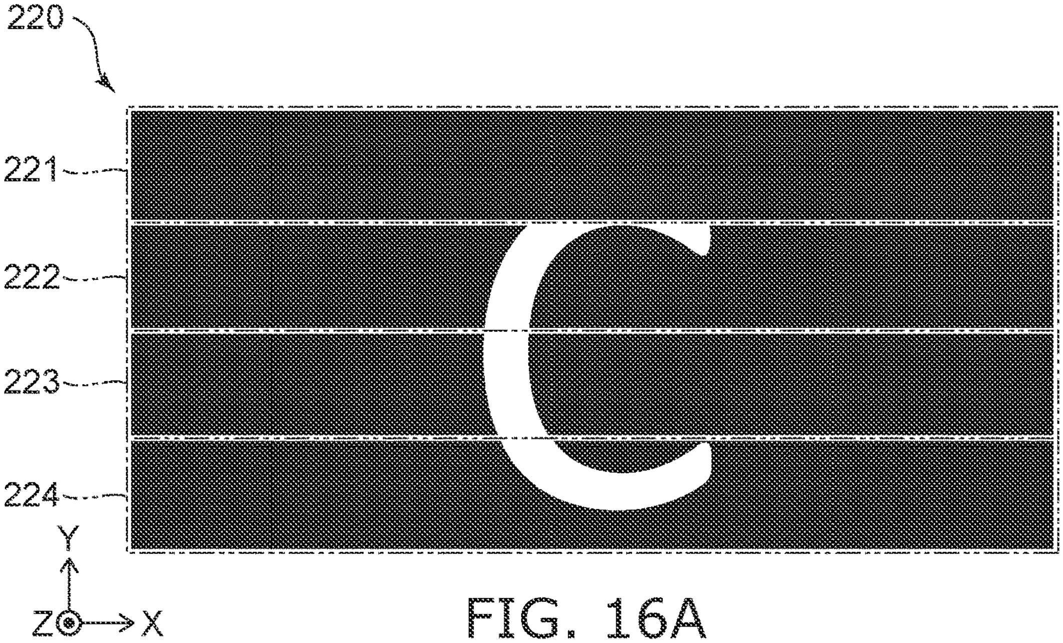
FIG. 16A is a schematic diagram showing an image displayed in the liquid crystal panel between the time to and the time t1 in FIG. 14A.

FIG. 16A is a schematic diagram showing an image displayed in the liquid crystal panel between the time to and the time t1 of FIG. 14A.

Figure 16B:
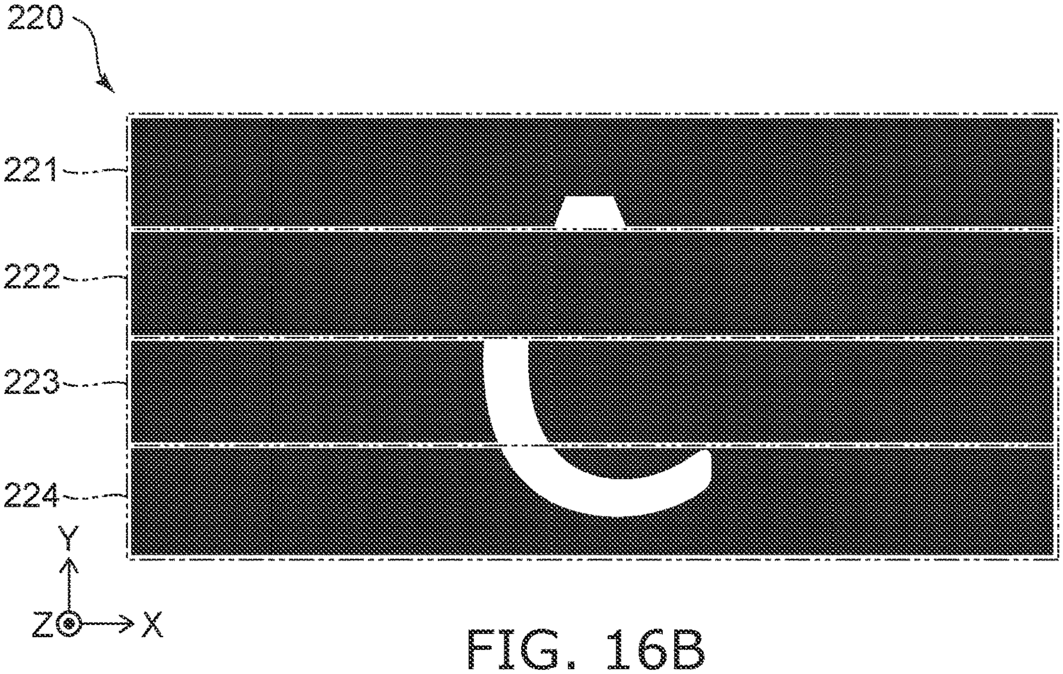
FIG. 16B is a schematic diagram showing an image displayed in the liquid crystal panel between the time t1 and the time t2 in FIG. 14A.

FIG. 16B is a schematic diagram showing an image displayed in the liquid crystal panel between the time t1 and the time t2 of FIG. 14A.

Figure 16C:
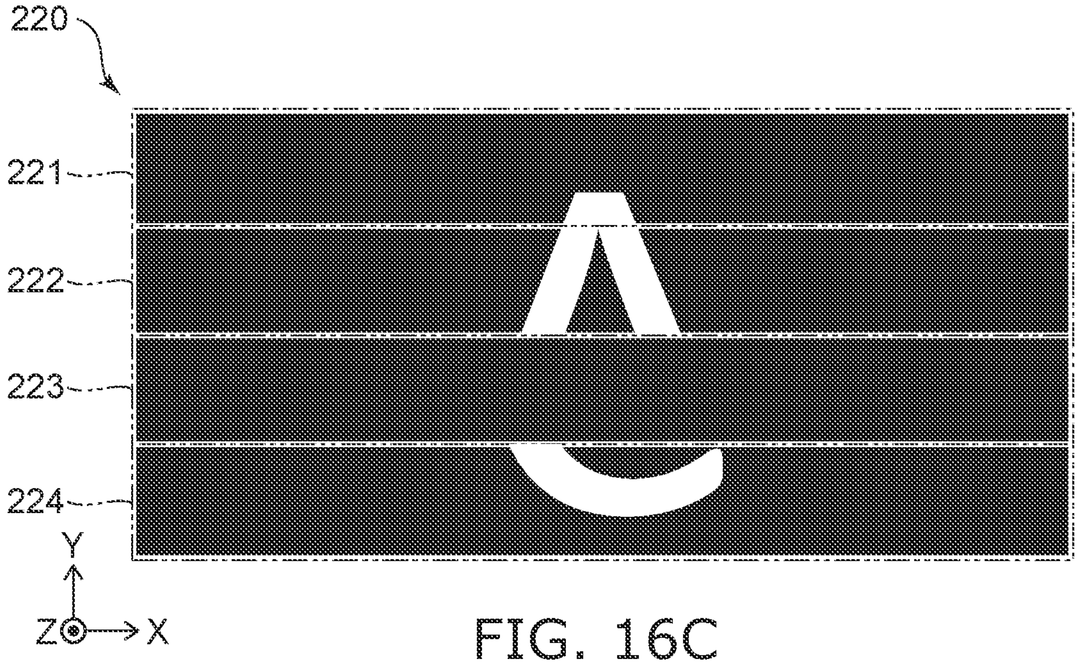
FIG. 16C is a schematic diagram showing an image displayed in the liquid crystal panel between the time t2 and the time t3 in FIG. 14A.

FIG. 16C is a schematic diagram showing an image displayed in the liquid crystal panel between the time t2 and the time t3 of FIG. 14A.

Figure 16D:
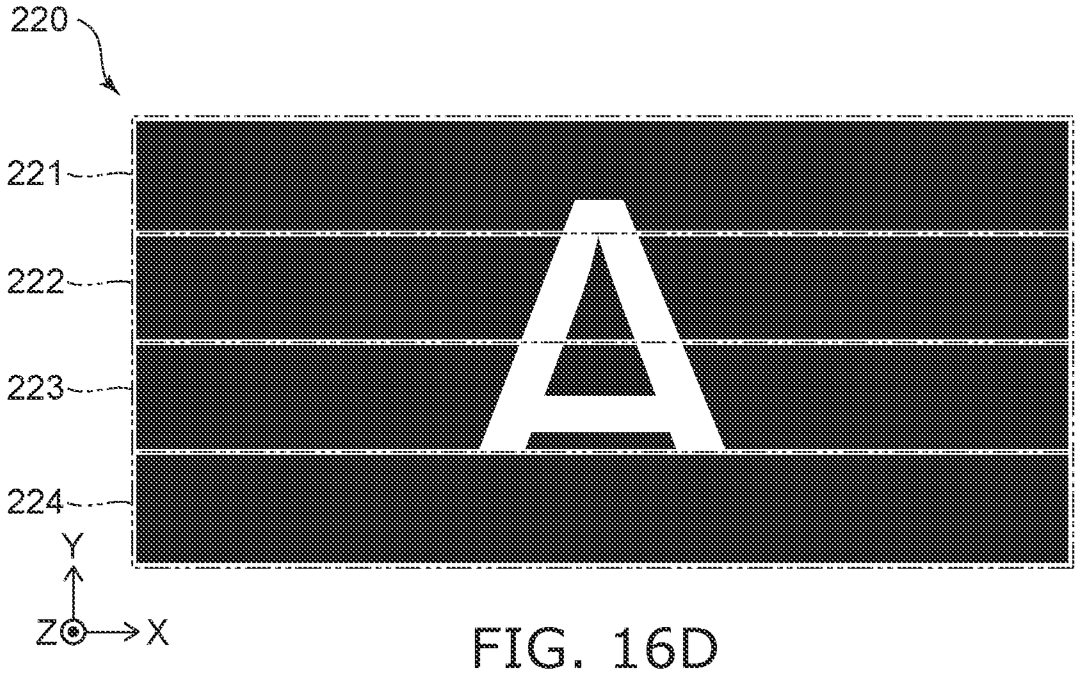
FIG. 16D is a schematic diagram showing an image displayed in the liquid crystal panel between the time t3 and the time t4 in FIG. 14A.

FIG. 16D is a schematic diagram showing an image displayed in the liquid crystal panel between the time t3 and the time t4 of FIG. 14A.

Hereinbelow, the (k−1)th input image 910 is an image displaying a white character "C" on a black background as shown in FIG. 15. An example is described in which the kth input image 910 is the image displaying a white character "A" on a black background.

According to the present embodiment, similarly to the second embodiment, the backlight 210 is divided into the four areas 210$z$1, 210$z$2, 210$z$3, and 210$z$4; and the liquid crystal panel 220 is divided into the four areas 220$z$1, 220$z$2, 220$z$3, and 220$z$4.

The present embodiment differs from the second embodiment in that the total number of pulses of a sub-synchronization signal 930$b$ included in the one period T of the synchronization signal 920 is equal to the total number of the areas 210$z$ of the backlight 210, i.e., four. Accordingly, according to the present embodiment, the time t4 of one period T is the time to of the next one period T. The present embodiment differs from the second embodiment in that, for the areas 210$z$ of the backlight 210, after switching the outputs of the light sources 116 of the light-emitting regions 111$s$ to the outputs corresponding to the (k−1)th input image 910, the backlight driver 150 causes the light sources 116 of the light-emitting regions 111$s$ to be unlit, and then switches the outputs of the light sources 116 of the light-emitting regions 111$s$ to the outputs corresponding to the kth input image 910.

Specifically, at substantially time to as shown in FIG. 14B, the potentials of the pixels 120$p$ belonging to the area 220$z$1 of the liquid crystal panel 220 start to switch to the values corresponding to the kth control signal D2$a$. Also, as shown in FIG. 14F, the sub-synchronization signal 930$b$ rises at the time to. When the rise of the sub-synchronization signal 930$b$ is detected, the backlight driver 150 performs the processing of controlling the outputs of the light sources 116 of the light-emitting regions 111$s$ sequentially in the −Y direction for each of the areas 210$z$ of the backlight 210 as shown in FIGS. 14G to 14J.

Between the time to and the time t1 as shown in FIG. 14G, the backlight driver 150 causes the light sources 116 of the area 210$z$1 of the backlight 210 to be unlit.

Between the time to and the time t1 as shown in FIGS. 14C to 14E, the voltages applied to the pixels 120$p$ of the areas 220$z$2, 220$z$3, and 220$z$4 of the liquid crystal panel 220 do not start to switch to the values corresponding to the kth control signal D2$a$. Accordingly, between the time to and the time t1 as shown in FIGS. 14H to 14J, the backlight driver 150 switches the outputs of the light sources 116 of the areas 210$z$2, 210$z$3, and 210$z$4 of the backlight 210 to the outputs corresponding to the (k−1)th control signal D1$a$.

Accordingly, between the time to and the time t1 as shown in FIG. 16A, an image is not displayed in the first part 221 of the liquid crystal panel 220. A portion of the white character "C" on the black background is displayed according to the (k−1)th input image 910 in the second, third, and fourth parts 222, 223, and 224 of the liquid crystal panel 220.

Then, substantially at the time t1 as shown in FIG. 14C, the potentials of the pixels 120$p$ belonging to the area 220$z$2 of the liquid crystal panel 220 start to switch to the values corresponding to the kth control signal D2$a$. As shown in FIG. 14F, the sub-synchronization signal 930$b$ rises again at the time t1.

Between the time t1 and the time t2 as shown in FIG. 14B, the potentials of the pixels 120$p$ belonging to the area 220$z$1 of the liquid crystal panel 220 start to switch to the values corresponding to the kth control signal D2$a$. Therefore, between the time t1 and the time t2 as shown in FIG. 14G, the backlight driver 150 switches the outputs of the light sources 116 of the area 210$z$1 of the backlight 210 to the outputs corresponding to the kth control signal D1$a$.

Between the time t1 and the time t2 as shown in FIG. 14H, the backlight driver 150 causes the light sources 116 of the area 210$z$2 of the backlight 210 to be unlit.

Between the time t1 and the time t2 as shown in FIGS. 14I and 14J, the backlight driver 150 switches the outputs of the light sources 116 of the areas 210$z$3 and 210$z$4 of the backlight 210 to the outputs corresponding to the (k−1)th control signal D1$a$ similarly to between the time to and the time t1.

Accordingly, between the time t1 and the time t2 as shown in FIG. 16B, a portion of the white character "A" on the black background is displayed according to the kth input image 910 in the first part 221 of the liquid crystal panel 220. An image is not displayed in the second part 222 of the liquid crystal panel 220. Also, a portion of the white character "C" on the black background is displayed according to the (k−1)th input image 910 in the third and fourth parts 223 and 224 of the liquid crystal panel 220.

When the image displayed in the first part 221 is switched from the image corresponding to the (k−1)th input image 910 to the image corresponding to the kth input image 910 without making the area 210$z$1 of the backlight 210 unlit, there are cases where the user sees the image corresponding to the (k−1)th input image 910 as an afterimage directly after the switching. In contrast, according to the present embodiment, for each area 210$z$1 of the backlight 210, after switching the outputs of the light sources 116 to the outputs corresponding to the (k−1)th input image 910, the light sources 116 are caused to be unlit, and then the outputs of the light sources 116 are switched to the outputs corresponding to the kth input image 910. Therefore, the user can be prevented from seeing the afterimage directly after the switching.

Then, substantially at the time t2 as shown in FIG. 14D, the potentials of the pixels 120$p$ belonging to the area 220$z$3 of the liquid crystal panel 220 start to switch to the values corresponding to the kth control signal D2$a$. As shown in FIG. 14F, the sub-synchronization signal 930$b$ rises again at the time t2.

Between the time t2 and the time t3 as shown in FIG. 14G, similarly to between the time t1 and the time t2, the backlight driver 150 switches the outputs of the light sources 116 of the area 210$z$1 of the backlight 210 to the outputs corresponding to the kth control signal D1$a$.

Between the time t2 and the time t3 as shown in FIG. 14C, the potentials of the pixels 120$p$ belonging to the area 220$z$2 of the liquid crystal panel 220 start to switch to the values corresponding to the kth control signal D2$a$. Therefore, between the time t2 and the time t3 as shown in FIG. 14H, the backlight driver 150 switches the outputs of the light sources 116 of the area 210$z$2 of the backlight 210 to the outputs corresponding to the kth control signal D1$a$.

Between the time t2 and the time t3 as shown in FIG. 14I, the backlight driver 150 causes the light sources 116 of the area 210$z$3 of the backlight 210 to be unlit.

Between the time t2 and the time t3 as shown in FIG. 14J, the backlight driver 150 switches the outputs of the light sources 116 of the area 210$z$4 of the backlight 210 to the outputs corresponding to the (k−1)th control signal D1$a$ similarly to between the time t1 and the time t2.

Accordingly, between the time t2 and the time t3 as shown in FIG. 16C, a portion of the white character "A" on the black background is displayed according to the kth input image 910 in the first and second parts 221 and 222 of the liquid crystal panel 220. An image is not displayed in the third part 223 of the liquid crystal panel 220. A portion of the white character "C" on the black background is displayed according to the (k−1)th input image 910 in the fourth part 224 of the liquid crystal panel 220.

Then, substantially at the time t3 as shown in FIG. 14E, the potentials of the pixels 120$p$ belonging to the area 220$z$4 of the liquid crystal panel 220 start to switch to the values corresponding to the kth control signal D2*a*. As shown in FIG. 14F, the sub-synchronization signal 930*b* rises again at the time t3.

Between the time t3 and the time t4 as shown in FIGS. 14G and 14H, similarly to between the time t2 and the time t3, the backlight driver 150 switches the outputs of the light sources 116 of the areas 210*z*1 and 210*z*2 of the backlight 210 to the outputs corresponding to the kth control signal D1*a*.

Between the time t3 and the time t4 as shown in FIG. 14D, the potentials of the pixels 120*p* belonging to the area 220*z*3 of the liquid crystal panel 220 start to switch to the values corresponding to the kth control signal D2*a*. Therefore, between the time t3 and the time t4 as shown in FIG. 14I, the backlight driver 150 switches the outputs of the light sources 116 of the area 210*z*3 of the backlight 210 to the outputs corresponding to the kth control signal D1*a*.

Between the time t3 and the time t4 as shown in FIG. 14J, the backlight driver 150 causes the light sources 116 of the area 210*z*4 of the backlight 210 to be unlit.

Accordingly, between the time t3 and the time t4, a portion of the white character "A" on the black background is displayed according to the kth input image 910 in the first, second, and third parts 221, 222, and 223 of the liquid crystal panel 220 as shown in FIG. 16D. An image is not displayed in the fourth part 224 of the liquid crystal panel 220.

At and after the time t4, processing similar to the processing from the time t0 to the time t4 is repeatedly performed.

Effects of the present embodiment will now be described.

According to the present embodiment, for the areas 210*z* of the backlight 210, after switching the outputs of the light sources 116 of the light-emitting regions 111*s* to the outputs corresponding to the (k−1)th input image 910, the light sources 116 of the light-emitting regions 111*s* are caused to be unlit, and then the outputs of the light sources 116 of the light-emitting regions 111*s* are switched to the outputs corresponding to the kth input image 910. Therefore, the user can be prevented from seeing the image corresponding to the (k−1)th input image 910 as an afterimage directly after the switching.

Fourth Embodiment

A fourth embodiment will now be described.

Figure 17A:
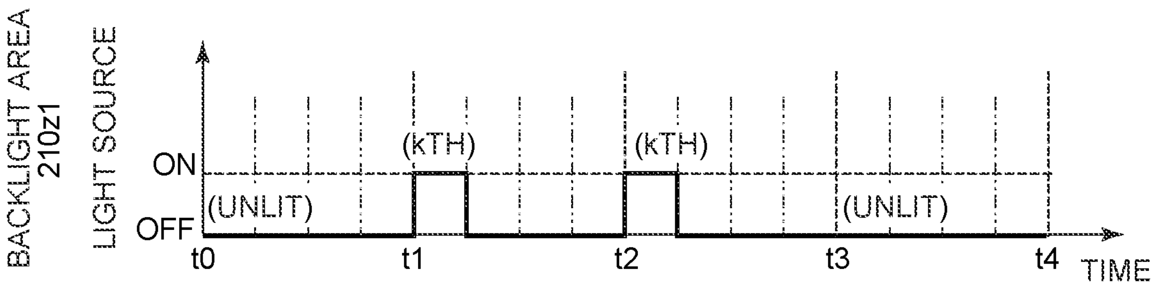
FIG. 17A is a timing chart showing a timing of controlling outputs of the light sources belonging to the area 210z1 according to a fourth embodiment.

FIG. 17A is a timing chart showing the timing of controlling the outputs of the light sources belonging to the area 210*z*1 according to the fourth embodiment.

Figure 17B:
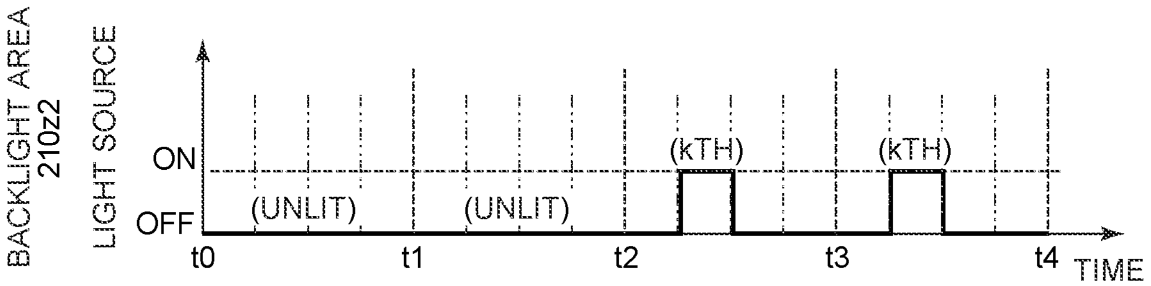
FIG. 17B is a timing chart showing a timing of controlling outputs of the light sources belonging to the area 210z2 according to the fourth embodiment.

FIG. 17B is a timing chart showing the timing of controlling the outputs of the light sources belonging to the area 210*z*2 according to the fourth embodiment.

Figure 17C:
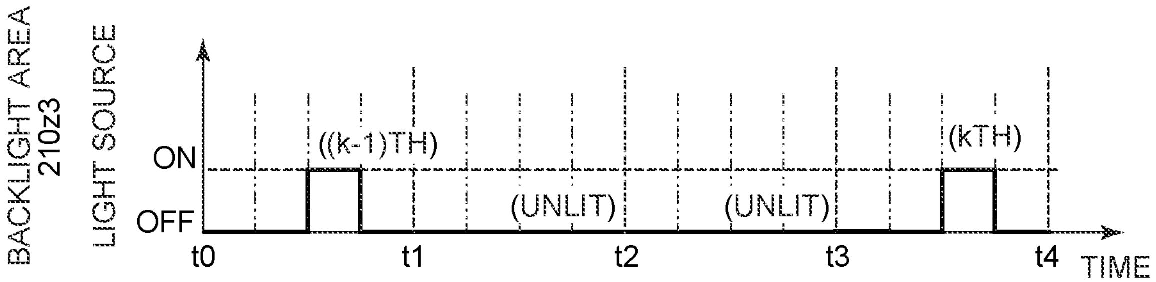
FIG. 17C is a timing chart showing a timing of controlling outputs of the light sources belonging to the area 210z3 according to the fourth embodiment.

FIG. 17C is a timing chart showing the timing of controlling the outputs of the light sources belonging to the area 210*z*3 according to the fourth embodiment.

Figure 17D:
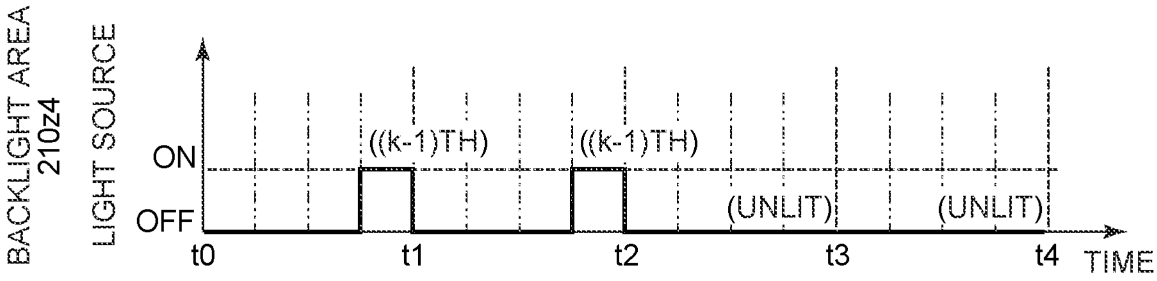
FIG. 17D is a timing chart showing a timing of controlling outputs of the light sources belonging to the area 210z4 according to the fourth embodiment.

FIG. 17D is a timing chart showing the timing of controlling the outputs of the light sources belonging to the area 210*z*4 according to the fourth embodiment.

The fourth embodiment differs from the third embodiment in that after the light sources 116 of the light-emitting regions 111*s* included in the area 210*z* of the backlight 210 are caused to be unlit, the light sources 116 of the light-emitting regions 111*s* included in the next area 210*z* to be controlled also are caused to be unlit.

Specifically, for example, between the time to and the time t1 as shown in FIGS. 17A and 17B, the backlight driver 150 causes not only the area 210*z*1 of the backlight 210 but also the area 210*z*2 to be unlit. Similarly, between the time t1 and the time t2 as shown in FIGS. 17B and 17C, the backlight driver 150 causes not only the area 210*z*2 of the backlight 210 but also the area 210*z*3 to be unlit. Similarly, between the time t2 and the time t3 as shown in FIGS. 17C and 17D, the backlight driver 150 causes not only the area 210*z*3 of the backlight 210 but also the area 210*z*4 to be unlit. Similarly, between the time t3 and the time t4 as shown in FIGS. 17A and 17D, the backlight driver 150 causes not only the area 210*z*4 of the backlight 210 but also the area 210*z*1 to be unlit.

Thus, the light sources 116 of the multiple areas 210*z* may be sequentially unlit. In such a case as well, the user can be prevented from seeing the image corresponding to the (k−1)th input image 910 as an afterimage directly after the switching. It is favorable for the areas 210*z* to be consecutively unlit particularly when the number of the areas 210*z* is high.

Fifth Embodiment

A fifth embodiment will now be described.

Figure 18:
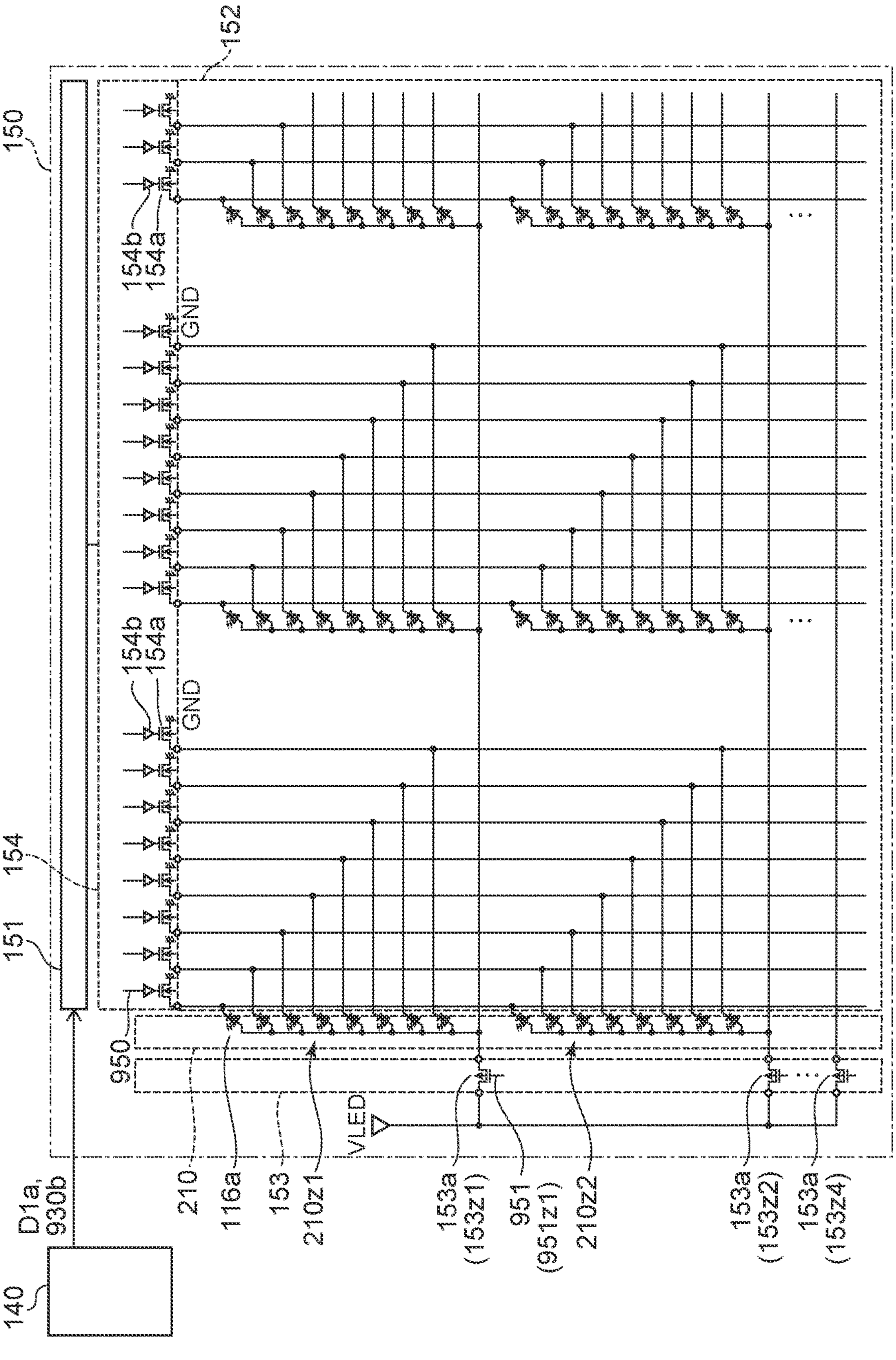
FIG. 18 is a circuit diagram showing a portion of an image display device according to a fifth embodiment.

FIG. 18 is a circuit diagram showing a portion of an image display device according to the fifth embodiment.

The fifth embodiment is a more specific example of the third embodiment.

As shown in FIG. 18, the backlight driver 150 includes the data storage 151, the driver 152, the area switching module 153, and the timing adjustment module 154. Although the backlight 210 is illustrated in the backlight driver 150 for convenience of illustration in FIG. 18, in practice, the backlight 210 is located outside the driver 150. This is similar for FIG. 20 below as well.

The sub-synchronization signal 930*b* and the control signal D1*a* of the backlight 210 are input from the timing controller 140 to the data storage 151. The control signal D1*a* is a serial peripheral interface (SPI) signal. The data storage 151 stores the control signal D1*a* synchronously with the sub-synchronization signal 930*b* for a certain period and outputs the control signal D1*a* to the timing adjustment module 154.

The timing adjustment module 154 includes multiple switching elements 154*a* and multiple buffers 154*b*. The switching element 154*a* and the buffer 154*b* are provided for each light-emitting element 116*a*. In an example, the switching element 154*a* is an n-channel MOSFET. The source of the switching element 154*a* is connected to a ground potential GND; the drain is connected to the cathode of the light-emitting element 116*a*; and the gate is connected to the output of the buffer 154*b*. The timing adjustment module 154 generates a drive signal 950 to drive the light-emitting elements 116*a* of the backlight 210 based on the control signal D1*a* and inputs the drive signal 950 to the gates of the switching elements 154*a* via the buffers 154*b*, respectively.

The area switching module 153 includes multiple switching elements 153*a*. In an example, the switching elements 153*a* are p-channel MOSFETs. The switching element 153*a* is provided for each area of the backlight 210. The source of the switching element 153*a* is connected to a lighting potential VLED; and the drain is commonly connected to the anodes of the light-emitting elements 116*a* included in the areas of the backlight 210. The lighting potential VLED is a potential for causing the light-emitting elements 116*a* to be lit, and is greater than the ground potential GND. A switch signal 951 is input to the gates of the switching elements 153*a*. In other words, the switching elements 153*a* switch between whether or not the lighting potential VLED, i.e., the power supply potential, is applied to the light sources 116 for each of the areas of the backlight 210.

According to the present embodiment, the switching element 153*a* connected to the light-emitting elements 116*a* located in the area 210*z*1 of the backlight 210 is called a "switching element 153*z*1"; and the switch signal 951 input to the gate of the switching element 153*z*1 is called a "switch signal 951*z*1". Similarly, the switching elements 153*a* connected to the light-emitting elements 116*a* located in the areas 210*z*2, 210*z*3, and 210*z*4 are respectively called switching elements 153*z*2, 153*z*3, and 153*z*4; and the switch signals 951 input to the gates of these elements are respectively called switch signals 951*z*2, 951*z*3, and 951*z*4.

Operations of the present embodiment will now be described.

Figure 19A:
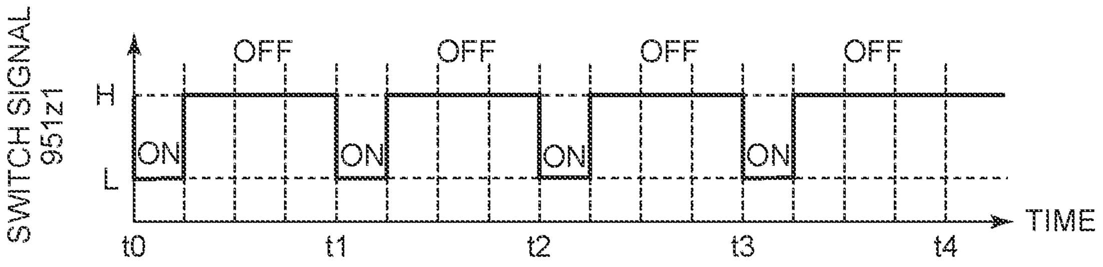
FIG. 19A is a timing chart showing a timing of controlling the area 210z1 according to the fifth embodiment.

FIG. 19A is a timing chart showing the timing of controlling the area 210*z*1 according to the present embodiment.

Figure 19B:
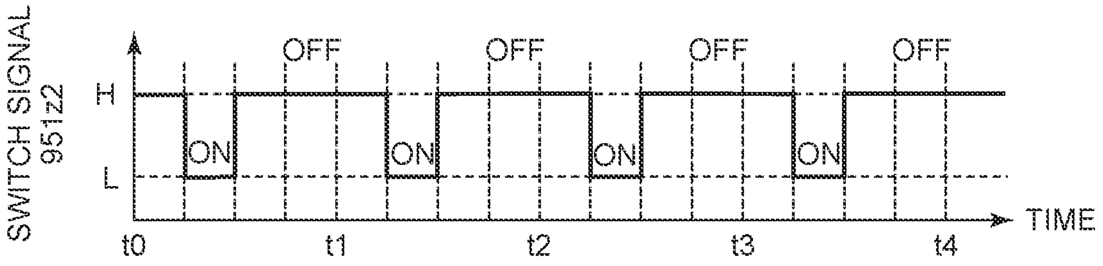
FIG. 19B is a timing chart showing a timing of controlling the area 210z2 according to the fifth embodiment.

FIG. 19B is a timing chart showing the timing of controlling the area 210*z*2 according to the present embodiment.

Figure 19C:
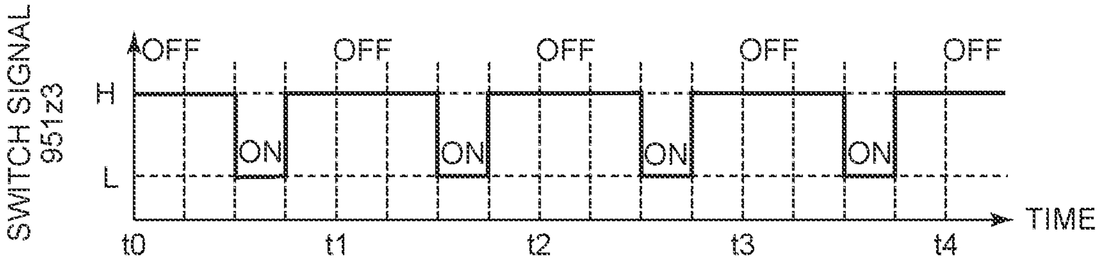
FIG. 19C is a timing chart showing a timing of controlling the area 210z3 according to the fifth embodiment.

FIG. 19C is a timing chart showing the timing of controlling the area 210*z*3 according to the present embodiment.

Figure 19D:
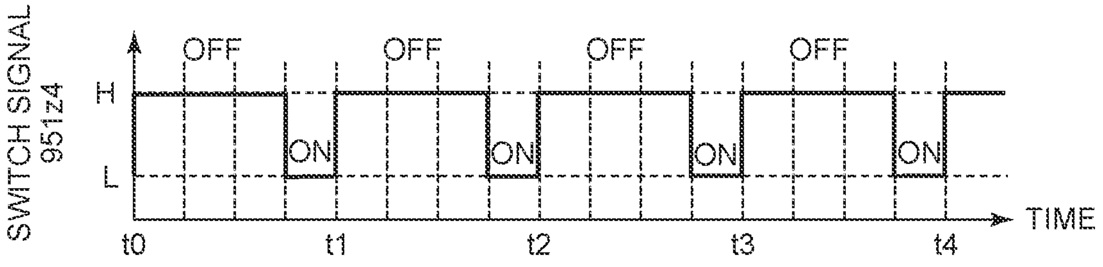
FIG. 19D is a timing chart showing a timing of controlling the area 210z4 according to the fifth embodiment.

FIG. 19D is a timing chart showing the timing of controlling the area 210*z*4 according to the present embodiment.

As shown in FIGS. 14G and 19A, at the timing of causing the area 210*z*1 of the backlight 210 to be lit, the switch signal 951*z*1 is set to "L" (low), and the switching element 153*z*1 that is a p-channel MOSFET is switched on. On the other hand, at this time, the switch signals 951*z*2 to 951*z*4 are set to "H" (high), and the switching elements 153*z*2 to 153*z*4 are switched off.

Thereby, as shown in FIG. 18, the anodes of the light-emitting elements 116*a* of the area 210*z*1 are connected to the lighting potential VLED. On the other hand, the anodes of the light-emitting elements 116*a* of the areas 210*z*2 to 210*z*4 are not connected to the lighting potential VLED.

When the timing adjustment module 154 inputs the drive signal 950 to the gates of the switching elements 154*b* via the buffers 154*b* in this state, the cathodes of the light-emitting elements 116*a* of the area 210*z*1 are connected to the ground potential GND; and currents flow in the light-emitting elements 116*a*. The light-emitting elements 116*a* are lit thereby. At this time, the prescribed gradations are achieved by time-shared control by the drive signal 950 of the time that the light-emitting elements 116*a* are lit. On the other hand, the light-emitting elements 116*a* are not lit in the areas 210*z*2 to 210*z*4.

When the liquid crystal panel 220 causes the area 210*z*1 of the backlight 210 to be unlit while switching from the (k−1)th input image 910 to the kth input image 910 as shown in FIGS. 15 and 16A, the drive signal 950 that is input to the light-emitting elements 116*a* of the area 210*z*1 is set to a signal to cause the gradations to be 0.

Similarly, at the timing of causing the area 210*z*2 to be lit as shown in FIGS. 14H and 19B, the switch signal 951*z*2 is set to "L", and the switching element 153*z*2 is switched on. Thereby, the light-emitting elements 116*a* of the area 210*z*2 are lit based on the drive signal 950. When the area 210*z*2 is unlit as shown in FIG. 16B, the drive signal 950 that is input to the light-emitting elements 116*a* of the area 210*z*2 is set to a signal to cause the gradations to be 0.

Similarly, at the timing of causing the area 210*z*3 to be lit as shown in FIGS. 14I and 19C, the switch signal 951*z*3 is set to "L", and the switching element 153*z*3 is switched on.

Thereby, the light-emitting elements 116*a* of the area 210*z*3 are lit based on the drive signal 950. In such a case as well, when the area 210*z*3 is unlit as shown in FIG. 16C, the drive signal 950 that is input to the light-emitting elements 116*a* of the area 210*z*3 is a signal to cause the gradations to be 0.

Similarly, at the timing of causing the area 210*z*4 to be lit as shown in FIGS. 14J and 19D, the switch signal 951*z*4 is set to "L", and the switching element 153*z*4 is switched on. Thereby, the light-emitting elements 116*a* of the area 210*z*4 are lit based on the drive signal 950. In such a case as well, when the area 210*z*4 is unlit as shown in FIG. 16D, the drive signal 950 that is input to the light-emitting elements 116*a* of the area 210*z*4 is a signal to cause the gradations to be 0.

Thereafter, by repeating similar operations, the light-emitting elements 116*a* can be caused to be unlit while switching from the (k−1)th input image 910 to the kth input image 910. Thereby, the afterimage can be suppressed as described in the third embodiment.

Sixth Embodiment

A sixth embodiment will now be described.

Figure 20:
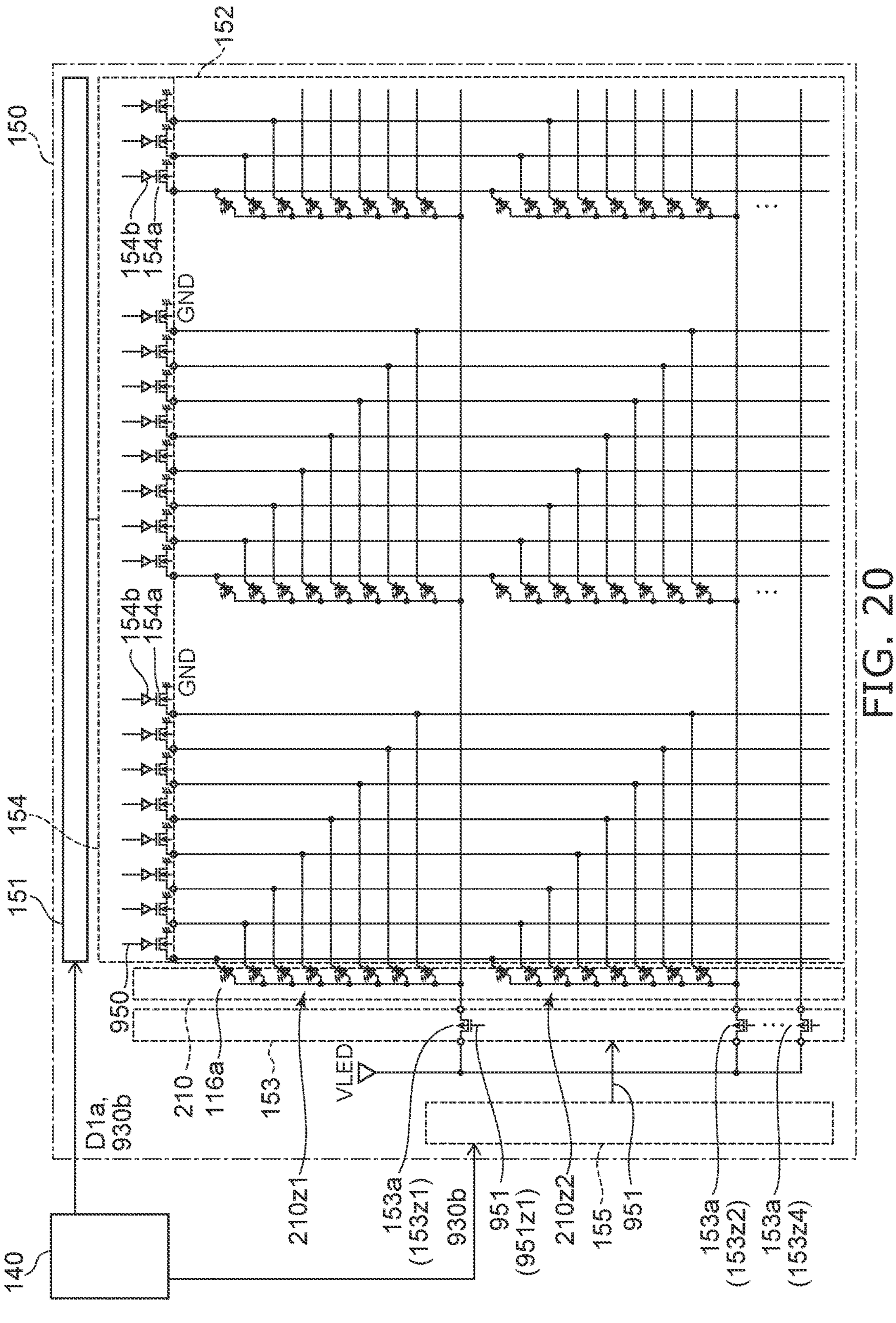
FIG. 20 is a circuit diagram showing a portion of an image display device according to a sixth embodiment.

FIG. 20 is a circuit diagram showing a portion of an image display device according to the sixth embodiment.

Figure 21:
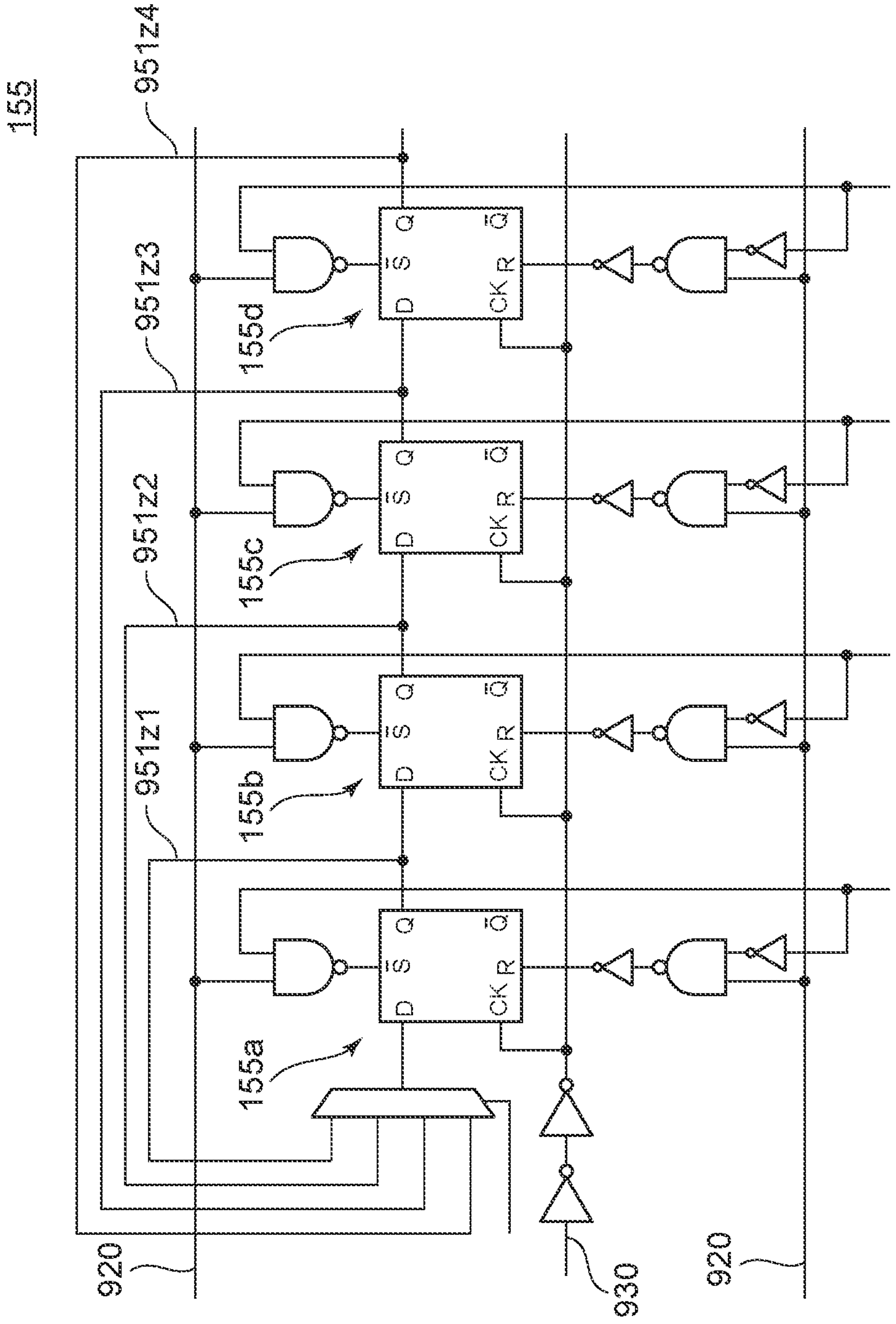
FIG. 21 is a circuit diagram showing a switch signal generator according to the sixth embodiment.

FIG. 21 is a circuit diagram showing a switch signal generator according to the sixth embodiment.

The sixth embodiment is an example of an improvement of the fifth embodiment.

According to the sixth embodiment as shown in FIG. 20, the backlight driver 150 includes the switch signal generator 155 in addition to the data storage 151, the driver 152, the area switching module 153, and the timing adjustment module 154. The switch signal generator 155 generates the switch signal 951 and outputs the switch signal 951 to the area switching module 153.

As shown in FIG. 21, the switch signal generator 155 includes D-type flip-flop circuits 155*a* to 155*d* having four stages. The number of stages of the D-type flip-flop circuits 155*a* to 155*d* is equal to the number of subdivisions of the areas 210*z*1 to 210*z*4. The synchronization signal 920 is input to the S and R terminals of each stage of the D-type flip-flop circuits 155*a* to 155*d*. The sub-synchronization signal 930 is input to the C terminal of each stage of the D-type flip-flop circuits 155*a* to 155*d*. The switch signals 951*z*1 to 951*z*4 are output from the Q terminals of the D-type flip-flop circuits 155*a* to 155*d*.

The switch signals 951*z*1 to 951*z*4 are input to the D terminal of the D-type flip-flop circuit 155*a* of the first stage as masking signals. The D terminals of the D-type flip-flop circuits 155*b* to 155*d* of the second and subsequent stages are connected to the Q terminals of the D-type flip-flop circuits 155*a* to 155*c* of the previous stages, and receive the outputs of the D-type flip-flop circuits of the previous stages. By such a configuration, the D-type flip-flop circuits 155*a* to 155*d* of the four stages repeatedly output the same switch signals 951*z*1 to 951*z*4. As described in the fifth embodiment, the switch signals 951*z*1 to 951*z*4 are input respectively to the gates of the switching elements 153*z*1 to 153*z*4 of the area switching module 153.

Operations of the present embodiment will now be described.

Figure 22A:
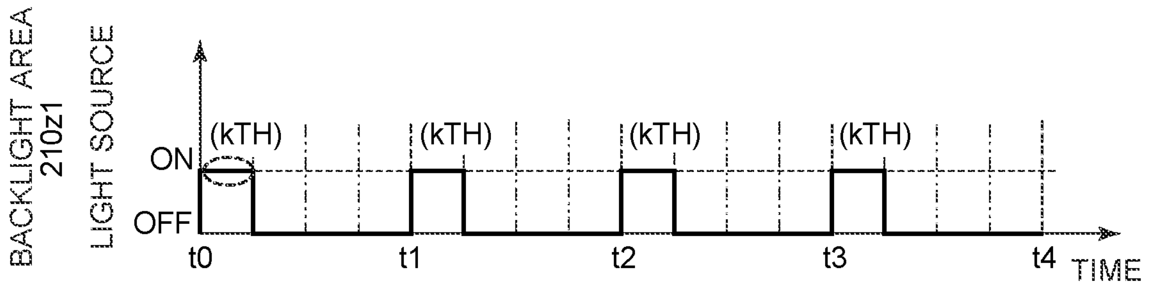
FIG. 22A is a timing chart showing a timing of controlling outputs of the light sources belonging to the area 210z1 according to the sixth embodiment.

FIG. 22A is a timing chart showing the timing of controlling the outputs of the light sources belonging to the area 210*z*1 according to the present embodiment.

Figure 22B:
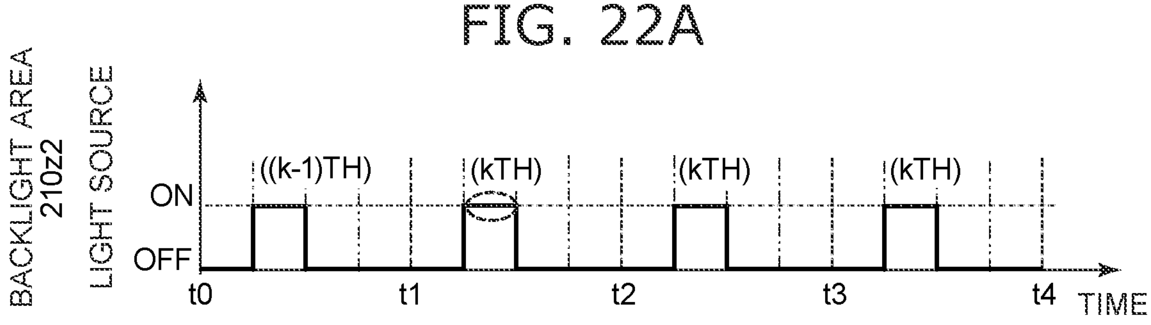
FIG. 22B is a timing chart showing a timing of controlling outputs of the light sources belonging to the area 210z2 according to the sixth embodiment.

FIG. 22B is a timing chart showing the timing of controlling the outputs of the light sources belonging to the area 210*z*2 according to the present embodiment.

Figure 22C:
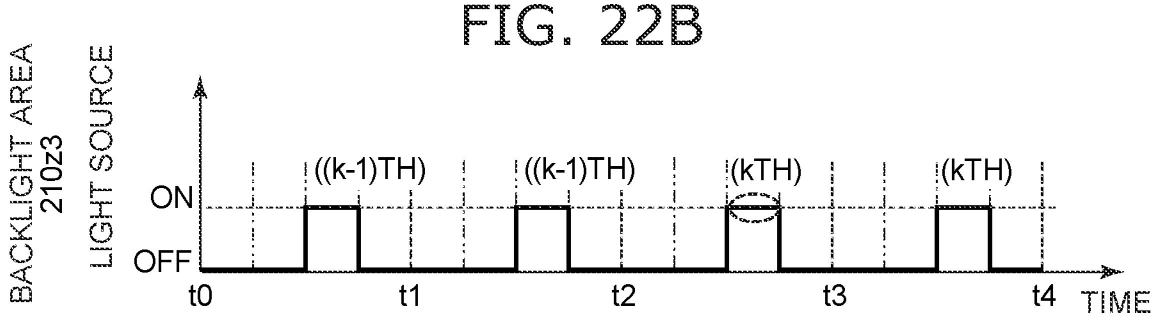
FIG. 22C is a timing chart showing a timing of controlling outputs of the light sources belonging to the area 210z3 according to the sixth embodiment.

FIG. 22C is a timing chart showing the timing of controlling the outputs of the light sources belonging to the area 210z3 according to the present embodiment.

Figure 22D:
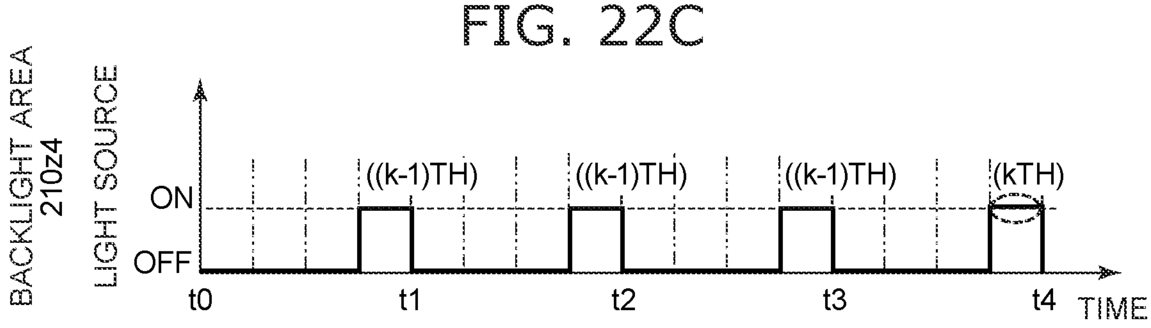
FIG. 22D is a timing chart showing a timing of controlling outputs of the light sources belonging to the area 210*z*4 according to the sixth embodiment.

FIG. 22D is a timing chart showing the timing of controlling the outputs of the light sources belonging to the area 210z4 according to the present embodiment.

Figure 23A:
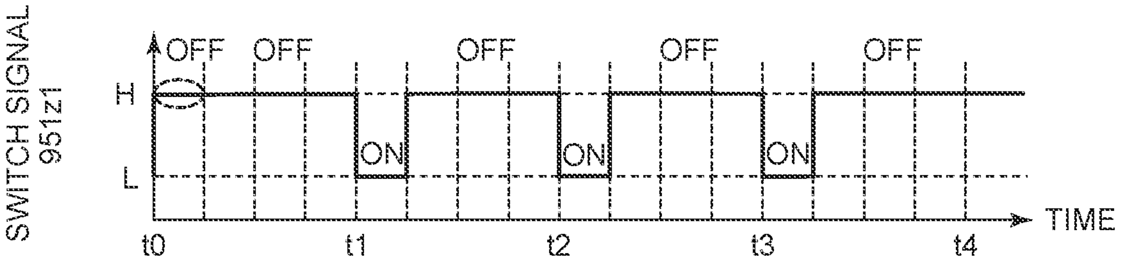
FIG. 23A is a timing chart view showing a timing of controlling the area 210*z*1 according to the sixth embodiment.

FIG. 23A is a timing chart showing the timing of controlling the area 210z1 of the present embodiment.

Figure 23B:
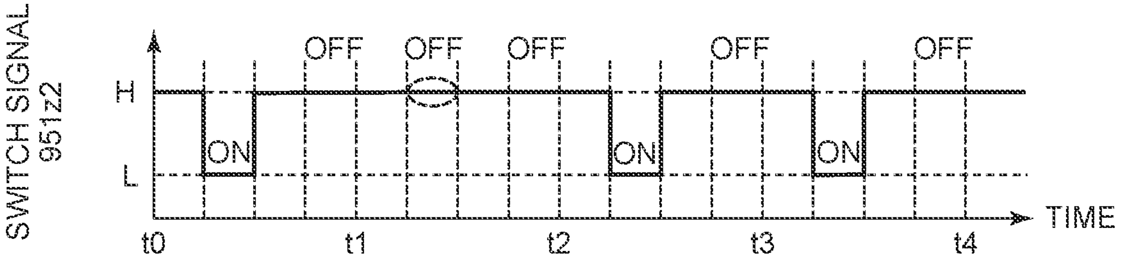
FIG. 23B is a timing chart showing a timing of controlling the area 210*z*2 according to the sixth embodiment.

FIG. 23B is a timing chart showing the timing of controlling the area 210z2 of the present embodiment.

Figure 23C:
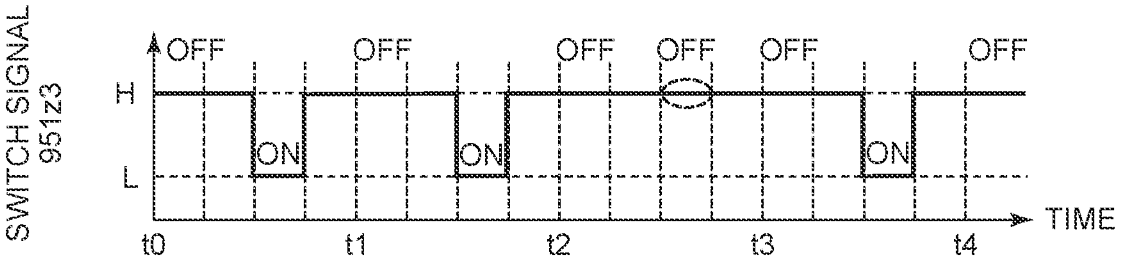
FIG. 23C is a timing chart showing a timing of controlling the area 210*z*3 according to the sixth embodiment.

FIG. 23C is a timing chart showing the timing of controlling the area 210z3 of the present embodiment.

Figure 23D:
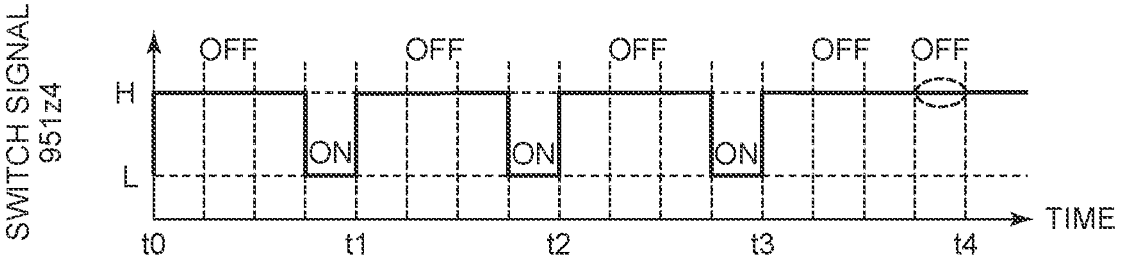
FIG. 23D is a timing chart showing a timing of controlling the area 210*z*4 according to the sixth embodiment.

FIG. 23D is a timing chart showing the timing of controlling the area 210z4 of the present embodiment.

FIGS. 22A to 22D correspond respectively to FIGS. 14G to 14J of the third embodiment. FIGS. 23A to 23D correspond respectively to FIGS. 19A to 19D of the fifth embodiment. For easier viewing of the drawings, the differences between FIGS. 22A to 22D and FIGS. 14G to 14J are illustrated by broken line ellipses. Similarly, the difference between FIGS. 23A to 23D and FIGS. 19A to 19D are illustrated by broken line ellipses.

Between the time to and the time t1 as shown in FIG. 14B, the voltages applied to the pixels 120p switch to the values corresponding to the kth control signal D2a in the area 220z1 of the liquid crystal panel 220. At this time, as shown in FIG. 22A, the drive signal 950 that is input to the light-emitting elements 116a of the area 210z1 is set to a normal signal, i.e., a signal based on the control signal D1a input from the timing controller 140.

On the other hand, as shown in FIG. 23A, the switch signal generator 155 sets the switch signal 951z1 to "H", and switches the switching element 153z1 off. As described above, the switching element 153z1 is an element that switches between a state where the lighting potential VLED is applied to the light sources 116 located in the area 210z1 of the backlight 210 and a state where the light potential VLED is not applied thereto. By switching the switching element 153z1 off, the light-emitting elements 116a that are connected to the switching element 153z1 are disconnected from the lighting potential VLED and unlit regardless of the drive signal 950 as shown in FIG. 20. As a result, the area 210z1 of the backlight 210 is unlit, and a black image is displayed in the first part 221 of the liquid crystal panel 220 as shown in FIG. 16A. The (k−1)th image is displayed in the second, third, and fourth parts 222, 223, and 224 of the liquid crystal panel 220.

Between the time t1 and the time t2 as shown in FIG. 14C, the voltages applied to the pixels 120p switch to the values corresponding to the kth control signal D2a in the area 220z2 of the liquid crystal panel 220. At this time, as shown in FIG. 22B, the drive signal 950 that is input to the light-emitting elements 116a of the area 210z2 is set to a normal signal, i.e., a signal based on the control signal D1a input from the timing controller 140.

On the other hand, as shown in FIG. 23B, the switch signal generator 155 sets the switch signal 951z2 to "H" and switches the switching element 153z2 off. Thereby, as shown in FIG. 20, the light-emitting elements 116a that are connected to the switching element 153z2 are disconnected from the lighting potential VLED and are unlit regardless of the drive signal 950. As a result, the area 210z2 of the backlight 210 is unlit, and a black image is displayed in the second part 222 of the liquid crystal panel 220 as shown in FIG. 16B. The kth image is displayed in the first part 221 of the liquid crystal panel 220; and the (k−1)th image is displayed in the third and fourth parts 223 and 224.

Between the time t2 and the time t3 as shown in FIG. 14D, the voltages applied to the pixels 120p switch to the values corresponding to the kth control signal D2a in the area 220z3 of the liquid crystal panel 220. At this time, as shown in FIG. 22C, the drive signal 950 that is input to the light-emitting elements 116a of the area 210z3 is set to a normal signal.

On the other hand, as shown in FIG. 23C, the switch signal generator 155 sets the switch signal 951z3 to "H" and switches the switching element 153z3 off. Thereby, the light-emitting elements 116a that are connected to the switching element 153z3 are disconnected from the lighting potential VLED and are unlit regardless of the drive signal 950. As a result, the area 210z3 of the backlight 210 is unlit, and a black image is displayed in the third part 223 as shown in FIG. 16C. The kth image is displayed in the first and second parts 221 and 222 of the liquid crystal panel 220; and the (k−1)th image is displayed in the fourth part 224.

Between the time t3 and the time t4 as shown in FIG. 14E, the voltages applied to the pixels 120p switch to the values corresponding to the kth control signal D2a in the area 220z4 of the liquid crystal panel 220. At this time, as shown in FIG. 22D, the drive signal 950 that is input to the light-emitting elements 116a of the area 210z4 is set to a normal signal.

On the other hand, as shown in FIG. 23D, the switch signal generator 155 sets the switch signal 951z4 to "H" and switches the switching element 153z4 off. Thereby, the light-emitting elements 116a that are connected to the switching element 153z4 are disconnected from the lighting potential VLED and are unlit regardless of the drive signal 950. As a result, the area 210z4 of the backlight 210 is unlit, and a black image is displayed in the fourth part 224 of the liquid crystal panel 220 as shown in FIG. 16D. The kth image is displayed in the first, second, and third parts 221, 222, and 223 of the liquid crystal panel 220. Thereafter, the operations of the time t0 to the time t4 described above are repeated.

According to the present embodiment, the switch signal generator 155 generates the switch signal 951, and the switch signal 951 sequentially switches the switching elements 153a of the area switching module 153 off; thereby, the light-emitting elements 116a are disconnected from the lighting potential VLED, and the areas 210z1 to 210z4 of the backlight 210 are sequentially unlit. Thereby, a black image can be displayed in the parts of the liquid crystal panel 220 by a simple technique of switching the switching elements 153a off without especially needing to generate the drive signal 950 to set the gradations of the light-emitting elements 116a of each area to 0. As a result, the load of the operation of the backlight driver 150 can be reduced, and a higher speed can be achieved.

First Modification of Sixth Embodiment

A first modification of the sixth embodiment will now be described.

Figure 24:
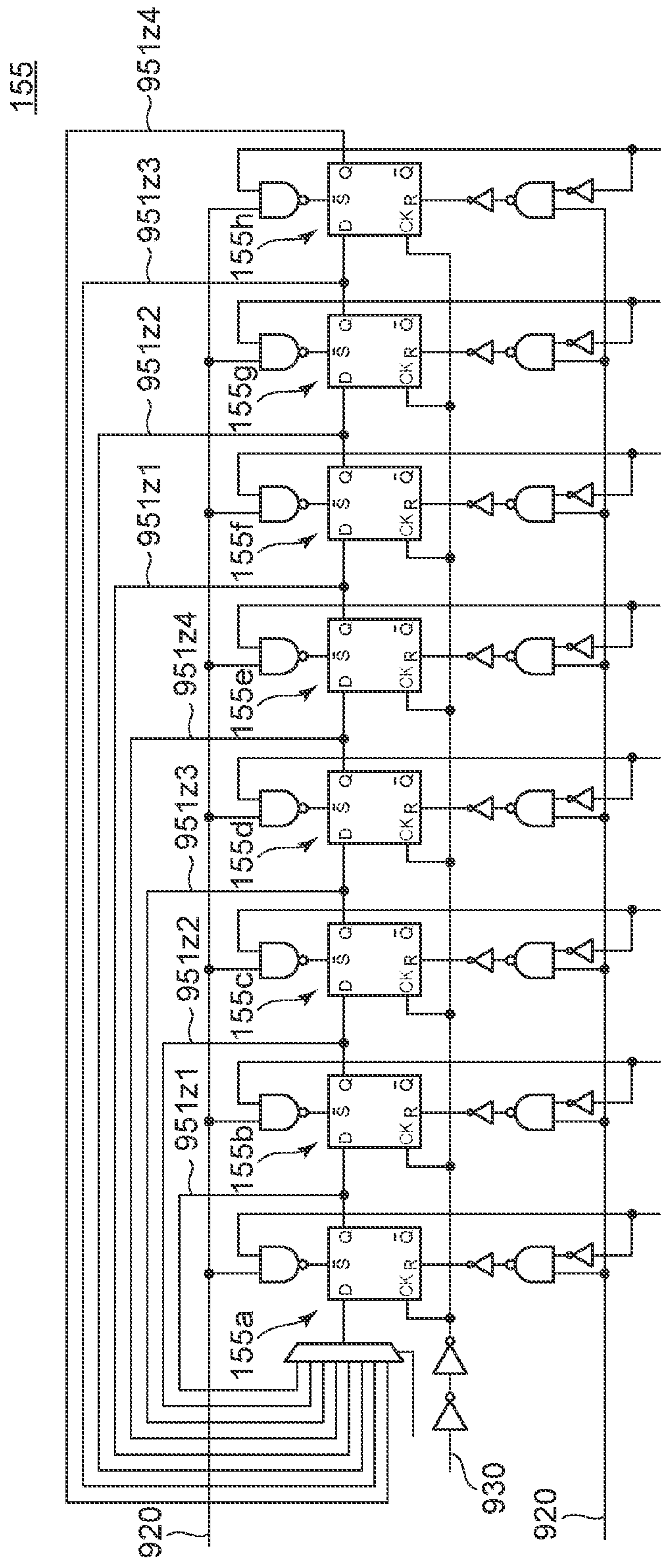
FIG. 24 is a circuit diagram showing a switch signal generator according to a first modification of the sixth embodiment.

FIG. 24 is a circuit diagram showing a switch signal generator according to the first modification.

Figure 25A:
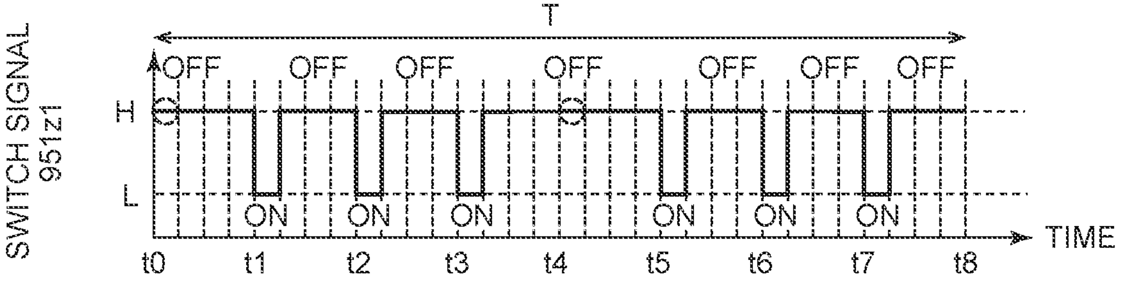
FIG. 25A is a timing chart showing a timing of controlling the area 210*z*1 according to the first modification of the sixth embodiment.

FIG. 25A is a timing chart showing the timing of controlling the area 210z1 according to the first modification.

Figure 25B:
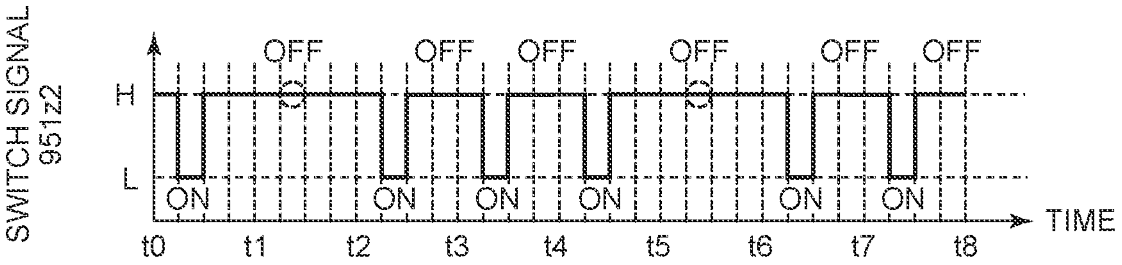
FIG. 25B is a timing chart showing a timing of controlling the area 210*z*2 according to the first modification of the sixth embodiment.

FIG. 25B is a timing chart showing the timing of controlling the area 210z2 according to the first modification.

Figure 25C:
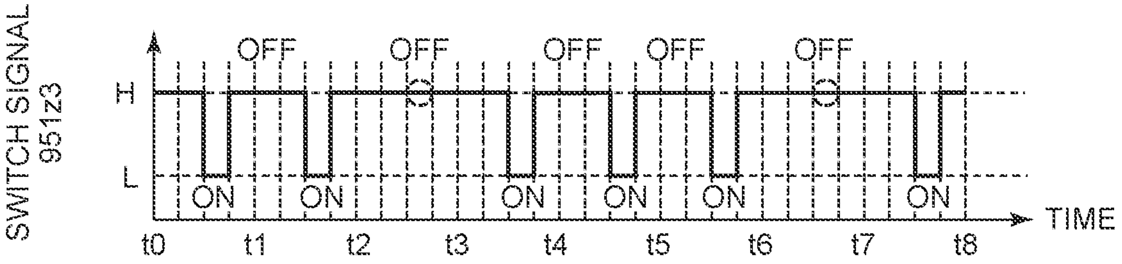
FIG. 25C is a timing chart showing a timing of controlling the area 210*z*3 according to the first modification of the sixth embodiment.

FIG. 25C is a timing chart showing the timing of controlling the area 210z3 according to the first modification.

Figure 25D:
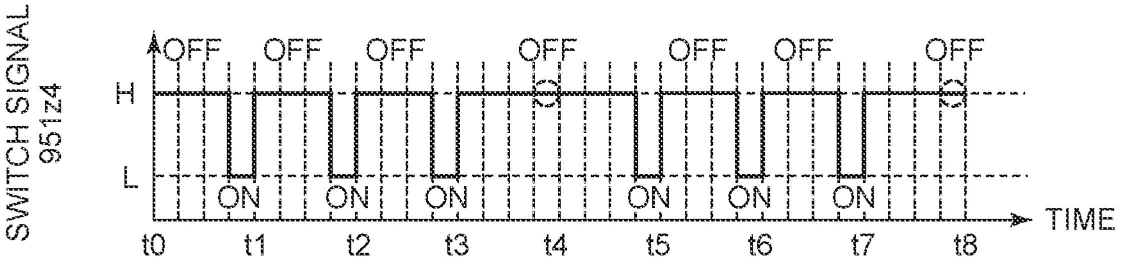
FIG. 25D is a timing chart showing a timing of controlling the area 210*z*4 according to the first modification of the sixth embodiment.

FIG. 25D is a timing chart showing the timing of controlling the area 210z4 according to the first modification.

In FIGS. 25A to 25D, the periods at which corresponding areas are unlit by setting the switch signal 951 to "H" are illustrated by broken line ellipses. This is similar for FIGS. 26A to 28D below as well.

In the switch signal generator 155 according to the first modification as shown in FIG. 24, the D-type flip-flop circuits 155*a* to 155*h* have eight stages connected in series. The output signals of the D-type flip-flop circuits 155*a* to 155*h* are input as masking signals to the D terminal of the D-type flip-flop circuit 155*a* of the first stage.

Operations of the first modification will now be described.

According to the first modification as shown in FIGS. 25A to 25D, each period T is subdivided into eight subperiods, and one area is unlit for each subperiod. Therefore, in each period T, each area is unlit two times. In other words, the area 210*z*1 is unlit between the time to and the time t1; the area 210*z*2 is unlit between the time t1 and the time t2; the area 210*z*3 is unlit between the time t2 and the time t3; the area 210*z*4 is unlit between the time t3 and the time t4; the area 210*z*1 is unlit again between the time t4 and the time t5; the area 210*z*2 is unlit again between the time t5 and the time t6; the area 210*z*3 is unlit again between the time t6 and the time t7; and the area 210*z*4 is unlit again between the time t7 and the time t8. According to the first modification, the time t8 of one period T is the time to of the next one period T.

Thereby, according to the first modification, for example, when two images are displayed in the one period T by using an image compensation circuit, a black image can be displayed in the period directly after switching the voltages applied to the pixels 120*p* of the liquid crystal panel 220 to the values corresponding to the next image.

Second Modification of Sixth Embodiment

A second modification of the sixth embodiment will now be described.

Figure 26A:
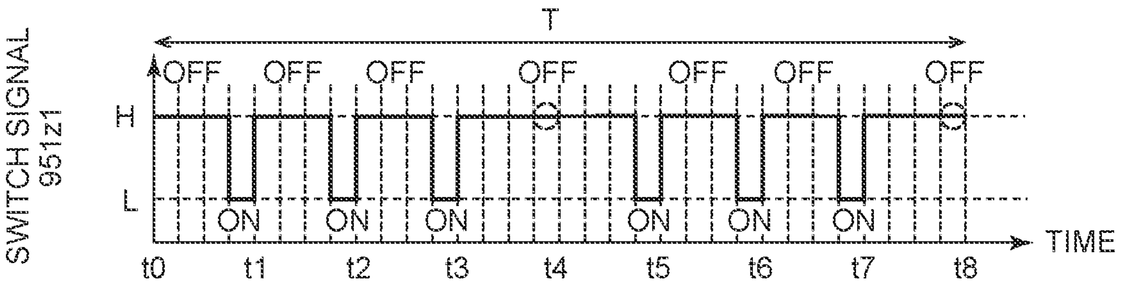
FIG. 26A is a timing chart showing a timing of controlling the area 210*z*1 according to a second modification of the sixth embodiment.

FIG. 26A is a timing chart showing the timing of controlling the area 210*z*1 according to the second modification.

Figure 26B:
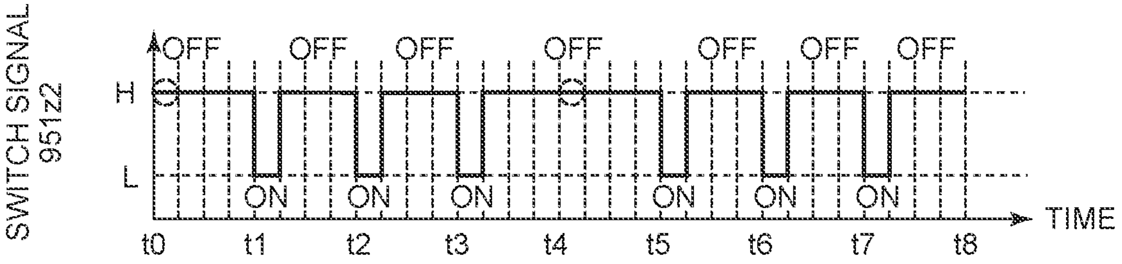
FIG. 26B is a timing chart showing a timing of controlling the area 210*z*2 according to the second modification of the sixth embodiment.

FIG. 26B is a timing chart showing the timing of controlling the area 210*z*2 according to the second modification.

Figure 26C:
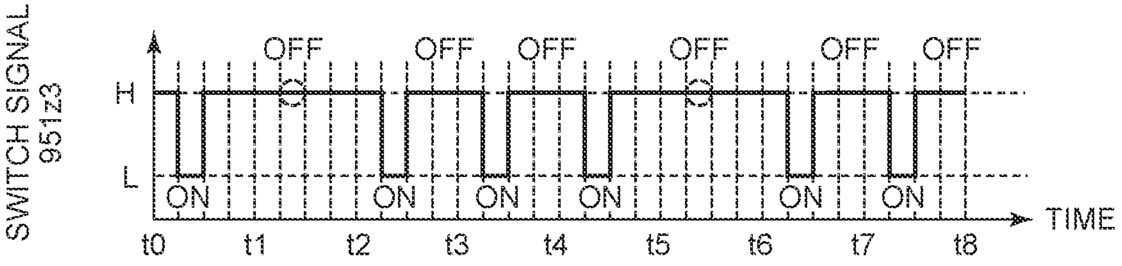
FIG. 26C is a timing chart showing a timing of controlling the area 210*z*3 according to the second modification of the sixth embodiment.

FIG. 26C is a timing chart showing the timing of controlling the area 210*z*3 according to the second modification.

Figure 26D:
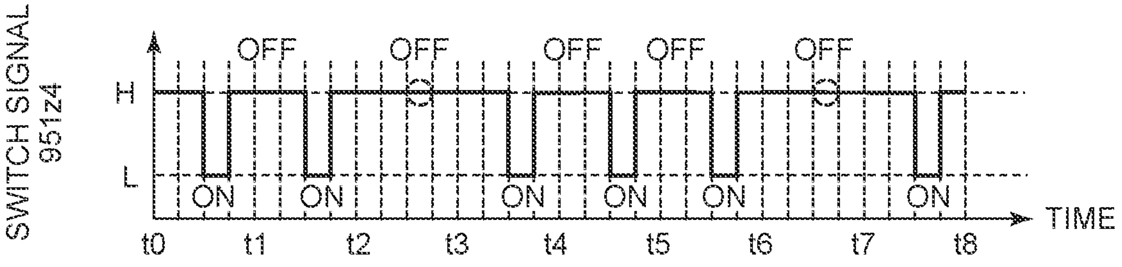
FIG. 26D is a timing chart showing a timing of controlling the area 210*z*4 according to the second modification of the sixth embodiment.

FIG. 26D is a timing chart showing the timing of controlling the area 210*z*4 according to the second modification.

According to the second modification as shown in FIGS. 26A to 26D, the unlit area is started from the area 210*z*2. In other words, the area 210*z*2 is unlit between the time to and the time t1; the area 210*z*3 is unlit between the time t1 and the time t2; the area 210*z*4 is unlit between the time t2 and the time t3; and the area 210*z*1 is unlit between the time t3 and the time t4. The area 210*z*2 is unlit between the time t4 and the time t5; the area 210*z*3 is unlit between the time t5 and the time t6; the area 210*z*4 is unlit between the time t6 and the time t7; and the area 210*z*1 is unlit between the time t7 and the time t8.

Thereby, according to the second modification, when two images are displayed in the one period T, a black image is displayed in the period directly before switching the voltages applied to the pixels 120*p* of the liquid crystal panel 220 to the values corresponding to the next image. According to the compatibility between the backlight and the liquid crystal panel, there are cases where such driving enables good image quality. Thus, according to the modification, the driving can correspond to the characteristics of the liquid crystal panel.

Third Modification of Sixth Embodiment

A third modification of the sixth embodiment will now be described.

Figure 27A:
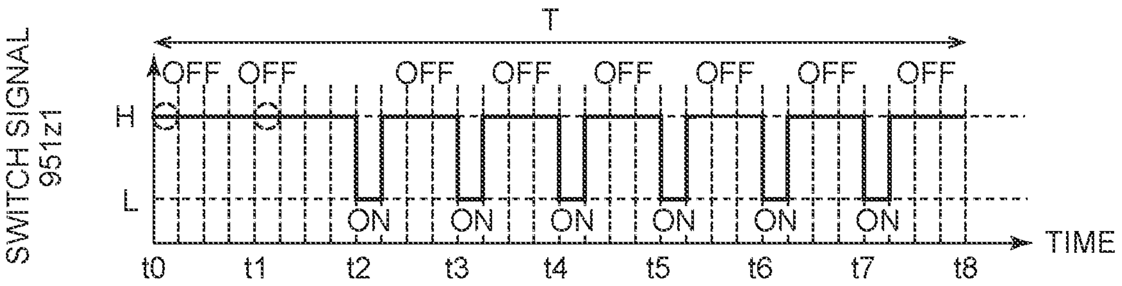
FIG. 27A is a timing chart showing a timing of controlling the area 210*z*1 according to a third modification of the sixth embodiment.

FIG. 27A is a timing chart showing the timing of controlling the area 210*z*1 according to the third modification.

Figure 27B:
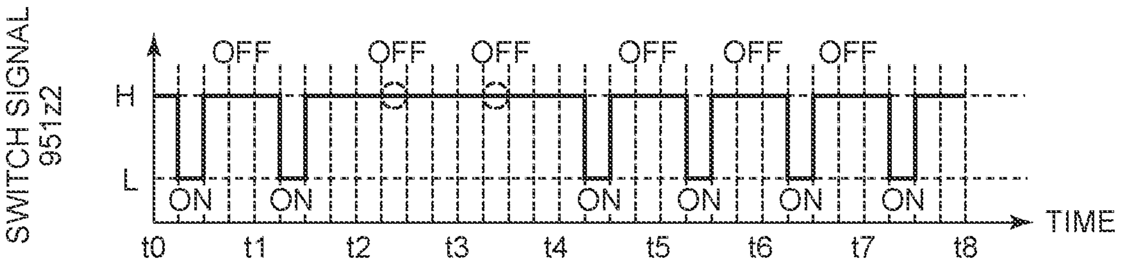
FIG. 27B is a timing chart showing a timing of controlling the area 210*z*2 according to the third modification of the sixth embodiment.

FIG. 27B is a timing chart showing the timing of controlling the area 210*z*2 according to the third modification.

Figure 27C:
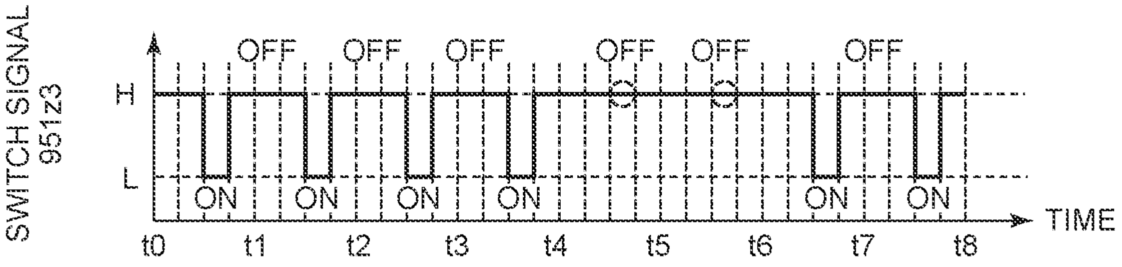
FIG. 27C is a timing chart showing a timing of controlling the area 210*z*3 according to the third modification of the sixth embodiment.

FIG. 27C is a timing chart showing the timing of controlling the area 210*z*3 according to the third modification.

Figure 27D:
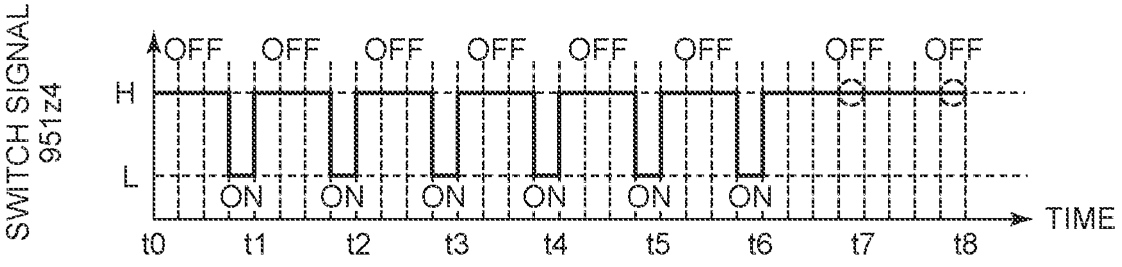
FIG. 27D is a timing chart showing a timing of controlling the area 210*z*4 according to the third modification of the sixth embodiment.

FIG. 27D is a timing chart showing the timing of controlling the area 210*z*4 according to the third modification.

According to the third modification as shown in FIGS. 27A to 27D, each area is unlit in two consecutive subperiods. In other words, the area 210*z*1 is unlit between the time to and the time t1; and the area 210*z*1 is unlit again between the time t1 and the time t2 that follow. The area 210*z*2 is unlit between the time t2 and the time t3; and the area 210*z*2 is unlit again between the time t3 and the time t4 that follow. The area 210*z*3 is unlit between the time t4 and the time t5; and the area 210*z*3 is unlit again between the time t5 and the time t6 that follow. The area 210*z*4 is unlit between the time t6 and the time t7; and the area 210*z*4 is unlit again between the time t7 and the time t8 that follow.

According to the third modification, when one image is displayed in each period T, a black image is displayed in the period directly after switching the voltages applied to the pixels 120*p* of the liquid crystal panel 220 to the values corresponding to the next image. At this time, the time that the black image is displayed can be lengthened; therefore, the visibility of the afterimage directly after switching to the next image can be further suppressed.

Fourth Modification of Sixth Embodiment

A fourth modification of the sixth embodiment will now be described.

Figure 28A:
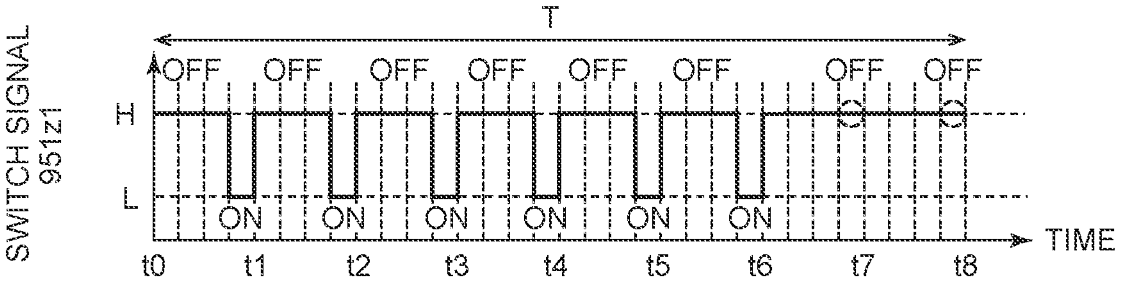
FIG. 28A is a timing chart showing a timing of controlling the area 210*z*1 according to a fourth modification of the sixth embodiment.

FIG. 28A is a timing chart showing the timing of controlling the area 210*z*1 according to the fourth modification.

Figure 28B:
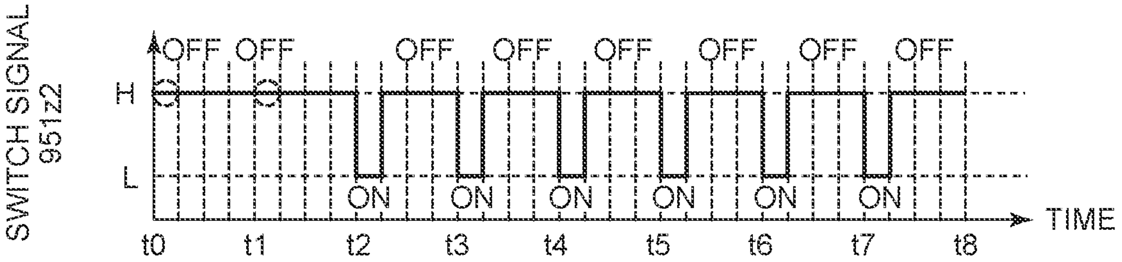
FIG. 28B is a timing chart showing a timing of controlling the area 210*z*2 according to the fourth modification of the sixth embodiment.

FIG. 28B is a timing chart showing the timing of controlling the area 210*z*2 according to the fourth modification.

Figure 28C:
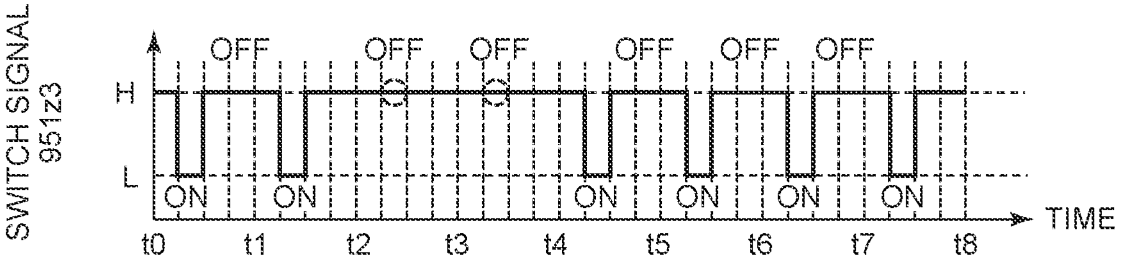
FIG. 28C is a timing chart showing a timing of controlling the area 210*z*3 according to the fourth modification of the sixth embodiment.

FIG. 28C is a timing chart showing the timing of controlling the area 210*z*3 according to the fourth modification.

Figure 28D:
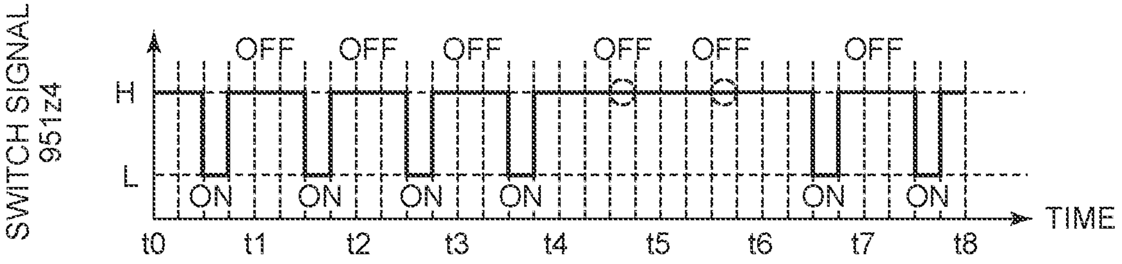
FIG. 28D is a timing chart showing the timing of controlling the area 210*z*4 according to the fourth modification of the sixth embodiment.

FIG. 28D is a timing chart showing the timing of controlling the area 210*z*4 according to the fourth modification.

According to the fourth modification as shown in FIGS. 28A to 28D, each area is unlit in two consecutive subperiods; and the unlit area is started from the area 210*z*2. In other words, the area 210*z*2 is unlit between the time to and the time t1; and the area 210*z*2 is unlit again between the time t1 and the time t2 that follow. The area 210*z*3 is unlit between the time t2 and the time t3; and the area 210*z*3 is unlit again between the time t3 and the time t4 that follow. The area 210*z*4 is unlit between the time t4 and the time t5; and the area 210*z*4 is unlit again between the time t5 and the time t6 that follow. The area 210*z*1 is unlit between the time t6 and the time t7; and the area 210*z*1 is unlit again between the time t7 and the time t8 that follow.

As described in the sixth embodiment and the first to fourth modifications, the periods in which the areas of the backlight 210 are unlit can be arbitrarily modified according to the compatibility with the liquid crystal panel. The periods in which the areas are unlit are not limited to the examples described above. Thereby, the backlight can be optimally driven according to the characteristics of the liquid crystal panel.

The configurations of the multiple embodiments and their modifications described above can be combined as appropriate within the extent of technical feasibility.

For example, embodiments of the invention can be utilized in a display of a device such as a television, a personal computer, a game machine, etc.

What is claimed is:

1. An image display method using an image display device including:

a backlight including a plurality of light-emitting regions arranged in a matrix configuration in a first direction and a second direction, the light-emitting regions being divided into a plurality of first areas in the first direction; and a liquid crystal panel on the backlight, the liquid crystal panel including a plurality of pixels arranged in a matrix configuration in the first and second directions, the pixels being divided into a plurality of second areas in the first direction, the method comprising:

generating, based on a synchronization signal, a subdivided synchronization signal having a period less than a period of the synchronization signal;

performing a first operation to cause light to be emitted from the light-emitting regions at respective intensity in accordance with frame image data, sequentially with respect to each of the first areas for a duration of time corresponding to the period of the synchronization signal; and performing a second operation to apply voltages to the pixels at respective levels in accordance with the frame image data, sequentially with respect to each of the second areas, wherein the first operation is started with respect to each of the first areas with a predetermined delay after the second operation with respect to a corresponding one of the second areas, the light-emitting regions in each of the first areas are repeatedly turned on and off a plurality of times at timings in correspondence with pulses of the subdivided synchronization signal during the first operation thereof, and a first time the light-emitting regions in each of the first areas are turned on during the first operation in accordance with the frame image data is a predetermined time period after a last time the light-emitting regions in each of the first areas are turned off in accordance with previous frame image data that is immediately prior to the frame image data, the predetermined time period being greater than the period of the subdivided synchronization signal.

2. The image display method according to claim 1, wherein the predetermined time period is greater than twice the period of the subdivided synchronization signal.

3. The image display method according to claim 1, wherein a number of times the light-emitting regions in each of the first areas are turned on and off during the first operation thereof is less than a number of pulses of the subdivided synchronization signal included in the period of the synchronization signal.

4. The image display method according to claim 3, wherein the light-emitting regions in each of the first areas are not turned on and off in correspondence with an earliest one of pulses of the subdivided synchronization signal that are generated during the first operation thereof.

5. The image display method according to claim 4, wherein the light-emitting regions in each of the first areas are not turned on and off in correspondence with a last one of pulses of the subdivided synchronization signal that are generated during the first operation thereof.

6. The image display method according to claim 3, wherein the light-emitting regions in each of the first areas are not turned on and off in correspondence with a last one of pulses of the subdivided synchronization signal that are generated during the first operation thereof.

7. The image display method according to claim 1, wherein the first operation is started sequentially with respect to each of the first areas with a predetermined time shift.

8. The image display method according to claim 7, wherein during a time period in which the first operation is being performed with respect to an earliest one of the first areas and has not been started with respect to the other of the first areas, light-emitting regions in the other of the first areas are controlled in accordance with the previous frame image data.

9. The image display method according to claim 7, wherein during a time period in which the first operation is being performed with respect to an earliest one of the first areas and has not been started with respect to the other of the first areas, light-emitting regions in a first part of the other of the first areas are unlit and light-emitting regions in a second part of the other of the first areas are controlled in accordance with the previous frame image data.

10. An image display device comprising:

a backlight including a plurality of light-emitting regions arranged in a matrix configuration in a first direction and a second direction, the light-emitting regions being divided into a plurality of first areas in the first direction;

a liquid crystal panel on the backlight, the liquid crystal panel including a plurality of pixels arranged in a matrix configuration in the first and second directions, the pixels being divided into a plurality of second areas in the first direction; and a controller configured to:

generate, based on a synchronization signal, a subdivided synchronization signal having a period less than a period of the synchronization signal;

perform a first operation to cause light to be emitted from the light-emitting regions at respective intensity in accordance with frame image data, sequentially with respect to each of the first areas for a duration of time corresponding to the period of the synchronization signal; and perform a second operation to apply voltages to the pixels at respective levels in accordance with the frame image data, sequentially with respect to each of the second areas, wherein the controller starts the first operation with respect to each of the first areas with a predetermined delay after the second operation with respect to a corresponding one of the second areas, the controller repeatedly turns on and off light-emitting regions in each of the first areas a plurality of times at timings in correspondence with pulses of the subdivided synchronization signal during the first operation thereof, and a first time the light-emitting regions in each of the first areas are turned on during the first operation in accordance with the frame image data is a predetermined time period after a last time the light-emitting regions in each of the first areas are turned off in accordance with previous frame image data that is immediately prior to the frame image data, the predetermined time period being greater than the period of the subdivided synchronization signal.

11. The image display device according to claim 10, wherein the predetermined time period is greater than twice the period of the subdivided synchronization signal.

12. The image display device according to claim 10, wherein a number of times the light-emitting regions in each of the first areas are turned on and off during the first operation thereof is less than a number of pulses of the subdivided synchronization signal included in the period of the synchronization signal.

13. The image display device according to claim 12, wherein the light-emitting regions in each of the first areas are not turned on and off in correspondence with an earliest one of pulses of the subdivided synchronization signal that are generated during the first operation thereof.

14. The image display device according to claim 12, wherein the light-emitting regions in each of the first areas are not turned on and off in correspondence with a last one of pulses of the subdivided synchronization signal that are generated during the first operation thereof.

15. An image display method using an image display device including:

a backlight including a plurality of light-emitting regions arranged in a matrix configuration in a first direction and a second direction, the light-emitting regions being divided into a plurality of first areas in the first direction; and a liquid crystal panel on the backlight, the liquid crystal panel including a plurality of pixels arranged in a matrix configuration in the first and second directions, the pixels being divided into a plurality of second areas in the first direction, the method comprising:

generating, based on a synchronization signal, a subdivided synchronization signal having a period less than a period of the synchronization signal;

performing a first operation to cause light to be emitted from the light-emitting regions at respective intensity in accordance with frame image data, sequentially with respect to each of the first areas for a duration of time corresponding to the period of the synchronization signal; and performing a second operation to apply voltages to the pixels at respective levels in accordance with the frame image data, sequentially with respect to each of the second areas, wherein the first operation is started with respect to each of the first areas with a predetermined delay after the second operation with respect to a corresponding one of the second areas, the light-emitting regions in each of the first areas are repeatedly turned on and off a plurality of times at timings in correspondence with pulses of the subdivided synchronization signal during the first operation thereof, and a first time the light-emitting regions in each of the first areas are turned on during the first operation in accordance with the frame image data is a predetermined time period after a last time the light-emitting regions in each of the first areas are turned off in accordance with previous frame image data that is immediately prior to the frame image data, the predetermined time period being less than the period of the subdivided synchronization signal.

16. The image display method according to claim 15, wherein a number of times the light-emitting regions in each of the first areas are turned on and off during the first operation thereof is equal to a number of pulses of the subdivided synchronization signal included in the period of the synchronization signal.

17. The image display method according to claim 15, wherein the first operation is started sequentially with respect to each of the first areas with a predetermined time shift.

18. The image display method according to claim 17, wherein during a time period in which the first operation is being performed with respect to an earliest one of the first areas and has not been started with respect to the other of the first areas, light-emitting regions in the other of the first areas are controlled in accordance with the previous frame image data.

19. An image display device comprising:

a backlight including a plurality of light-emitting regions arranged in a matrix configuration in a first direction and a second direction, the light-emitting regions being divided into a plurality of first areas in the first direction;

a liquid crystal panel on the backlight, the liquid crystal panel including a plurality of pixels arranged in a matrix configuration in the first and second directions, the pixels being divided into a plurality of second areas in the first direction; and a controller configured to:

generate, based on a synchronization signal, a subdivided synchronization signal having a period less than a period of the synchronization signal;

perform a first operation to cause light to be emitted from the light-emitting regions at respective intensity in accordance with frame image data, sequentially with respect to each of the first areas for a duration of time corresponding to the period of the synchronization signal; and perform a second operation to apply voltages to the pixels at respective levels in accordance with the frame image data, sequentially with respect to each of the second areas, wherein the controller starts the first operation with respect to each of the first areas with a predetermined delay after the second operation with respect to a corresponding one of the second areas, the controller repeatedly turns on and off light-emitting regions in each of the first areas a plurality of times at timings in correspondence with pulses of the subdivided synchronization signal during the first operation thereof, and a first time the light-emitting regions in each of the first areas are turned on during the first operation in accordance with the frame image data is a predetermined time period after a last time the light-emitting regions in each of the first areas are turned off in accordance with previous frame image data that is immediately prior to the frame image data, the predetermined time period being less than the period of the subdivided synchronization signal.

20. The image display method according to claim 19, wherein a number of times the light-emitting regions in each of the first areas are turned on and off during the first operation thereof is equal to a number of pulses of the subdivided synchronization signal included in the period of the synchronization signal.

* * * * *